US007844579B2

(12) United States Patent
Peterson et al.

(10) Patent No.: US 7,844,579 B2
(45) Date of Patent: Nov. 30, 2010

(54) SYSTEM AND METHOD FOR MANIPULATING AND MANAGING COMPUTER ARCHIVE FILES

(75) Inventors: James C. Peterson, Menomonee Falls, WI (US); Karen L. Peterson, Menomonee Falls, WI (US); Yuri Basin, Thiensville, WI (US); Michael J. Beirne, Chicago, IL (US)

(73) Assignee: PKWare, Inc., Milwaukee, WI (US)

( * ) Notice: Subject to any disclaimer, the term of this patent is extended or adjusted under 35 U.S.C. 154(b) by 349 days.

(21) Appl. No.: 11/358,533

(22) Filed: Feb. 21, 2006

(65) Prior Publication Data

US 2006/0143251 A1    Jun. 29, 2006

Related U.S. Application Data

(63) Continuation-in-part of application No. 10/970,897, filed on Oct. 21, 2004, now abandoned, which is a continuation-in-part of application No. 10/620,960, filed on Jul. 16, 2003, now abandoned, which is a continuation of application No. 09/803,355, filed on Mar. 9, 2001, now Pat. No. 6,879,988.

(60) Provisional application No. 60/187,969, filed on Mar. 9, 2000.

(51) Int. Cl.
*G06F 17/30* (2006.01)
(52) U.S. Cl. .................................. 707/661; 707/828
(58) Field of Classification Search ......... 707/100–103, 707/204, 661, 828; 713/182–186
See application file for complete search history.

(56) References Cited

U.S. PATENT DOCUMENTS 4,041,284 A    8/1977    Bond (Continued)

OTHER PUBLICATIONS

Randal C Burns: "Differential Compression: A Generalized Solution for Binary Files", THESIS, Dec. 1996, XP002211282.

(Continued)

*Primary Examiner*—John E Breene
*Assistant Examiner*—Thu-Nguyet Le
(74) *Attorney, Agent, or Firm*—McAndrews, Held & Malloy, Ltd.

(57) ABSTRACT

Certain embodiments of the present invention provide an archive management application that operates within a host application to provide access to an archive and/or allow access to and/or modification of files in an archive using the host application's interface, instead of operating as a separate standalone archive management application. In an embodiment of the present invention, a file archiving system may include a user interface component, a file management component and a compression/extraction engine component. The user interface component may include an enhanced user interface of a host application that provides an interface for a user. The file management component may include a central directory that provides a representation of the contents of an archive. The compression/extraction engine component may include a file size module and/or a security module. The file size module may be used to compress and/or decompress a file in an archive. The security module may be used to encrypt, decrypt, digitally sign and/or authenticate a file in an archive.

19 Claims, 15 Drawing Sheets

U.S. PATENT DOCUMENTS

| | | | |
|---|---|---|---|
| 4,156,922 A | 5/1979 | Majerski et al. | |
| 4,179,746 A | 12/1979 | Tubbs | |
| 4,377,846 A | 3/1983 | Yoshida | |
| 4,521,866 A | 6/1985 | Petit et al. | |
| 4,542,453 A | 9/1985 | Patrick et al. | |
| 4,792,954 A | 12/1988 | Arps et al. | |
| 4,862,167 A | 8/1989 | Copeland, III | |
| 4,891,643 A | 1/1990 | Mitchell et al. | |
| 4,905,297 A | 2/1990 | Langdon, Jr. et al. | |
| 4,933,883 A | 6/1990 | Pennebaker et al. | |
| 4,935,882 A | 6/1990 | Pennebaker et al. | |
| 4,939,639 A | 7/1990 | Lee et al. | |
| 4,947,318 A | 8/1990 | Mineo | |
| 4,989,000 A | 1/1991 | Chevion et al. | |
| 5,003,307 A | 3/1991 | Whiting et al. | |
| 5,016,009 A | 5/1991 | Whiting et al. | |
| 5,025,258 A | 6/1991 | Duttweiler | |
| 5,051,745 A | 9/1991 | Katz | |
| 5,091,955 A | 2/1992 | Iseda et al. | |
| 5,099,440 A | 3/1992 | Pennebaker et al. | |
| 5,126,739 A | 6/1992 | Whiting et al. | |
| 5,142,283 A | 8/1992 | Chevion et al. | |
| 5,146,221 A | 9/1992 | Whiting et al. | |
| 5,150,209 A | 9/1992 | Baker et al. | |
| 5,155,847 A | 10/1992 | Kirouac et al. | |
| 5,159,336 A | 10/1992 | Rabin et al. | |
| 5,179,555 A | 1/1993 | Videlock et al. | |
| 5,218,700 A | 6/1993 | Beechick | |
| 5,270,712 A | 12/1993 | Iyer et al. | |
| 5,272,478 A | 12/1993 | Allen | |
| 5,274,805 A | 12/1993 | Ferguson et al. | |
| 5,298,896 A | 3/1994 | Lei et al. | |
| 5,315,655 A * | 5/1994 | Chaplin | 713/167 |
| 5,363,099 A | 11/1994 | Allen | |
| 5,404,315 A | 4/1995 | Nakano et al. | |
| 5,414,425 A | 5/1995 | Whiting et al. | |
| 5,440,504 A | 8/1995 | Ishikawa et al. | |
| 5,446,895 A | 8/1995 | White et al. | |
| 5,455,946 A | 10/1995 | Mohan | |
| 5,463,390 A | 10/1995 | Whiting et al. | |
| 5,463,772 A | 10/1995 | Thompson et al. | |
| 5,465,224 A | 11/1995 | Guttag et al. | |
| 5,469,564 A | 11/1995 | Junya | |
| 5,475,388 A | 12/1995 | Gormish et al. | |
| 5,481,713 A | 1/1996 | Wetmore et al. | |
| 5,485,411 A | 1/1996 | Guttag et al. | |
| 5,493,524 A | 2/1996 | Guttag et al. | |
| 5,506,580 A | 4/1996 | Whiting et al. | |
| 5,517,439 A | 5/1996 | Suzuki et al. | |
| 5,532,694 A | 7/1996 | Mayers et al. | |
| 5,535,300 A | 7/1996 | Hall, II et al. | |
| 5,546,080 A | 8/1996 | Langdon, Jr. et al. | |
| 5,581,697 A | 12/1996 | Gramlich et al. | |
| 5,587,710 A | 12/1996 | Choo et al. | |
| 5,590,350 A | 12/1996 | Guttag et al. | |
| 5,592,162 A | 1/1997 | Printz et al. | |
| 5,594,674 A | 1/1997 | Printz et al. | |
| 5,596,763 A | 1/1997 | Guttag et al. | |
| 5,600,847 A | 2/1997 | Guttag et al. | |
| 5,623,546 A | 4/1997 | Hardy et al. | |
| 5,627,995 A | 5/1997 | Miller et al. | |
| 5,634,065 A | 5/1997 | Guttag et al. | |
| 5,640,578 A | 6/1997 | Balmer et al. | |
| 5,654,702 A | 8/1997 | Ran | |
| 5,659,616 A | 8/1997 | Sudia | |
| 5,671,389 A | 9/1997 | Saliba | |
| 5,675,645 A | 10/1997 | Schwartz et al. | |
| 5,682,152 A | 10/1997 | Wang et al. | |
| 5,689,452 A | 11/1997 | Cameron | |
| 5,694,128 A | 12/1997 | Kim | |
| 5,696,954 A | 12/1997 | Guttag et al. | |
| 5,699,275 A | 12/1997 | Beasley et al. | |
| 5,715,470 A | 2/1998 | Asano et al. | |
| 5,732,214 A | 3/1998 | Subrahmanyam | |
| 5,734,119 A | 3/1998 | France et al. | |
| 5,734,880 A | 3/1998 | Guttag et al. | |
| 5,737,345 A | 4/1998 | Pelz et al. | |
| 5,745,756 A | 4/1998 | Henley | |
| 5,771,355 A | 6/1998 | Kuzma | |
| 5,774,081 A | 6/1998 | Cheng et al. | |
| 5,778,374 A | 7/1998 | Dang et al. | |
| 5,781,901 A | 7/1998 | Kuzma | |
| 5,802,520 A | 9/1998 | Jerkunica et al. | |
| 5,802,549 A | 9/1998 | Goyal et al. | |
| 5,805,913 A | 9/1998 | Guttag et al. | |
| 5,808,572 A | 9/1998 | Yang et al. | |
| 5,813,011 A | 9/1998 | Yoshida et al. | |
| 5,818,369 A | 10/1998 | Withers | |
| 5,828,848 A | 10/1998 | MacCormack et al. | |
| 5,832,273 A | 11/1998 | Mizuse | |
| 5,832,520 A | 11/1998 | Miller | |
| 5,838,996 A | 11/1998 | deCarmo | |
| 5,841,865 A | 11/1998 | Sudia | |
| 5,844,575 A | 12/1998 | Reid | |
| 5,847,980 A | 12/1998 | Okamoto et al. | |
| 5,854,597 A | 12/1998 | Murashita et al. | |
| 5,857,035 A | 1/1999 | Rust | |
| 5,867,600 A | 2/1999 | Hongu | |
| 5,881,225 A | 3/1999 | Worth | |
| 5,903,723 A | 5/1999 | Beck et al. | |
| 5,907,703 A | 5/1999 | Kronenberg et al. | |
| 5,909,638 A | 6/1999 | Allen | |
| 5,911,776 A | 6/1999 | Guck | |
| 5,912,636 A | 6/1999 | Gormish et al. | |
| 5,918,002 A | 6/1999 | Klemets et al. | |
| 5,926,208 A | 7/1999 | Noonen et al. | |
| 5,937,188 A | 8/1999 | Freeman | |
| 5,956,733 A | 9/1999 | Nakano et al. | |
| 5,960,117 A | 9/1999 | Hiratani | |
| 5,961,635 A | 10/1999 | Guttag et al. | |
| 5,970,097 A | 10/1999 | Ishikawa et al. | |
| 5,974,539 A | 10/1999 | Guttag et al. | |
| 5,986,594 A | 11/1999 | Nakayama et al. | |
| 5,995,747 A | 11/1999 | Guttag et al. | |
| 5,995,748 A | 11/1999 | Guttag et al. | |
| 6,018,747 A | 1/2000 | Burns et al. | |
| 6,021,198 A | 2/2000 | Anigbogu et al. | |
| 6,028,541 A | 2/2000 | Levine | |
| 6,032,200 A | 2/2000 | Lin | |
| 6,041,147 A | 3/2000 | Mead | |
| 6,043,763 A | 3/2000 | Levine | |
| 6,047,318 A | 4/2000 | Becker et al. | |
| 6,049,630 A | 4/2000 | Wang et al. | |
| 6,049,671 A | 4/2000 | Slivka et al. | |
| 6,061,732 A | 5/2000 | Korst et al. | |
| 6,078,921 A | 6/2000 | Kelley | |
| 6,083,279 A | 7/2000 | Cuomo et al. | |
| 6,088,717 A | 7/2000 | Reed et al. | |
| 6,091,777 A | 7/2000 | Guetz et al. | |
| 6,094,453 A | 7/2000 | Gosselin et al. | |
| 6,098,163 A | 8/2000 | Guttag et al. | |
| 6,112,211 A | 8/2000 | Bradshaw et al. | |
| 6,116,768 A | 9/2000 | Guttag et al. | |
| 6,118,392 A | 9/2000 | Levine | |
| 6,121,904 A | 9/2000 | Levine | |
| 6,125,348 A | 9/2000 | Levine | |
| 6,144,320 A | 11/2000 | Van Der Vleuten | |
| 6,145,069 A | 11/2000 | Dye | |
| 6,148,340 A | 11/2000 | Bittinger | |
| 6,151,609 A | 11/2000 | Truong | |
| 6,154,771 A | 11/2000 | Rangan et al. | |
| 6,157,706 A | 12/2000 | Rachelson | |
| 6,161,219 A | 12/2000 | Ramkumar et al. | |
| 6,166,664 A | 12/2000 | Acharya | |

| | | | |
|---|---|---|---|
| 6,167,453 | A | 12/2000 | Becker et al. |
| 6,173,317 | B1 | 1/2001 | Chaddha et al. |
| 6,173,394 | B1 | 1/2001 | Guttag et al. |
| 6,188,334 | B1 | 2/2001 | Bengio et al. |
| 6,195,026 | B1 | 2/2001 | Acharya |
| 6,198,412 | B1 | 3/2001 | Goyal |
| 6,217,234 | B1 | 4/2001 | Dewar et al. |
| 6,225,925 | B1 | 5/2001 | Bengio et al. |
| 6,229,463 | B1 | 5/2001 | Van Der Vleuten et al. |
| 6,233,017 | B1 | 5/2001 | Chaddha |
| 6,233,565 | B1 | 5/2001 | Lewis et al. |
| 6,236,341 | B1 | 5/2001 | Dorward et al. |
| 6,275,848 | B1 | 8/2001 | Arnold |
| 6,289,509 | B1 | 9/2001 | Kryloff |
| 6,345,288 | B1 | 2/2002 | Reed et al. |
| 6,356,937 | B1 | 3/2002 | Montville et al. |
| 6,378,054 | B1 | 4/2002 | Karasudani et al. |
| 6,381,742 | B2 | 4/2002 | Forbes et al. |
| 6,401,241 | B1* | 6/2002 | Taylor ......................... 717/174 |
| 6,415,435 | B1 | 7/2002 | McIntyre |
| 6,427,149 | B1 | 7/2002 | Rodriguez et al. |
| 6,434,561 | B1 | 8/2002 | Durst et al. |
| 6,460,044 | B1 | 10/2002 | Wang |
| 6,466,999 | B1 | 10/2002 | Sliger et al. |
| 6,477,703 | B1 | 11/2002 | Smith et al. |
| 6,484,259 | B1 | 11/2002 | Barlow |
| 6,487,278 | B1 | 11/2002 | Skladman et al. |
| 6,498,835 | B1 | 12/2002 | Skladman et al. |
| 6,526,574 | B1 | 2/2003 | Jones |
| 6,529,908 | B1 | 3/2003 | Piett et al. |
| 6,546,417 | B1 | 4/2003 | Baker |
| 6,594,822 | B1 | 7/2003 | Schweitz et al. |
| 6,604,106 | B1 | 8/2003 | Bodin et al. |
| 6,635,088 | B1 | 10/2003 | Hind et al. |
| 6,657,702 | B1 | 12/2003 | Chui et al. |
| 6,684,331 | B1 | 1/2004 | Srivastava |
| 6,742,176 | B1 | 5/2004 | Million et al. |
| 6,785,810 | B1 | 8/2004 | Lirov et al. |
| 6,879,988 | B2 | 4/2005 | Basin et al. |
| 6,914,985 | B1 | 7/2005 | Shrader et al. |
| 6,934,836 | B2 | 8/2005 | Strand et al. |
| 6,983,371 | B1 | 1/2006 | Hurtado et al. |
| 6,996,251 | B2 | 2/2006 | Malone et al. |
| 7,085,850 | B2 | 8/2006 | Calvignac et al. |
| 7,127,712 | B1 | 10/2006 | Noble et al. |
| 7,139,811 | B2 | 11/2006 | Lev Ran et al. |
| 7,139,918 | B2 | 11/2006 | Chang et al. |
| 7,184,573 | B2 | 2/2007 | Malone et al. |
| 7,298,851 | B1 | 11/2007 | Hendricks et al. |
| 7,386,726 | B2 | 6/2008 | Gehrmann et al. |
| 7,434,052 | B1 | 10/2008 | Rump |
| 2001/0002485 | A1 | 5/2001 | Brisbee et al. |
| 2001/0014884 | A1 | 8/2001 | Dillard et al. |
| 2001/0023360 | A1* | 9/2001 | Nelson et al. .................. 607/60 |
| 2001/0030667 | A1 | 10/2001 | Kelts |
| 2001/0037309 | A1* | 11/2001 | Vrain ......................... 705/64 |
| 2001/0042121 | A1 | 11/2001 | Defosse et al. |
| 2001/0055407 | A1 | 12/2001 | Rhoads |
| 2002/0007287 | A1 | 1/2002 | Straube et al. |
| 2002/0029227 | A1 | 3/2002 | Multer et al. |
| 2002/0029228 | A1 | 3/2002 | Rodriguez et al. |
| 2002/0040369 | A1 | 4/2002 | Multer et al. |
| 2002/0042833 | A1 | 4/2002 | Hendler et al. |
| 2002/0049717 | A1 | 4/2002 | Routtenberg et al. |
| 2002/0059144 | A1 | 5/2002 | Meffert et al. |
| 2002/0076052 | A1* | 6/2002 | Yung et al. .................. 380/277 |
| 2002/0078466 | A1 | 6/2002 | Beyda |
| 2002/0184509 | A1 | 12/2002 | Scheidt et al. |
| 2002/0188605 | A1* | 12/2002 | Adya et al. ..................... 707/4 |
| 2003/0016770 | A1 | 1/2003 | Trans et al. |
| 2003/0115169 | A1 | 6/2003 | Ye |
| 2003/0144858 | A1 | 7/2003 | Jain et al. |
| 2003/0233494 | A1 | 12/2003 | Ghosh et al. |
| 2004/0030898 | A1 | 2/2004 | Tsuria et al. |
| 2004/0098715 | A1 | 5/2004 | Aghera |
| 2004/0107125 | A1 | 6/2004 | Guheen et al. |
| 2004/0117845 | A1 | 6/2004 | Karaoguz |
| 2005/0060356 | A1* | 3/2005 | Saika ......................... 707/204 |
| 2005/0147946 | A1 | 7/2005 | Ramamurthy et al. |
| 2005/0251686 | A1 | 11/2005 | Torrubia-Saez |
| 2006/0200253 | A1 | 9/2006 | Hoffberg et al. |
| 2006/0253451 | A1 | 11/2006 | Van De Sluis et al. |
| 2006/0265760 | A1 | 11/2006 | Daemke et al. |

OTHER PUBLICATIONS

Reichenberger C: "Delta Storage for Arbitrary Non-Text Files", 1991, New York, NY, US, pp. 144-152, XP008030925, ISBN: 0-89791-429-5.
"Winzip" Announcement NICO Mak Computing, XX, XX, 1995, pp. 1-106, XP002908148.
Campbell D: "Extending the Windows Explorer with Name Space Extensions", Microsoft Systems Journal, Microsoft Corp., Redmond, WA, US, vol. 5, No. 6, Jul. 1996, pp. 89-96, XP000874429, ISSN: 0889-9932.
Cevenini G et al: "A Multiprovider, Universal, E-Mail Service for the Secure Exchange of Legally-Binding Multimedia Documents", Conference Proceedings Article, 2000, pp. 47-50, XP 010515038.
Winzip Computing, Inc.: "AES Encryption Information", Internet Article, Online!, May 15, 2003, XP002296117: http://web.archive.org/web/20030618094654/http://www.winzip.com/aes_info.htm.
John Leyden: "Zip File Encryption Compromise Thrashed Out", Internet Article, Online!, Jan. 21, 2004, XP002296118, http://www.theregister.co.uk/2004/01/21/zip_file_encryption_compromise_thrashed/.
Press Release PKWARE, Inc.: "PKWARE Releases New ZIP Format Specification", Internet Article, Online!, Dec. 2001, XP002296119, URL:http://www.pkware.com/news/releases/2001/120501.php.
Ziv J et al: "A Universal Algorithm for Sequential Data Compression", IEEE Transactions on Information Theory, IEEE Inc. New York, US, vol. 23, No. 3, 1977, pp. 337-343, XP002911734, ISSN: 0018-9448.
Ziv J et al: "Compression of Individual Sequences Via Variable-Rate Coding", IEEE Transactions on Information Theory, IEEE Inc. New York, US, vol. IT-24, No. 5, Sep. 1978, pp. 530-536, XP000565213.
Bray N: "How Digital Certificates Work", Computers & Security, Elsevier Science Publishers, Amsterdam, NL, vol. 16, No. 1, 1997, p. 62, XP004063818, ISSN: 0167-4048.
Mark Nelson, Dr. Dobbs Journal: "LZW Data Compression", Internet Article, Online!, Oct. 1989, XP002296120, http://www.dogma.net/markn/articles/lzw/lzw.htm.
Pkware: "Appnote.txt—.zip file format specification", Internet Article, Online!, Jan. 11, 2001, XP00229612, http://www.the7soft.com/file-formats/file-formats-Archivers/zip45.zip.
Web Site Information: http://home.worldnet.fr/mounierr/HomePage.html, Welcome to Arjfolder Official Site, pp. 1-2.
Web Site Information: http://www.cleverness.com/cleverzip/browse/explorer.html, CleverZip—Explorer View, p. 1.
Web Site Information: http://www.creative.net/-acco/, AECO Systems Presents . . . Zip Explorer Pro v2.54, p. 1.
Web Site Information: http://www.knoware.com/in32docs/index.html, Internet Neighborhood FTP Client—The Premier FTP Namespace Extension for Windows, pp. 1-2.
Web Site Information: http://www.knoware.com/in32docs/screenshots.html, Internet Neighborhood—the premier FTP Namespace Extension, KnoWare, Inc., Award-Winning Internet Utilities, pp. 1-3.
Web Site Information: http://www.netexplore.de/english/features.htm, Features, FTP in a New Generation, pp. 1-2.
Web Site Information: http://www.mijeniz.com/zipmagic2000.asp, ZipMagic 2000—Take the Hassle out of Zip files!, Mijenix Corporation, pp. 1-2.
Web Site Information: http://www.netzip.com/products/Info_Netzip_Win.html, Netzip Award Winning Zip File, Download, and File Viewing Utilities, NETZIP 5 Top internet Programs, pp. 1-3.

Web Site Information: http://www.mijeniz.com/zm2000primer.asp, ZipMagic 2000 Compression Primer, Mijenix Corporation, pp. 1-2.
Web Site Information: http://www.pocketsoft.com/products.html, RTPatch Professional Products, pp. 1-4.
Web Site Information: http://www.pocketsoft.com/products.html, Pocket Soft, Inc.—Products Page, pp. 1-2.
Web Site Information: http://www.pocketsoft.com/windows/overview.html, Pocket Soft, Inc.—RTPatch for Windows, pp. 1-2.
Web Site Information: http://www.pocketsoft.com/unix/overview.html, Pocket Soft, Inc.—RTPatch for UNIX, pp. 1-2.
Web Site Information: http://www.pocketsoft.com/wince/overview.html, Pocket Soft, Inc.—RTPatch for CE, pp. 1-2.
Web Site Information: http://www.pocketsoft.com/vxworks/overview.html, Pocket Soft, Inc.—RTPatch for VxWorks, pp. 1-2.
Web Site Information: http://www.pocketsoft.com/oem/overview.html, Pocket Soft, Inc.—RTPatch OEM, pp. 1-3.
CuteZIP InfoGuide, p. 1.
Web Site Information: http://www.cuteftp.com/cutezip/, GlobalSCAPE—CuteZIP—Compression Software, p. 1.
Web Site Information: http://cuteftp.com/cutezip/tour_1.asp, GlobalSCAPE—CuteZip, Product Feature Tour: CuteZIP, pp. 1-7.
Web Site Information: http://cuteftp.com/cutezip/features.asp, GlobalSCAPE—CuteZIP, CuteZIP 2.1 Features, pp. 1-2.
Web Site Information: http://reviews.cnet.com/4505-3514_7-20471822-2.html?legacy=cent&tag=dir, Globalscape CuteZip 2.1—Full review—Browsers—CNET Reviews, pp. 1-3.
Web Site Information: http://www.dpdirectory.com/prescuri.htm, ShareWare Press Release, pp. 1-4.
Web Site Information: http://www.plexobject.com/software/plexcrypt, PlexObject Solutions, Inc., pp. 1-2.
Web Site Information: http://corsoft.com/aileron.asp, Palm Email with attachments, Corsoft, pp. 1-2.
Web Site Information: http://www.noisette-software.com/products/pocketpc/CrunchIt/, CrunchIt for Microsoft Pocket PC, pp. 1-3.
Web Site Information: http://www.resco.net/pocketpc/explorer/default.asp, Resco Explorer 2005 for Pocket PC, pp. 1-2.
Web Site Information: http://www1.sprintpcs.com/media/Assets/Equipment/Handsets/pdf/samsungspi600.pdf, Sprint PCS VisionSM Smart Device SP-i600 by Samsung® User's Guide, pp. 1-182.
Web Site Information: http://www.cc.gatech.edu/~kingd/comp_links.html, Data Compression and Information Theory Links, pp. 1-2.
Web Site Information: http://dogma.net/DataCompression/ArithmeticCoding.shtml, The Data Compression Library—Arithmetic Coding, pp. 1-4.
Web Site Information: http://www.cs.duke.edu/~jsv/Papers/catalog/node63.html#HoV:ACsurvey, External Memory Algorithms, I/O Efficiency, pp. 1-2.
Web Site Information: http://203.162.7.85/unescocourse/computervision/101.htm#10.ImageCompression, 10.1 Introduction to image compression, pp. 1-2.
Web Site Information: http://www.hn.is.uec.ac.jp/~arimura/compression_links.html, Mitsuharu Arimura's Bookmarks on Source Coding/Data Compression, pp. 1-12.
Notice of Acceptance for Australia Patent Application No. 23208 / 02; Serial No. 785475; filed Nov. 3, 2002.
Examination Report for European Application No. 02 251 648.8-1225; dated Apr. 8, 2005.
Summons to attend oral proceedings for European Application No. 02 251 648.8-1225; dated Apr. 27, 2007.
Decision to refuse European Application No. 02 251 648.8-1225; dated Sep. 17, 2007.
European Search Report for Application No. EP 02 25 1648; dated Mar. 25, 2004.
Office Action dated Jan. 14, 2004; for U.S. Appl. No. 09/803,355, filed Mar. 9, 2001.
Office Action dated Apr. 25, 2003; for U.S. Appl. No. 09/803,355, filed Mar. 9, 2001.
Notice of Allowance dated Sep. 17, 2004; for U.S. Appl. No. 09/803,355, filed Mar. 9, 2001.
Office Action dated Aug. 7, 2007; for U.S. Appl. No. 10/970,897, filed Oct. 21, 2004.
Examination Report for European Application No. 04 254 277.9 1247; dated Mar. 16, 2006.
European Search Report for Application No. EP 04 25 4277; dated Sep. 14, 2004.
Office Action dated Apr. 6, 2007; for U.S. Appl. No. 10/620,960, filed Jul. 16, 2003.
Office Action dated Jun. 14, 2007; for U.S. Appl. No. 10/620,960, filed Jul. 16, 2003.
Office Action dated Oct. 5, 2006; for U.S. Appl. No. 10/620,960, filed Jul. 16, 2003.
"GlobalSCAPE Releases CuteZIP 1.0, the Next-Generation ZIP Utility, Combining Music and File Compress", GlobalSCAPE, Mar. 2000, Retrieved from the Internet on Mar. 31, 2007, URL: <http://www.cuteftp.com/company/press.aspx?id=20>.
Schneier et al., "Twofish : A 128-Bit Block Cipher", Abstract, Jun. 1998, Retrieved from the Internet on Mar. 31, 2007, URL: <http://www.schneier.com/paper-twofish-paper.html>.
Office Action dated Mar. 2, 2007; for U.S. Appl. No. 10/943,270, filed Sep. 17, 2004.
Office Action dated Aug. 22, 2007; for U.S. Appl. No. 10/943,270, filed Sep. 17, 2004.
Office Action dated Nov. 27, 2007; for U.S. Appl. No. 10/943,270, filed Sep. 17, 2004.
"PKWARE Releases New ZIP File Format Specification", Business Wire, Dec. 2001, Retrieved from the Internet on Aug. 12, 2007, <URL: http://proquest.umi.com/pqdweb?did=93502134&sid=1&Fmt=3&clientid=19649&RQT=309&VName=PQD>.
"GlobaiSCAPE Releases CuteZIP 1.0, the Next-Generation ZIP Utility, Combining Music and File Compress," GlobalSCAPE, Mar. 2000, Retrieved from the Internet on Mar. 31, 2007, URL: <http://www.cuteftp.com/company/press.aspx?id=20>.
Schneier et al., "Twofish : A 128-Bit Block Cipher," Abstract, Jun. 1998, Retrieved from the Internet on Mar. 31, 2007, URL: <http://www.schneier.com/paper-twofish-paper.html>.
Nelson, "Data Compression with the Burrows Wheeler Transform," Jul. 2001, Retrieved from the Internet on Jan. 23, 2007: URL: <http://www.ddj.com/184409957>.
Menezes et al., "Handbook of Applied Cryptography," 1997, CRC Press, pp. 555-566.
"Chilkat Encryption .NET Component—RSA / AES," Jul. 12, 2003, Retrieved from the Internet on Jan. 17, 2007: URL: <http://web.archive.org/web/20030712162512/http://www.visual-mp3.com/review/4017.html>.
"PlexCrypt Compression-Encryption 3.1 details," Aug. 2001, Retrieved from the Internet on Jan. 17, 2007: URL: <http://www.downloadsofts.com/download/Security-Privacy/Encryption-Tools/PlexCrypt-Compression-Encryption-download-details.html>.
"PlexCrypt Compression-Encryption," Aug. 2001, Retrieved from the Internet on Jan. 17, 2007: URL: <http://www.exefind.com/plexcrypt-compression-encryption-P13552.html>.
"PlexCrypt Compression-Encryption 3.1," Aug. 2001, Retrieved from the Internet on Jan. 17, 2007: URL: <http://www.fivesign.com/downloads/program/PlexCrypt-CompressionEncryption_6715_66.html>.
"PlexCrypt 4.2 User Manual," Jun. 2003, Retrieved from the Internet on Jan. 17, 2007: URL: <http://www.plexobject.com/software/plexcrypt/docs/plexcrypt.pdf>.
Stallings, W., Cryptography and Network Security: Principles and Practice, 1999, Prentice Hall, 2nd Edition, pp. 163-173.
"GlobalSCAPE Releases CuteZIP 1.0, the Next-Generation ZIP Utility, Combining Music and File Compress," GlobalSCAPE, Mar. 2000, Retrieved from the Internet on Mar. 31, 2007, URL: <http://www.cuteftp.com/company/press.aspx?id=20>.
Schneier et al., "Twofish : A 128-Bit Block Cipher," Abstract, Jun. 1998, Retrieved from the Internet on Mar. 31, 2007, URL: <http://www.schneier.com/paper-twofish-paper.html>.
Nelson, "Data Compression with the Burrows Wheeler Transform," Jul. 2001, Retrieved from the Internet on Jan. 23, 2007: URL: <http://www.ddj.com/184409957>.
Menezes et al., "Handbook of Applied Cryptography," 1997, CRC Press, pp. 555-566.

"Chilkat Encryption .NET Component—RSA / AES," Jul. 12, 2003, Retrieved from the Internet on Jan. 17, 2007: URL: <http://web.archive.org/web/20030712162512/http://www.visual-mp3.com/review/4017.html>.

"PlexCrypt Compression-Encryption 3.1 details," Aug. 2001, Retrieved from the Internet on Jan. 17, 2007: URL: <http://www.downloadsofts.com/download/Security-Privacy/Encryption-Tools/PlexCyrpt-Compression-Encryption-download-details.html<.

"PlexCrypt Compression-Encryption," Aug. 2001, Retrieved from the Internet on Jan. 17, 2007: URL: <http://www.exefind.com/plexcrypt-compression-encryption-P13552.html>.

"PlexCrypt Compression-Encryption 3.1," Aug. 2001, Retrieved from the Internet on Jan. 17, 2007: URL: <http://www.fivesign.com/downloads/program/PlexCrypt-CompressionEncryption_6715_66.html>.

"PlexCrypt 4.2 User Manual," Jun. 2003, Retrieved from the Internet on Jan. 17, 2007: URL: <http://www.plexobject.com/software/plexcrypt/docs/plexcrypt.pdf>.

Stallings, W., Cryptography and Network Security: Principles and Practice, 1999, Prentice Hall, 2nd Edition, pp. 163-173.

Desmond, "PKWare Offers Encryption for .ZIP Files," Jul. 16, 2002, Retrieved from the Internet on Sep. 30, 2006: URL: <http://www.esecurityplanet.com/prodser/article.php/10753_1408191>.

Nelson, "Data Compression with the Burrows Wheeler Transform," Jul. 2001, Retrieved from the Internet on Sep. 30, 2006: URL: <http://www.ddj.com/184409957>.

Schneier, "Applied Cryptography," 1996, John Wiley & Sons, 2nd Edition, pp. 336-339.

Sems, "The Short Version—Compression Software Saves You Time & Money," Feb. 2002, Smart Computing, Retrieved from the Internet on Sep. 30, 2006: URL: <http://www.smartcomputing.com/editorial/article.asp?article=articles/2002/s1302/04s02/04s02.asp&articleid=11585&guid.

Spector, "Updated WinZip Alters Zip Format," May 30, 2003, PC World, Retrieved from the Internet on Sep. 30, 2006: URL: ttp://www.pcworld.com/article/id,110820-page,1/article.html>.

SecuriSys, "SafenSigned makes Software Distributed over the Net Safe and Sound," ShareWare Press Release, Retrieved from the Internet on Mar. 3, 2004: URL: <http://www.dpdirectory.com/prsecuri.htm.

Stallings, W., Cryptography and Network Security: Principles and Practice, 1999, Prentice Hall, 2nd Edition, pp. 164-206 and 356-398.

Corsoft products, Palm e-mail with attachments, retrieved from the Internet on Jul. 1, 2008, URL:http://www.corsoft.net/attachments.asp.

PalmHandZipper by HandWatch, Inc., Handango—Admin Product Detail, retrieved from the Internet on Jul. 1, 2008, URL: http://www.handango.com/AdminProductDetailView.jsp?siteId=1&productId=23214&platformId=1&productType=2.

PKCS # 7: Cryptographic Message Syntax Standard, RSA Laboratories, 1993, Retrieved from the Internet on Jul. 6, 2008: <URL: ftp://ftp.rsasecurity.com/pub/pkcs/ps/pkcs-7.ps>.

Smartphone & Pocket PC Magazine, URL: <http://www.pocketpcmag.com/_archives/mar03/zayo.asp>, Mar. 2003, vol. 6, No. 1.

Stallings, W., Cryptography and Network Security: Principles and Practice, 1999, Prentice Hall, 2nd Edition, pp. 164-206 and 356-398.

Office Action dated Jan. 23, 2008; for U.S. Appl. No. 10/970,897, filed Oct. 21, 2004.

Office Action dated May 9, 2008; for U.S. Appl. No. 10/970,897, filed Oct. 21, 2004.

Office Action dated Mar. 24, 2008; for U.S. Appl. No. 10/943,270, filed Sep. 17, 2004.

Office Action dated Jul. 11, 2008; for U.S. Appl. No. 10/944,963, filed Sep. 20, 2004.

Office Action dated April 4, 2008; for U.S. Appl. No. 10/946,454, filed Sep. 20, 2004.

Office Action for U.S. Appl. No. 11/358,865; dated Apr. 21, 2008; filed Feb. 21, 2006.

Office Action for U.S. Appl. No. 11/358,534; dated Apr. 18, 2008; filed Feb. 21, 2006.

Office Action for U.S. Appl. No. 11/358,745; dated Apr. 21, 2008; filed Feb. 21, 2006.

Office Action for U.S. Appl. No. 11/358,002; dated Mar. 31, 2008; filed Feb. 21, 2006.

Green M., Top Ten File Compression Tools, Mar. 12, 1999, http://pcworld.com.

Menezes et al., "Handbook of Applied Cryptography," 1997, CRC Press, pp. 506-515.

PKWARE, "X.509 Digital Certificates and the .ZIP File Archive," Retrieved from the Internet on Jan. 5, 2009: <URL: http://mycroft.com.au/clients/mycroft.nsf/downloadlookup/pkzx509.pdf/$File/pkzx509.pdf?OpenElement>.

PKWARE, "Appnote_txt" 1998 Version, Jul. 1998, Retrieved from the Internet on Jan. 5, 2009: <URL: http://http://mediasrv.ns.ac.yu/extra/fileformat/archive/zip/zip.txt>.

Schneier, "Applied Cryptography," 1996, John Wiley & Sons, 2nd Edition, pp. 523-525.

WinAce 2.6.5, Nov. 30, 1999, E-Merge, http://winace.com.

Office Action dated Oct. 1, 2008; for U.S. Appl. No. 10/970,897, filed Oct. 21, 2004.

Office Action dated Oct. 21, 2008; for U.S. Appl. No. 11/586,868, filed Oct. 26, 2006.

Office Action dated Oct. 29, 2008; for U.S. Appl. No. 11/586,869, filed Oct. 26, 2006.

Pre-interview first office action dated Oct. 28, 2008; for U.S. Appl. No. 11/588,006, filed Oct. 26, 2006.

Pre-interview first office action dated Nov. 26, 2008; for U.S. Appl. No. 11/586,834, filed Oct. 26, 2006.

Office Action dated Jan. 12, 2009; for U.S. Appl. No. 11/586,834, filed Oct. 26, 2006.

Office Action dated Oct. 31, 2008; for U.S. Appl. No. 11/588,003, filed Oct. 26, 2006.

Office Action dated Sep. 30, 2008; for U.S. Appl. No. 10/943,270, filed Sep. 17, 2004.

Office Action dated Oct. 20, 2008; for U.S. Appl. No. 10/946,454, filed Sep. 20, 2004.

Office Action dated Dec. 24, 2008; for U.S. Appl. No. 10/946,271, filed Sep. 20, 2004.

Office Action dated Dec. 23, 2008; for U.S. Appl. No. 10/946,127, filed Sep. 20, 2004.

Office Action dated Dec. 23, 2008; for U.S. Appl. No. 10/945,352, filed Sep. 20, 2004.

Office Action dated Jan. 5, 2009; for U.S. Appl. No. 10/946,273, filed Sep. 20, 2004.

Office Action dated Jan. 8, 2009; for U.S. Appl. No. 10/945,292, filed Sep. 20, 2004.

Office Action dated Jan. 27, 2009; for U.S. Appl. No. 10/945,485, filed Sep. 20, 2004.

Office Action dated Jan. 26, 2009; for U.S. Appl. No. 11/774,317, filed Jul. 6, 2007.

Office Action dated Jan. 7, 2009; for U.S. Appl. No. 10/945,475, filed Sep. 20, 2004.

Office Action dated Jan. 9, 2009; for U.S. Appl. No. 10/945,473, filed Sep. 20, 2004.

Office Action for U.S. Appl. No. 11/358,865; dated Oct. 27, 2008; filed Feb. 21, 2006.

Office Action for U.S. Appl. No. 11/358,505; dated Oct. 28, 2008; filed Feb. 21, 2006.

Office Action for U.S. Appl. No. 11/358,745; dated Oct. 28, 2008; filed Feb. 21, 2006.

Office Action for U.S. Appl. No. 11/358,497; dated Oct. 28, 2008; filed Feb. 21, 2006.

Office Action for U.S. Appl. No. 11/358,534; dated Oct. 29, 2008; filed Feb. 21, 2006.

Office Action for U.S. Appl. No. 11/358,002; dated Oct. 15, 2008; filed Feb. 21, 2006.

Office Action dated Feb. 3, 2009; for U.S. Appl. No. 11/588,866, filed Oct. 26, 2006.

Office Action dated Dec. 24, 2008; for U.S. Appl. No. 11/358,518, filed Feb. 21, 2006.

Office Action dated Apr. 7, 2009; for U.S. Appl. No. 10/970,897, filed Oct. 21, 2004.

Office Action dated Apr. 3, 2009; for U.S. Appl. No. 11/586,868, filed Oct. 26, 2006.

Office Action dated Mar. 18, 2009; for U.S. Appl. No. 11/588,006, filed Oct. 26, 2006.
Office Action dated Apr. 10, 2009; for U.S. Appl. No. 11/588,007, filed Oct. 26, 2006.
Office Action dated Mar. 31, 2009; for U.S. Appl. No. 11/588,005, filed Oct. 26, 2006.
Office Action dated Apr. 30, 2009; for U.S. Appl. No. 11/586,834, filed Oct. 26, 2006.
Office Action dated Apr. 15, 2009; for U.S. Appl. No. 11/588,003, filed Oct. 26, 2006.
Office Action dated Mar. 19, 2009; for U.S. Appl. No. 11/586,867, filed Oct. 26, 2006.
Office Action dated Apr. 13, 2009; for U.S. Appl. No. 10/946,454, filed Sep. 20, 2004.
Office Action dated Apr. 3, 2009; for U.S. Appl. No. 11/358,865, filed Feb. 21, 2006.
Office Action dated Apr. 10, 2009; for U.S. Appl. No. 11/358,497, filed Feb. 21, 2006.
Office Action dated Apr. 16, 2009; for U.S. Appl. No. 11/358,505, filed Feb. 21, 2006.
Office Action dated Mar. 18, 2009; for U.S. Appl. No. 11/358,745, filed Feb. 21, 2006.
Office Action dated Apr. 1, 2009; for U.S. Appl. No. 11/358,002, filed Feb. 21, 2006.
Office Action dated Mar. 3, 2009; for U.S. Appl. No. 11/358,859. filed Feb. 21, 2006.
Office Action dated Mar. 3, 2009; for U.S. Appl. No. 11/358,498, filed Feb. 21, 2006.
Office Action dated Dec. 24, 2008; for U.S. Appl. No. 11/358,518, filed Feb. 21, 2006.
Office Action dated Mar. 3, 2009; for U.S. Appl. No. 11/358,324, filed Feb. 21, 2006.
Schneier, "Applied Cryptography," 1996, John Wiley & Sons, 2nd Edition, pp. 270-278.
Office Action dated May 19, 2009; for U.S. Appl. No. 11/586,869, filed Oct. 26, 2006.
Office Action dated Sep. 18, 2009; for U.S. Appl. No. 11/586,891, filed Oct. 26, 2006.
Office Action dated Sep. 10, 2009; for U.S. Appl. No. 11/586,867, filed Oct. 26, 2006.
Office Action dated Sep. 3, 2009; for U.S. Appl. No. 11/588,866, filed Oct. 26, 2006.
Office Action dated May 27, 2009; for U.S. Appl. No. 10/943,270, filed Sep. 17, 2004.
Office Action dated Jun. 22, 2009; for U.S. Appl. No. 10/945,464, filed Sep. 20, 2004.
Office Action dated Sep. 1, 2009; for U.S. Appl. No. 10/944,963, filed Sep. 20, 2004.
Office Action dated Sep. 29, 2009; for U.S. Appl. No. 10/946,454, filed Sep. 20, 2004.
Office Action dated May 28, 2009; for U.S. Appl. No. 10/946,250, filed Sep. 20, 2004.
Office Action dated Jun. 18, 2009; for U.S. Appl. No. 10/946,271, filed Sep. 20, 2004.
Office Action dated Jun. 22, 2009; for U.S. Appl. No. 10/946,127, filed Sep. 20, 2004.
Office Action dated Jun. 23, 2009; for U.S. Appl. No. 10/945,352, filed Sep. 20, 2004.
Office Action dated Jun. 18, 2009; for U.S. Appl. No. 10/946,273, filed Sep. 20, 2004.
Office Action dated Jun. 18, 2009; for U.S. Appl. No. 10/945,292, filed Sep. 20, 2004.
Office Action dated Sep. 29, 2009; for U.S. Appl. No. 10/945,485, filed Sep. 20, 2004.
Office Action dated Aug. 17, 2009; for U.S. Appl. No. 11/774,317, filed Jul. 6, 2007.
Office Action dated Jun. 22, 2009; for U.S. Appl. no. 10/945,475, filed Sep. 20, 2004.
Office Action dated Aug. Jul. 9; for U.S. Appl. No. 10/945,473, filed Sep. 20, 2004.
Office Action dated Jun. Aug. 9; for U.S. Appl. No. 11/358,534, filed Feb. 21, 2006.
Office Action dated Jul. Aug. 9; for U.S. Appl. No. 11/358,839, filed Feb. 21, 2006.
Office Action dated Jul. 20, 2009; for U.S. Appl. No. 11/358,844, filed Feb. 21, 2006.
Office Action dated May 28, 2009; for U.S. Appl. No. 11/358,318, filed Feb. 21, 2006.
Office Action dated Jul. 7, 2009; for U.S. Appl. No. 11/358,518, filed Feb. 21, 2006.
Web Site Information: Feldspar, "An Explanation of the Deflate Algorithm," Aug. 23, 1997, http://www.gzip.org/deflate.html, accessed on Jan. 20, 2010.
PKWARE, "PKZIP® 6.0 for Windows Getting Started Manual" (Jan. 28, 2003).
PKWARE, "Appnote.txt," Version 5.2 (Jun. 2, 2003).
PKWARE, "Appnote.txt," Version 5.2.1 (Oct. 6, 2003).
PKWARE, "Appnote.txt," Version 5.2.4 (Jan. 12, 2004).
PKWARE, "Appnote.txt," Version 6.2.0 (Apr. 26, 2004).
Office Action dated Dec. 28, 2009; for U.S. Appl. No. 10/946,454, filed Sep. 20, 2004.
Office Action dated Feb. 2, 2010; for U.S. Appl. No. 10/945,352, filed Sep. 20, 2004.
Office Action dated Feb. 1, 2010; for U.S. Appl. No. 10/945,292, filed Sep. 20, 2004.
Office Action dated Nov. 19, 2009; for U.S. Appl. No. 11/358,002, filed Feb. 21, 2006.
Office Action dated Jan. 14, 2010; for U.S. Appl. No. 11/358,844, filed Feb. 21, 2006.
Office Action dated Dec. 3, 2009; for U.S. Appl. No. 11/358,518, filed Feb. 21, 2006.
Office Action dated Nov. 3, 2009; for U.S. Appl. No. 11/358,324, filed Feb. 21, 2006.
Office Action dated Feb. 18, 2010; for U.S. Appl. No. 11/358,318; filed Feb. 21, 2006.
Office Action dated Feb. 22, 2010; for U.S. Appl. No. 10/946,250; filed Sep. 20, 2004.
Office Action dated Feb. 22, 2010; for U.S. Appl. No. 10/943,270; filed Sep. 17, 2004.
Office Action dated Mar. 11, 2010; for U.S. Appl. No. 11/358,839; filed Feb. 21, 2006.
Office Action dated Apr. 29, 2010; for U.S. Appl. No. 11/588,866; filed Oct. 26, 2006.
Advisory Action dated Jul. 7, 2010; for U.S. Appl. No. 10/943,270; filed Sep. 17, 2004.
Office Action dated Jul. 7, 2010; for U.S. Appl. No. 11/358,844; filed Feb. 21, 2006.
Office Action dated Aug. 17, 2010; for U.S. Appl. No. 11/358,324; filed Feb. 21, 2006.
Office Action dated Aug. 24, 2010; for U.S. Appl. No. 10/945,292; filed Sep. 20, 2004.
Office Action dated Aug. 25, 2010; for U.S. Appl. No. 10/945,352; filed Sep. 20, 2004.
Office Action dated Sep. 16, 2010; for U.S. Appl. No. 101943,270; filed Sep. 17, 2004.
Denning, "Cryptography and Data Security," 1982, Addison-Wesley, pp. 92-98.

* cited by examiner

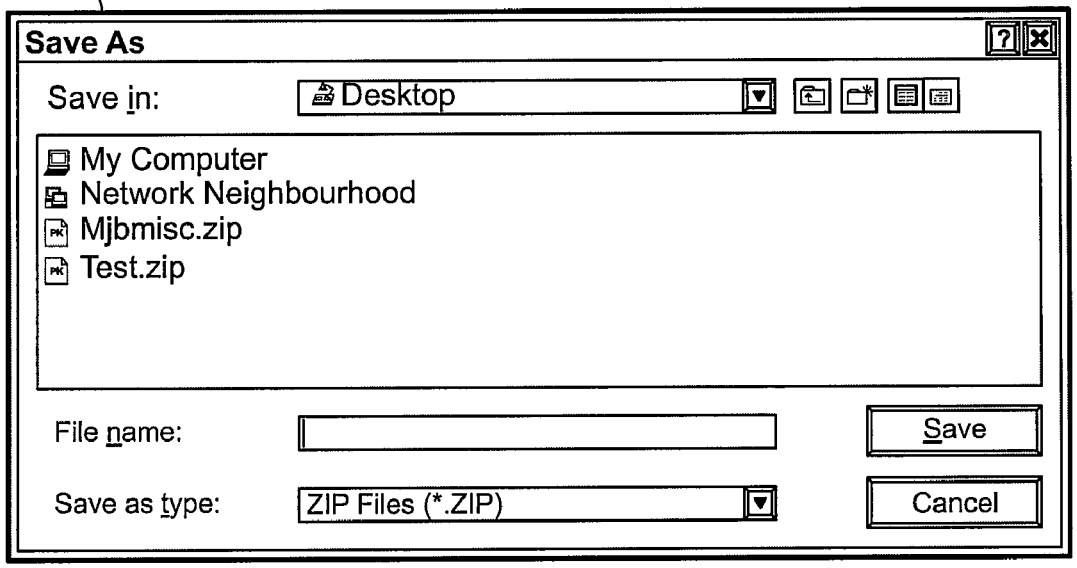

FIG. 5

| Button: | Description: |
|---|---|
| 💾 | Save the contents of the .ZIP file. |
| ▷▷ | Add file(s) via the Extract dialog. |
| ➕ | Add file(s) via the Add dialog. |
| ✓ | Display Log file. Green color indicates that previous PKZIP Explorer operation completed without errors. |
| ✗ | Display Log file. Red color indicates that errors were encountered during the previous PKZIP Explorer operation. |
| ✎ | Invoke the Options/Properties tab dialog where you may specify several PKZIP Explorer configuration parameters. |

FIG. 6A

| Item (Menu): | Description: |
|---|---|
| Test (File) | Test the contents of the .ZIP file. |
| Extract (File) | Extract file(s) via the Extract dialog. |
| Add (File) | Add file(s) via the Extract dialog. |
| Save (File) | Save the contents of the .ZIP file. |
| Save As (File) | Save the contents of the .ZIP file to another file and open that file in PKZIP Explorer. |
| Save Copy As (File) | Save the contents of the .ZIP file to another file but remain in the current PKZIP Explorer window. |
| Columns (View) | Specify which information columns (e.g. CRC32) you want PKZIP Explorer to display in the right pane. |
| Show Log (View) | Invoke the Log dialog. |
| PKZIP Options (View) | Invoke the Options/Properties tab dialog where you may specify several PKZIP Explorer configuration parameters. |

FIG. 6B

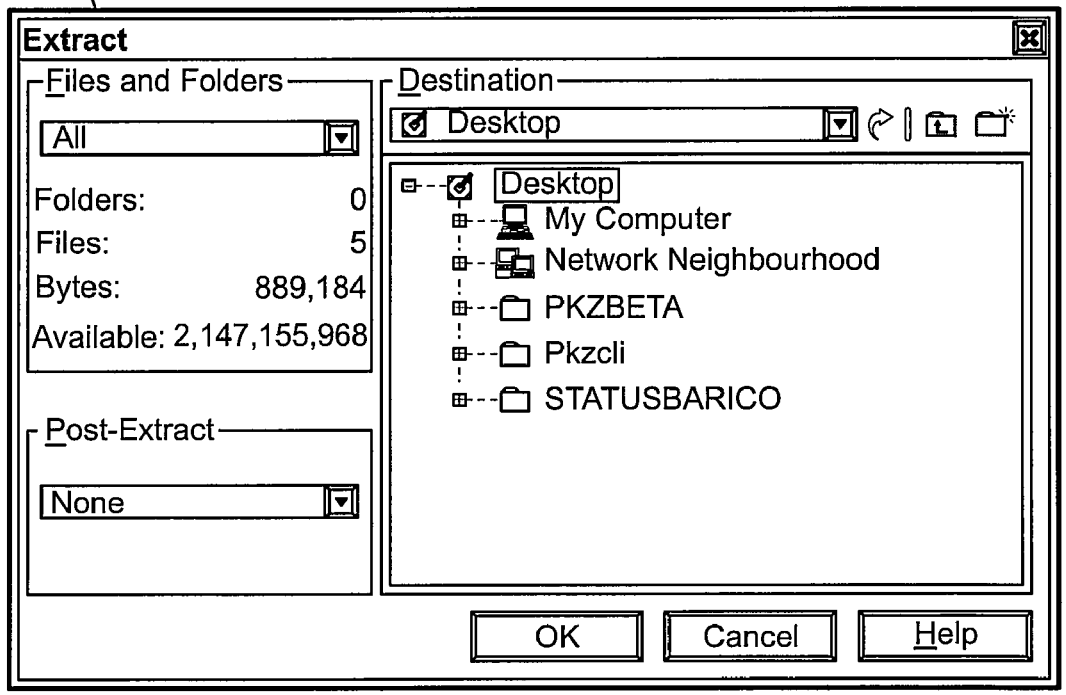

FIG. 7

SYSTEM AND METHOD FOR MANIPULATING AND MANAGING COMPUTER ARCHIVE FILES

RELATED APPLICATIONS

This application is a continuation-in-part of U.S. patent application Ser. No. 10/970,897, filed Oct. 21, 2004 now abandoned, which is a continuation of U.S. patent application Ser. No. 09/803,355, filed Mar. 9, 2001, issued Apr. 12, 2005 as U.S. Pat. No. 6,879,988, which claims the benefit of U.S. Provisional Application No. 60/187,969, filed Mar. 9, 2000. This application is also a continuation-in-part of U.S. patent application Ser. No. 10/620,960, filed Jul. 16, 2003 now abandoned.

BACKGROUND OF THE INVENTION

The present invention generally relates to systems and methods for archiving files. More particularly, the present invention relates to systems and methods for providing an archive management application that operates with a host application to allow a user to access an archive and/or modify a file in an archive using the host application.

The archiving of computer files has been known in the art for many years. Archiving typically involves the practice of aggregating one or more computer files into a single file called an archive. Often, but not always, the single archived file is compressed so that the archive file is smaller in size than the original file or files placed in the archive. Many formats of archives are currently available. One popular archive format is the .ZIP format, a portable archive format for forming an archive including one or more files. The .ZIP format and other archive formats are recognized by various types of applications such as file management applications (such as Microsoft Windows Explorer), internet enabled applications (such as Microsoft Internet Explorer), email applications (Microsoft Outlook), and instant messaging applications (AOL Instant Messenger).

Many applications designed to increase user productivity, organize or manage information, provide for entertainment, or for other purposes are available today. These applications are generically called "productivity applications." Several productivity applications currently recognize the .ZIP format and other archive formats and it is also desirable that future productivity applications have the capacity to recognize files in the .ZIP format. Such productivity applications may include programs allowing a user to perform word processing and document publishing (such as Microsoft Word), database management (such as Microsoft Access), presentation and project management (such as Microsoft PowerPoint) and/or spreadsheet creation application (such as Microsoft Excel).

Applications that recognize .ZIP archives and other archive formats may run, perform, operate, and/or be stored on various types of devices. In one example, the device may be a laptop or desktop computer. Another example of such a device is a Personal Digital Assistant (PDA), such as a PalmPilot or RIM Blackberry, for example. Another example of such a device is a wireless communication device such as a cell phone. Another example of such a device is a portable device such as a portable music device, such as an ipod®. Another example of such a device is a gaming device. Another example of such a device is an electronic game device. Another example of such a device is a portable storage device, such as a USB drive. Another example of such a device is a cable or satellite television system device, such as a cable or satellite television receiver. Another example of such a device is a digital image capture device such as a digital camera.

Archive size may be a concern when using devices that support applications that recognize .ZIP archives and other archive formats. Devices with limited storage space and networks with limited bandwidth make it desirable for archives to be smaller and thus more efficient to store and transfer. Thus, many archive formats, such as the .ZIP format, include compression functions to reduce the size of files in an archive. However, improved methods and systems for providing compression are needed as digital storage and transmission requirements increase.

Devices that support applications that recognize .ZIP archives and other archive formats may be used to store archives and/or transfer archives to another device. However, files in archives may contain sensitive information. Thus, many archive formats, such as the .ZIP format, include optional security operations to protect files. An example of such a security operation is encryption. Another example of such a security function is verification of file origin and identity using digital signatures.

Standard encryption and digital signing are known in the art, however, improved methods and systems for providing security are desirable in the continuing effort to prevent unauthorized access to data.

Although many applications recognize archives, such applications are not currently able to access an archive or modify files in an archive. Instead, when an archive is selected, a standalone archive management application is initiated or launched. Once the archive management application has been initiated, the user is operating inside the standalone archive management application. In many cases the standalone archive management application must be separately launched by the user, thereby increasing the number of steps that must be performed by the user in order to access the files contained within the archive. The standalone archive management application must typically also be launched to encrypt/decrypt files, to digitally sign/authenticate files and/or to compress/decompress files, for example. Launching the standalone archive management application may delay access to an archive, create an undesirable user experience, and impede the productivity of the user or system, and in some cases involving security functions, make files more vulnerable to security breaches.

Some products have been developed that are aimed at providing a user with improved ease of interaction with files. Several such products are used in the Windows operating system environment. For example, in the Windows environment, Windows Explorer may be used to browse directories, files and folders. In connection with Windows Explorer, Microsoft provides an application program interface (API) that allows software developers to write applications that operate with Windows Explorer.

Several companies have developed programs for compressing and uncompressing files using the Windows Explorer interface. However, none of these products are able to access the contents of an archive directly or to modify files in an archive directly. Some of these products include: Arj-Folder by Raphael Mounier; Cab Viewer by Microsoft Corporation; CleverZip by Cleverness, Inc.; Zip Explorer Pro by Aeco Systems; Internet Neighborhood by KnoWare, Inc.; Net Explore; ZipMagic by Mijenix Corporation (recently acquired by Allume); and Netzip Classic by Netzip, Inc. (now owned by RealNetworks). The Internet Neighborhood and Net Explore products are file transfer protocol (FTP) products that integrate FTP sites into Windows Explorer. ZipMagic is a device driver product and NetZIP Classic is a standalone program that runs outside of the Windows Explorer application.

However, the above-identified programs do not fully serve the needs of today's users. For example, utilization of the above-identified programs may negatively impact system performance and/or the user interfaces employed by the programs may be counterintuitive and/or confusing to users. Further, the prior art programs do not provide a user with the ease of being able to directly access the contents of an archive or interact with files inside an archive while remaining inside their Windows application environment.

FIG. 12 illustrates examples of the interaction of several prior art file archiving programs with the Windows Explorer 1210. One example of such a program is the WinZIP program, as described in the "WinZIP" Announcement, Nico Mak Computing, Inc., 1995, pp. 1-106.

As shown in FIG. 12, the WinZIP program includes a WinZIP application 1220. The WinZIP application 1220 is a data compression application for creating, viewing, or modifying .ZIP archives. The WinZIP application 1220 allows a user to start the WinZIP application 1220 from within the Windows Explorer 1210. Starting the WinZIP application 1220 from within the Windows Explorer 1210 may cause it to appear to the user as though the WinZIP application 1220 is operating within the Windows Explorer 1210. However, as further described below, the user does indeed leave the Windows Explorer 1210. Starting the WinZIP application 1220 from within the Windows Explorer 1210 saves the user the steps of leaving the Windows Explorer 1210 to start the WinZIP application 1220 from another Windows prompt or menu, but the WinZIP application 1220 does not run within the Windows Explorer 1210.

In operation, when a user selects a file for decompression, the WinZIP application 1220 starts and runs as an additional application external to the Windows Explorer 1210. The selected file is passed from the memory address space of the Windows Explorer 1210 to the memory address space of the WinZIP application 1220. Within the memory address space of the WinZIP application 1220, the selected file is available to the user using the WinZIP window, toolbar, and menu functions. The WinZIP window, menu, and toolbar functions are separate from the window, toolbar and menu functions of the Windows Explorer 1210. That is, the WinZIP application 1220 does not operate within the Windows Explorer 1210.

The user may interact with the WinZIP application 1220 to create, view, or modify .ZIP archives or files within .ZIP archives. Files created or modified using the WinZIP application 1220 are saved by the WinZIP application 1220 to the file storage system of the underlying Windows operating system, but the WinZIP application 1220 does not pass files to the memory address space of the Windows Explorer 1210. Once the user is finished interacting with the WinZIP application 1220 to create, view, or modify .ZIP archives, the WinZIP application 1220 terminates.

Another example of a prior art file archiving program is the ZIPMagic program. As shown in FIG. 12, the ZIPMagic program includes a ZIPMagic application 1230 and a ZIPMagic device driver 1240. The ZIPMagic device driver 1240 is described in Kronenberg et al. (U.S. Pat. No. 5,907, 703). The ZIPMagic application 1430 operates like the WinZIP application 1320, as described above.

The ZIPMagic device driver 1240 operates at a lower operating level than the application level of the ZIPMagic application 1230 and the Windows Explorer 1210. The ZIPMagic device driver 1240 communicates with the Windows Explorer 1210. More particularly, the ZIPMagic device driver 1240 makes .ZIP archives appear as folders in the Windows Explorer 1210. That is, to a user, .ZIP archives are indistinguishable from standard Windows Explorer folders and no indication is provided to the user that what appears to be a folder is actually a .ZIP archive.

In operation, when a user double clicks on a .ZIP archive that the ZIPMagic device driver 1240 has disguised to look like a folder in Windows Explorer 1210, the ZIPMagic device driver 1240 first operates to recognize that the folder is really a .ZIP archive. Next, the ZIPMagic device driver 1240 transparently presents the files within the .ZIP archive to the Windows Explorer 1210 as though they are not compressed and that they are contained in a standard Windows Explorer folder. When a user selects a file visible from the Windows Explorer 1210 to interact with, the ZIPMagic device driver 1240 transparently decompresses the file outside of the Windows Explorer 1210 and passes a decompressed copy of the file to the Windows Explorer 1210 for the user to use. A user may then interact with the decompressed copy of the file in any manner in which a decompressed file that is not within a .ZIP archive may be used. For example, the user may copy or move the file using the Windows Explorer 1210 and the user may open the file with another application to view or modify the files contents. The user may not interact with the file as though it is part of a .ZIP archive. Once the user is finished interacting with the uncompressed file it may be compressed outside of the Windows Explorer 1210 by the ZIPMagic device driver 1240.

Thus, the ZIPMagic program serves as a useful tool for automating the typical steps of adding files to folders and then .ZIP-ing the folder. However, the ZIPMagic program does not allow direct interaction with a .ZIP archive within the Windows Explorer 1210.

Thus, all of the prior art file archiving programs operate externally from Windows Explorer. The WinZip and ZipMagic applications are external to Windows Explorer and communicate with Windows Explorer at the application level. The Zip Magic Device Driver is also external to Windows Explorer, but communicated with Windows Explorer at the driver level. Consequently, all of the above file archiving programs operate by leaving the Windows Explorer environment.

Thus, there is a need for an improved system and method for accessing archives and modifying files in archives to overcome the problems and shortcomings of the current state of the art. A need is especially felt for a system that provides a user with access to the contents of an archive file, and the ability to interact with the contents of an archive file, without leaving the windows environment.

BRIEF SUMMARY OF THE INVENTION

Certain embodiments of the present invention provide a system and method for accessing an archive and/or modifying files in an archive. More particularly, certain embodiments of the present invention provide an archive management application that operates with a host application to provide access to an archive and/or allow modification of files in an archive using the host application.

In an embodiment of the present invention, a file archiving system may include a user interface component, a file management component and a compression/extraction engine component including a compression engine and an extraction engine. The user interface component may include an enhanced user interface of a host application that provides an interface for a user. The file management component may include a central directory that provides a representation of the contents of an archive. The compression/extraction engine component that may include a file size module and/or a security module. The file size module may be used to compress and/or decompress a file in an archive. The security module may be used to encrypt, decrypt, digitally sign and/or authenticate a file in an archive.

In an embodiment of the present invention, a method for accessing an archive and/or modifying files in an archive may include providing an archive management application that operates with a host application to provide access to an archive and/or allow modification of a file in an archive using the host application. Modification of a file in an archive may include compressing the file, decompressing the file, encrypting the file, decrypting the file, digitally signing the file and/or authenticating the file, for example.

These and other features of the present invention are discussed or apparent in the following detailed description of certain embodiments of the invention.

BRIEF DESCRIPTION OF SEVERAL VIEWS OF THE DRAWINGS

FIG. 5 displays a save as dialog screen used in accordance with an embodiment of the present invention;

FIG. 6A displays a table of toolbar buttons used in accordance with an embodiment of the present invention;

FIG. 6B displays a table of menu items used in accordance with an embodiment of the present invention;

FIG. 7 displays an extract dialog screen used in accordance with an embodiment of the present invention;

DETAILED DESCRIPTION

Embodiments of the present invention relate to a system and method for providing an archive management application that operates within a host application, such as the Windows Explorer, to allow a user to access an archive and/or modify a file in an archive using the host application or without exiting the host application.

Figure 13:
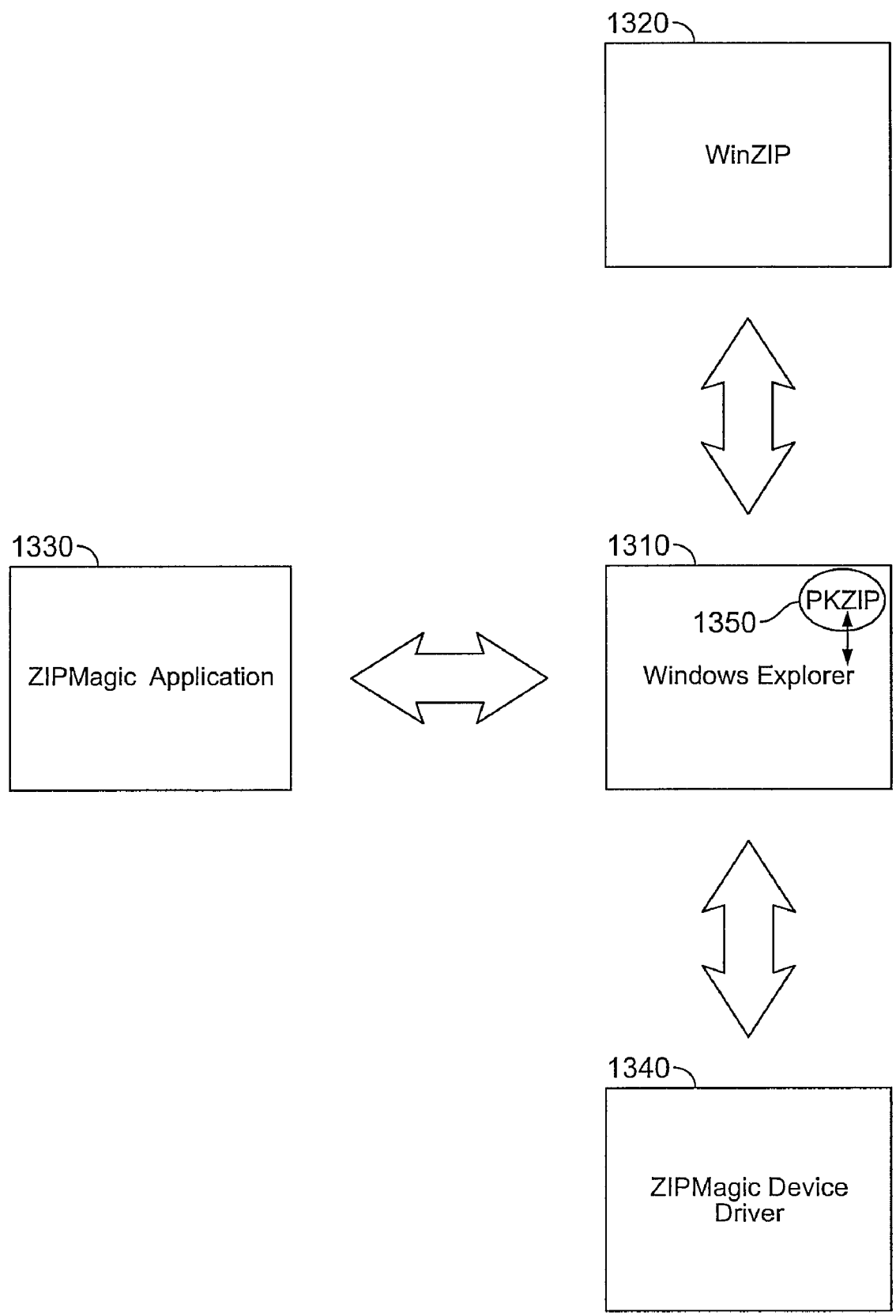
FIG. 13 illustrates examples of the interaction of several prior art file archiving programs with the Windows Explorer 1210 as well as a representation of the interaction of an embodiment of the present invention with Windows Explorer.

FIG. 13 illustrates examples of the interaction of several prior art file archiving programs with the Windows Explorer 1210 as well as a representation of the interaction of an embodiment of the present invention with the Windows Explorer 1210. The interaction of the WinZip and ZipMagic applications and the ZipMagic device driver with Windows Explorer is described in the Background section above. As noted in the background, all of these prior art systems operate outside the Windows Explorer environment.

As opposed to these prior art systems, the improved file management application provided by embodiments of the present invention operates within the Windows Explorer environment, as illustrated in FIG. 13. That is, for example, a user may start the PKZIP program 1350 inside of Windows Explorer 1310 to view, create, or modify .ZIP archives or files within .ZIP archives. No new application external to Windows Explorer needs to be initiated, as is required by the WinZip and ZipMagic applications. Nor is there a need to rely on a device driver external to Windows Explorer, as required by the ZipMagic Device Driver.

Additionally, in the PKZIP program, files selected by a user for compression or decompression may be stored inside of the memory address space of the Windows Explorer 1310. Further, the user may interact with the window, toolbar, and/or menu functions of the Windows Explorer 1310. More particularly, the PKZIP program 1350 may enhance the window, toolbar, and/or menu functions of the Windows Explorer 1310.

An archive is a portable file that may contain one or more files and/or folders. Files in archives may be compressed to reduce archive size. A portable file is a file in a format that allows the file to be transmitted from one device to another so that the file and its contents can be used on the second device. The first and second device need not be running the same operating system or application programs. Files in archives may be encrypted, and/or digitally signed to provide security. Various types of archiving software are available that may be used to create archives of various types. One archive format is the .ZIP format. Another archive format is the .ARJ format. Other archive formats are available, as known to those skilled in the art.

Embodiments of the present invention may be compatible with archives in the .ZIP format, .ARJ format, or with other archive formats, as known to those skilled in the art.

An embodiment of the present invention may convert an archive in the .ARJ format into the .ZIP format. An embodiment of the present invention may convert an archive in the .ZIP format into the .ARJ format. Other embodiments of the present invention may convert archives of various formats into archives of various other formats, as known to those skilled in the art.

Figure 1:
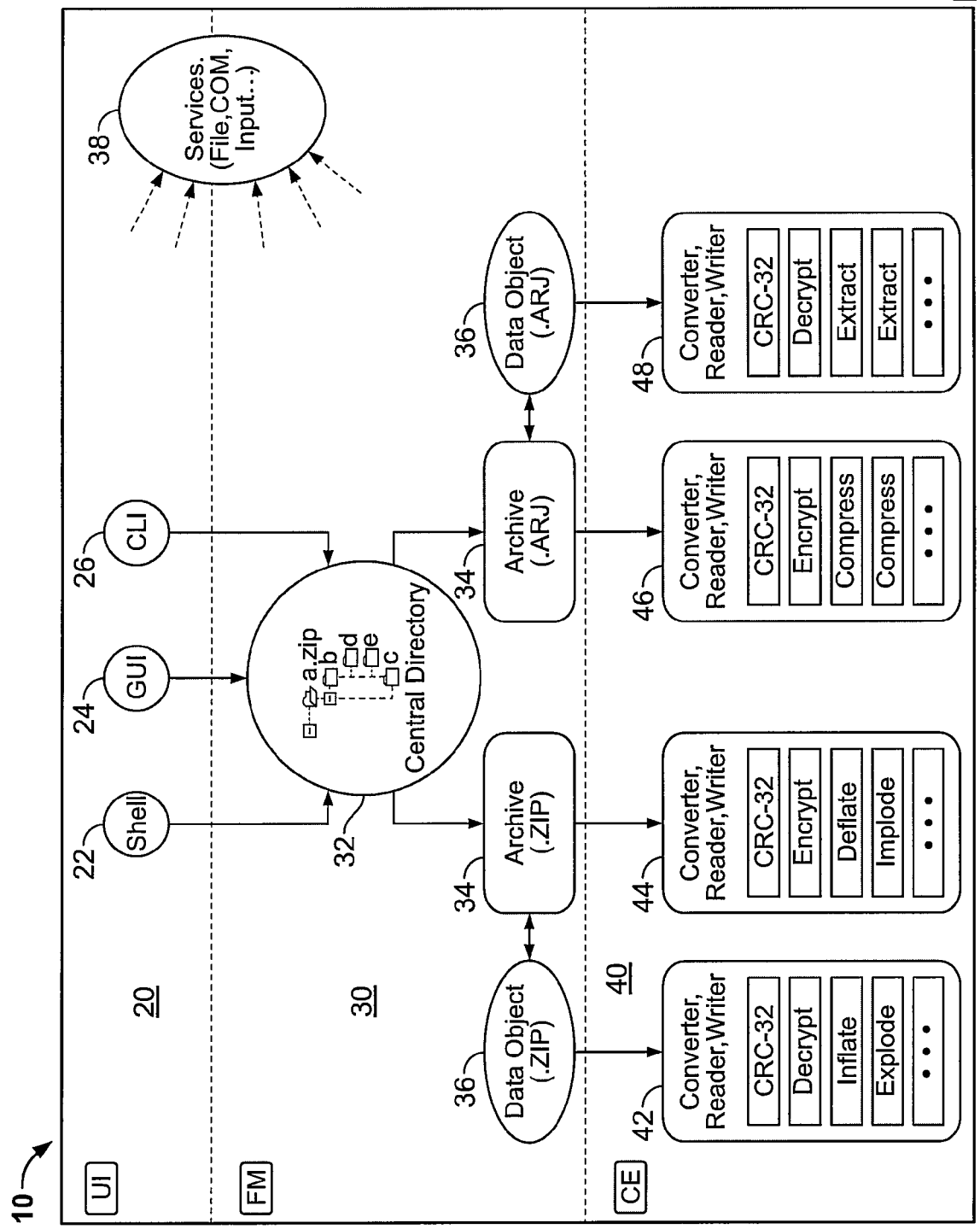
FIG. 1 is a diagram illustrating components used in accordance with an embodiment of the present invention.

FIG. 1 is a diagram illustrating components of a system 10 used in accordance with an embodiment of the present invention. In the system 10, an archive management application, such as a .ZIP archive management application, may operate with a host application to allow access to an archive and/or modification of files in an archive using the host application or without exiting the host application, for example. Such a host application may have an application program interface (API) that allows an archive management application to operate with the host application.

In the system 10, there are three components, a user interface (UI) component 20, a file management (FM) component 30, and a compression/extraction engine (CE) component 40. In the system 10, the user interface component 20 interfaces with the file management component 30 and the file management component 30 interfaces with the compression/extraction engine component 40. The compression/extraction engine component 40 includes both a compression engine and an extraction engine. When compression is desired, the compression/extraction engine component 40 employs its compression engine. Conversely, when extraction is desired, the compression/extraction engine component 40 employs its extraction engine.

In the system 10, the user interface component 20 includes a graphical user interface (GUI) 24 and/or a command line interface (CLI) 26 of a host application. The host application may be a file management application, an internet enabled application, an email application, an instant messaging application, or other application, as further discussed later in the specification, for example.

The user interface component 20 may use a services object 38 to interface with the file management component 30. The services object 38 may act as a helper interface between the user interface component 20 and the file management component 30. The services object 38 may be called by the user interface component 20 or the file management component 30 whenever use of the services object 38 is desired. As one example, the services object 38 may be a COM object. A COM object is a software component that conforms to Microsoft's Component Object Model. The services object 38 may alternatively be a JAVA component or JAVA Bean, a .NET object, a CORBA object, a web service, a DLL, or a library. The services object may take other forms, as known to those skilled in the art.

The file management component 30 includes a central directory 32. The central directory 32 holds a cached tree-like structure of an archive. The cached tree-like structure of an archive is independent of archive format. The central directory 32 includes folder objects and data objects 36. Actual archive implementation may be used by the central directory 32, for example, to read and/or write data to archives 34 and the user interface 20. The actual archive implementation may follow the format of an archive in the .ZIP format, for example. The .ZIP format is described in an APPNOTE published by PKWARE, the assignee of the present patent application, which documents the records and fields that make up a .ZIP archive. A copy of the APPNOTE may be found at http://www.pkzip.com/company/standards/appnote/.

The file management component 30 and the compression/extraction engine component 40 may pass, exchange, or transfer files, data exchange formats, and/or other information back and forth as files, data objects and/or other data types, as known to those skilled in the art.

In the system 10, the compression/extraction engine component 40 includes a file size module, a security module and CRC-32 module. The file size module includes the compression engine and the extraction engine and may be used to compress and/or uncompress files. In an embodiment of the present invention, a compressed file may be passed to the compression/extraction engine component 40 from the file management component 30. The compression/extraction engine component 40 may then use the extraction engine of the file size module to decompress the file. Conversely, an uncompressed file may be passed to the compression/extraction engine component 40 from the file management component 30. The compression/extraction engine component 40 may then use the compression engine of the file size module to compress the file.

The file size module may be configurable to support various compression and/or decompression settings, as further discussed later in the specification, for example.

The security module may be used to encrypt and/or decrypt files. In an embodiment of the present invention, an encrypted file may be passed to the compression/extraction engine component 40 from the file management component 30. The compression/extraction engine component 40 may then use a decryption engine in the security module to decrypt the file. Conversely, an unencrypted file may be passed to the compression/extraction engine component 40 from the file management component 30. The compression/extraction engine component 40 may then use an encryption engine in the security module to encrypt the file.

The security module may also be used to digitally sign and/or authenticate files. In an embodiment of the present invention, a digitally signed file may be passed to the compression/extraction engine component 40 from the file management component 30. The compression/extraction engine component 40 may then use the security module to authenticate the file. Conversely, an unsigned file may be passed to the compression/extraction engine component 40 from the file management component 30. The compression/extraction engine component 40 may then use the security module to digitally sign the file.

The security module may be configurable to support various security settings, as further discussed later in the specification, for example.

Figure 2A:
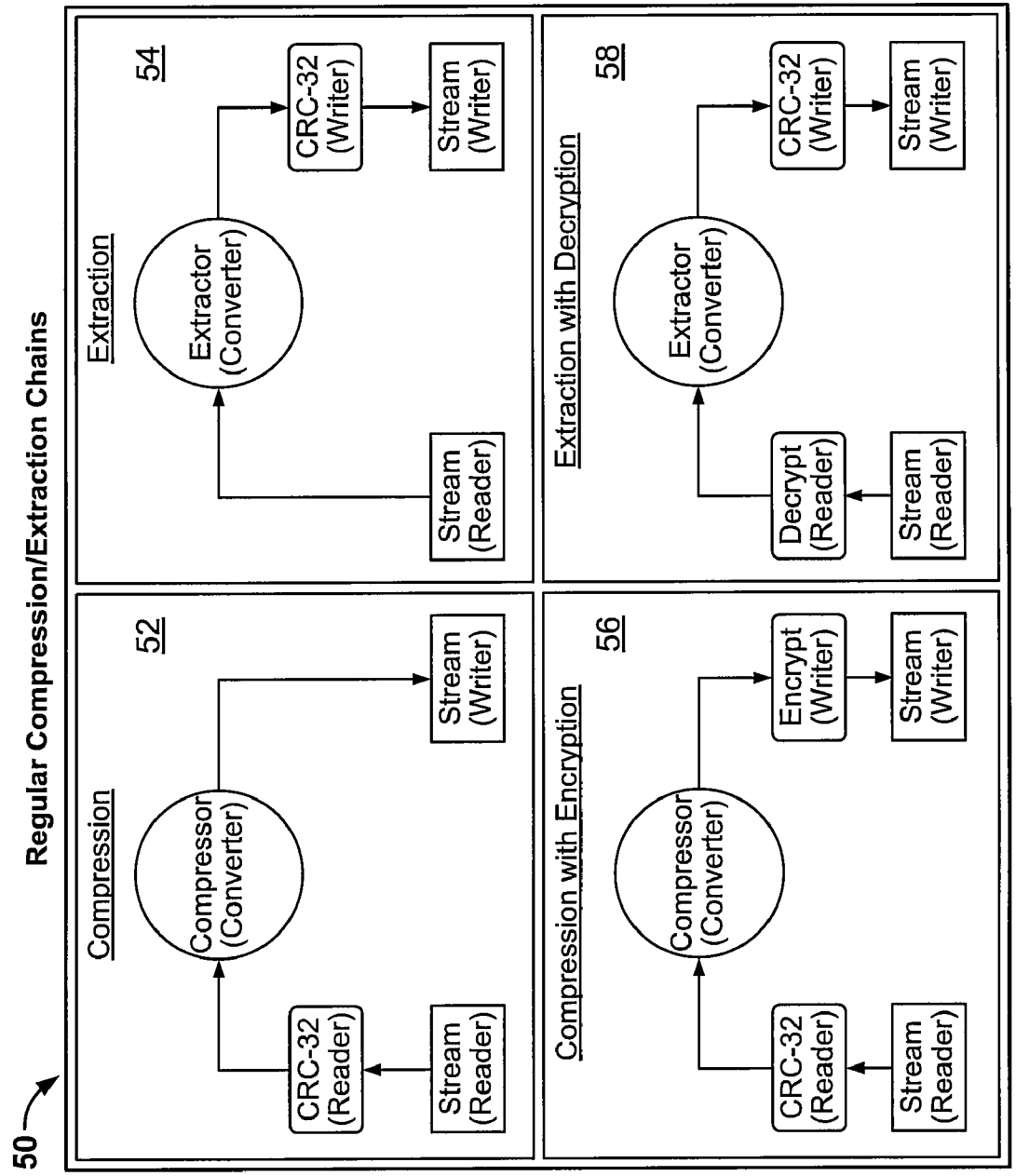
FIGS. 2A-2E are diagrams illustrating compression and extraction chains used in accordance with an embodiment of the present invention.
Figure 2B:
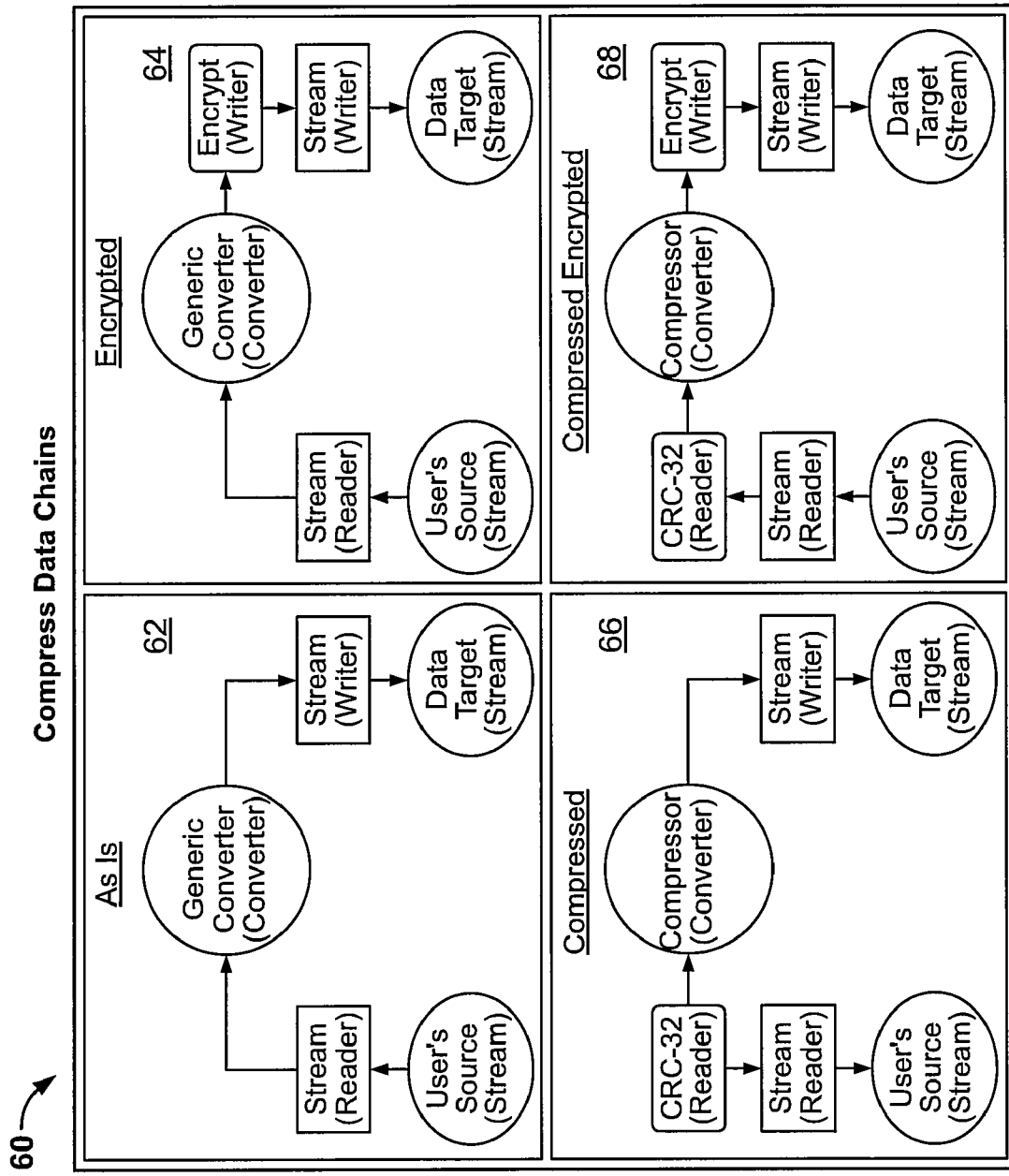
Figure 2C:
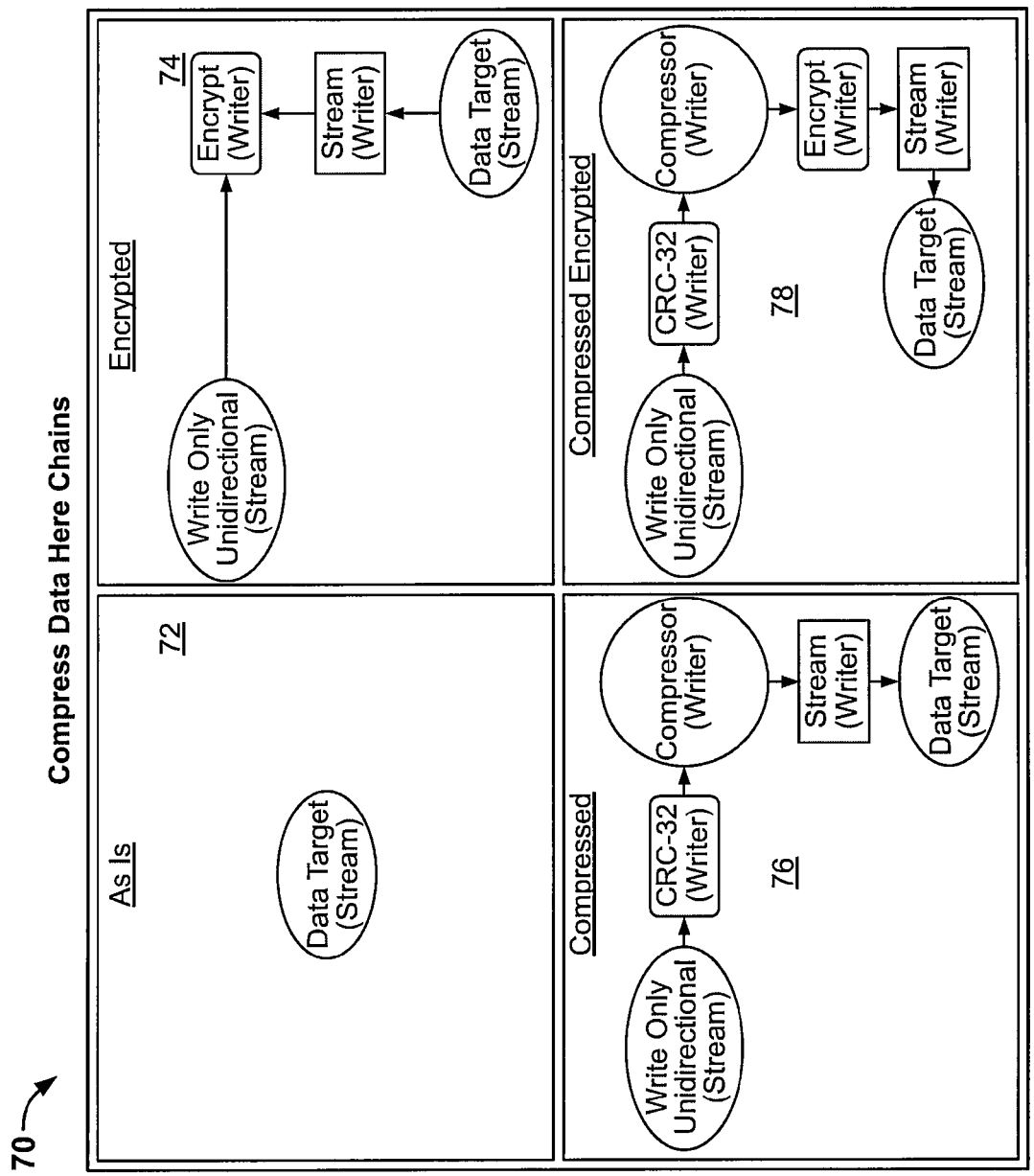
Figure 2D:
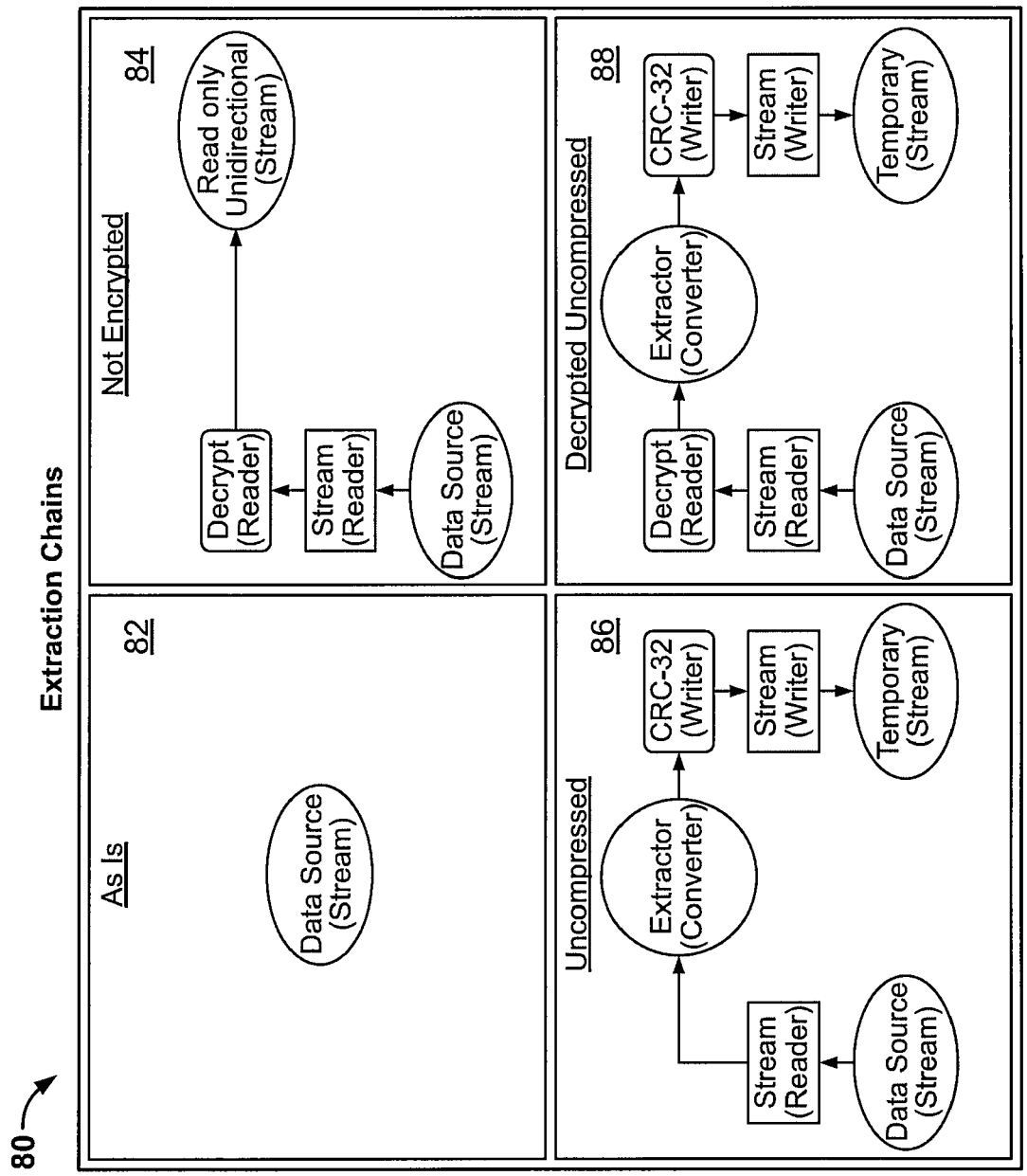
Figure 2E:
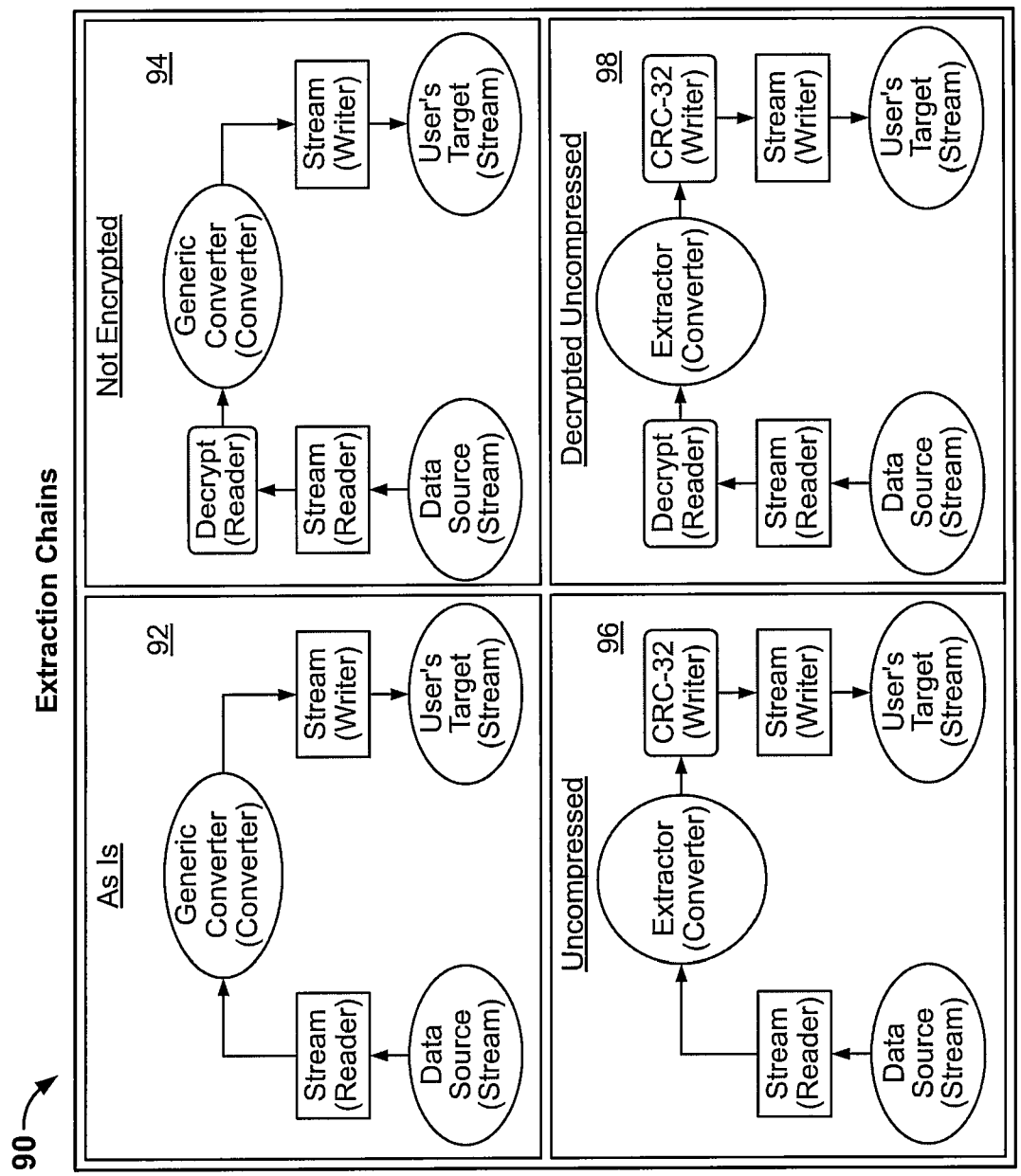

The file size module and the security module may be configured in various ways to support various techniques for compressing and/or extracting files in an archive. FIGS. 2a-2e illustrate different compression and extraction techniques that may be used in embodiments of the present invention. In FIG. 2a, regular compression and extraction chains are shown. In FIG. 2b, compression data chains are shown, including the use of a generic converter involving no compression. FIG. 2b also shows compression chains with encryption 56. In FIG. 2c, data compression chains are shown. In FIG. 2d, data extraction chains are shown. In FIG. 2e, data extraction chains are shown. FIG. 2d also shows data extraction chains with decryption 88.

The CRC-32 module may be used to provide error detection. In one embodiment of the present invention, a compressed file may be passed to the compression/extraction engine component 40 from the file management component 30. The compression/extraction engine component 40 may then use the CRC-32 module to detect any damage or corruption that may have occurred in the file. Conversely, an uncompressed file may be passed to the compression/extraction engine component 40 from the file management component 30. The compression/extraction engine component 40 may then use the CRC-32 module to calculate a cyclic redundancy check value for the file. The cyclic redundancy check value may then be used when the file is decompressed to detect the presence of any damage or corruption in the data.

In an embodiment of the present invention, when files are transferred from a host application to an archive, the archive requests available data exchange formats to compress and/or encrypt the data. Similarly, when files are transferred from an archive to a host application, the host application requests available data exchange formats to uncompress and/or decrypt the data.

In an embodiment of the present invention, the data object 36 may support one or more data exchange formats as supported by a host application. The data object 36 may also support one or more custom data exchange formats for exchanging data that is compressed, not compressed, encrypted, or not encryption. Examples are .ZIP archives that are compressed and not encrypted, .ZIP archives that are compressed and encrypted, .ZIP archives that are not compressed, ARJ archives that are compressed and/or encrypted, LZH archives that are compressed or encrypted, CAB archives, XML data, RAR archives that are compressed and/or encrypted TAR archives, and/or PGP data that is compressed and/or encrypted. Additional examples of data exchange formats for compressed data are data compressed using algorithms such as Deflate, Deflate64, BZIP2, DCL Implode, GZIP, LZMA, LZW, PPMII, PPMZ, PPMD, and others. Additional examples of data exchange formats for encrypted data are data that is encrypted using algorithms such as AES, 3DES, DES, RC2, RC4, RC5, RC6, CAST5, IDEA, Blowfish, Twofish, RSA, DSA, Elliptic Curve, MD5, SHA and others. Other custom data exchange formats that may be supported by the data object 36 may be used, as known to those skilled in the art.

In an embodiment of the present invention, the compression/extraction engine component 40 and the file management component 30 may form data compression library modules that may be used to build applications. Some of these applications may require compression and file management that are compatible with specific archive formats, such as the .ZIP format.

The components of the system 10 may be written or coded using programming language in use today, or that may be used in the future. Compiled languages that convert computer source code into machine or object code may also be used. Alternatively, the file management application may operate using a language interpreter so that interpreted languages that execute program source code line by line or that convert or process source code into bytecode may be used. The language interpreter may also process scripted programming languages. Further, compiled or interpreted languages may be software based so that they execute within software or may be hardware based so that they run directly within hardware. For example, the components may be written in C/C++, JAVA, NET, C# (C-Sharp), as well as other programming languages, as known to those skilled in the art.

The components of the system 10 may be implemented as objects using standard object formats in use today, or that may be used in the future. For example, the components may be local or remote objects that are COM objects, CORBA objects, JAVA components or JAVA Beans, .NET objects, web services, dynamic libraries such as DLL's, or static libraries.

The components of the system 10 may be implemented in connection with various devices that run various operating systems. For example, as further discussed later in the specification, the archive management application may operate with a host application that runs on a personal computer, a Portable Digital Assistant (PDA), a cell phone, a portable music device, a gaming device, an electronic game device, a portable storage device, a cable or satellite television system device, and/or a digital image capture device. It may be desirable to implement the components of the system in connection with other devices that run host applications, as known to those skilled in the art.

User Interface Component

In an embodiment of the present invention, the user interface (UI) of a host application may be enhanced to allow access to an archive and/or modification of files in an archive using the host application without initiating a separate stand-alone program. The user interface (UI) of a host application may include enhanced dialogs, context menus, pull-down menus toolbars windows, frames, borders, command parameters or options, tabs, buttons, icons, images, and/or lists, for example. The user interface (UI) of a host application may be enhanced in other ways, as known to those skilled in the art. A host application with an enhanced user interface may also be referred to as an enhanced version of the host application.

Figure 3:
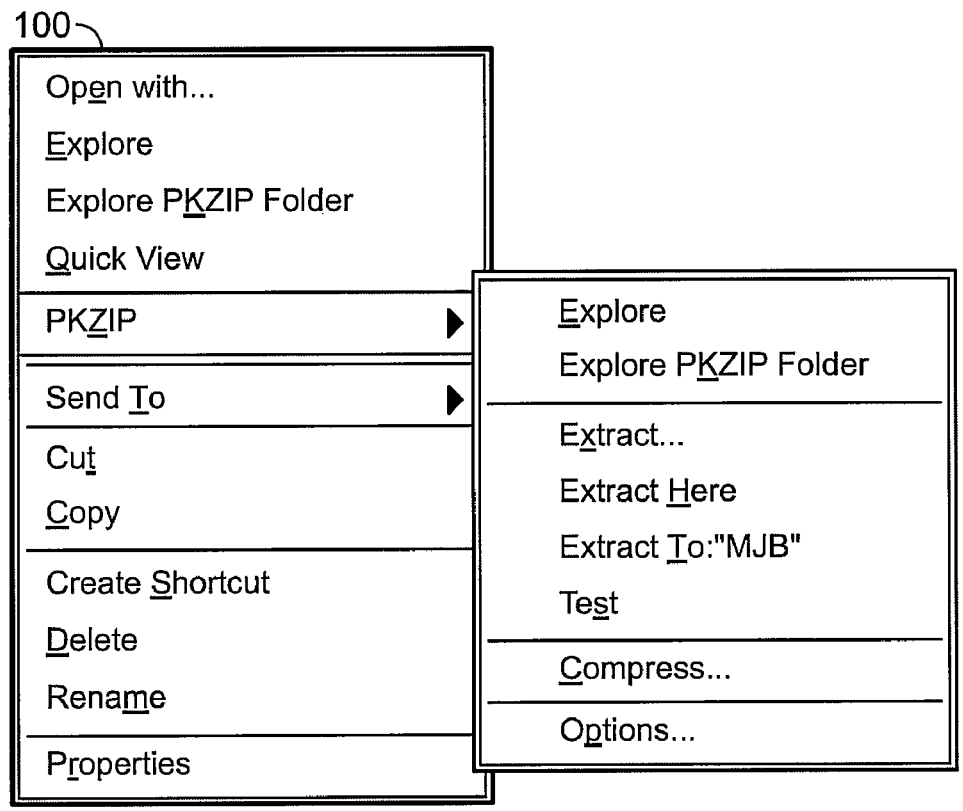
FIG. 3 displays a context menu used in accordance with an embodiment of the present invention.
Figure 8:
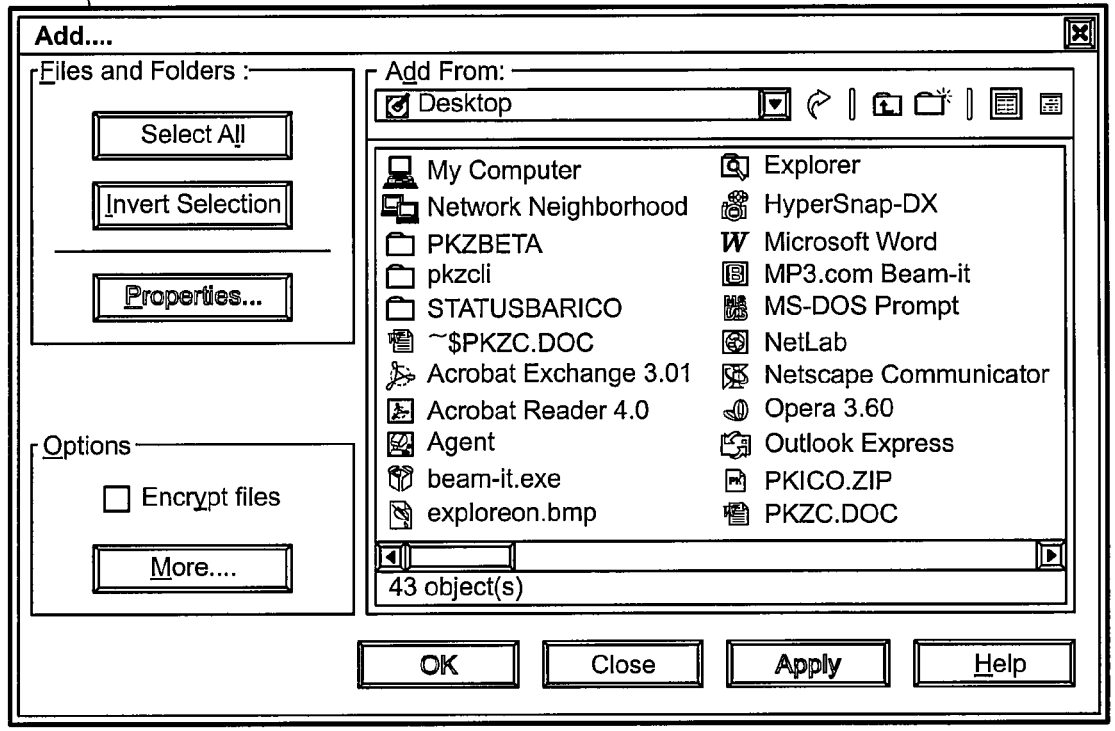
FIG. 8 displays an add dialog screen used in accordance with an embodiment of the present invention.
Figure 9:
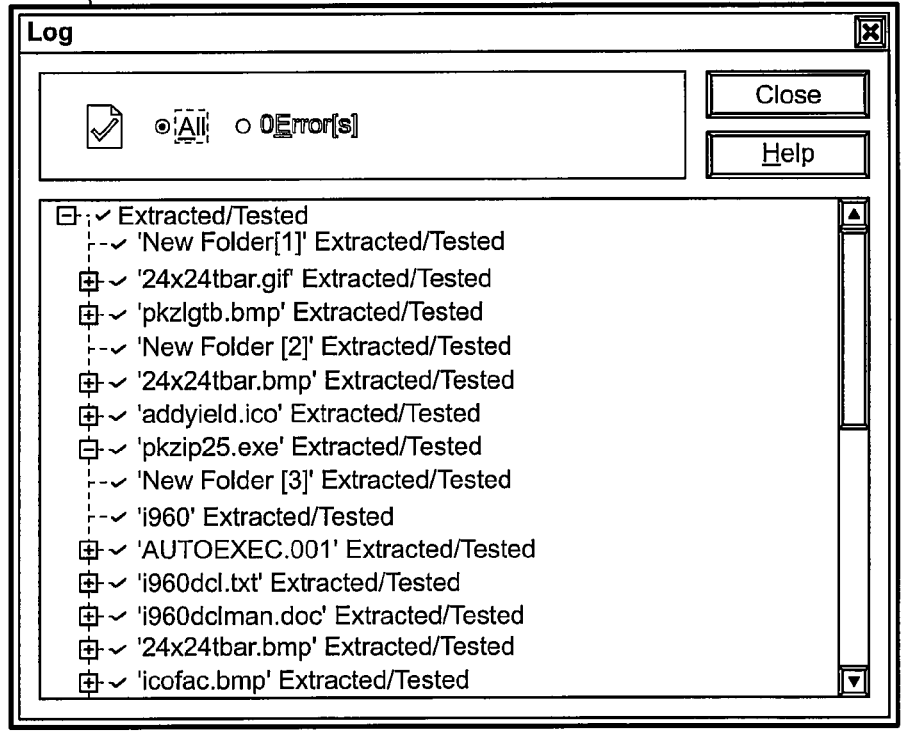
FIG. 9 displays a log dialog screen used in accordance with an embodiment of the present invention.
Figure 10A:
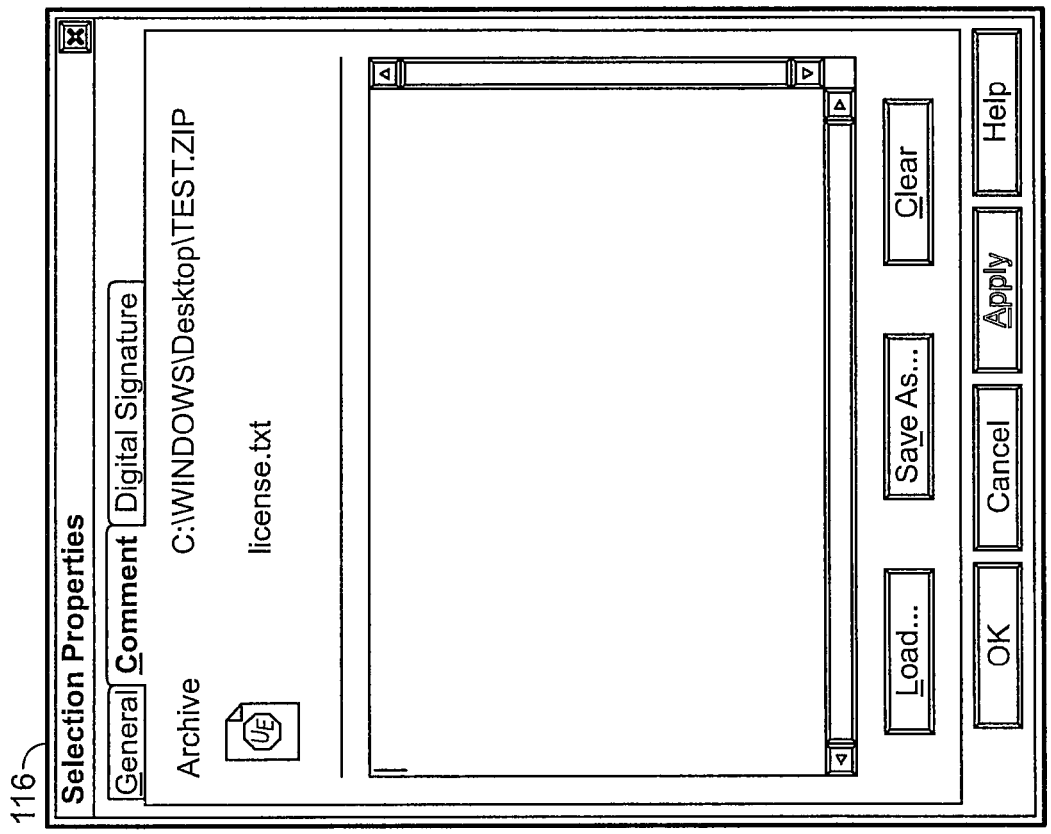
FIG. 10A displays a "General" screen of a series of selection properties dialog screens used in accordance with an embodiment of the present invention.
Figure 10B:
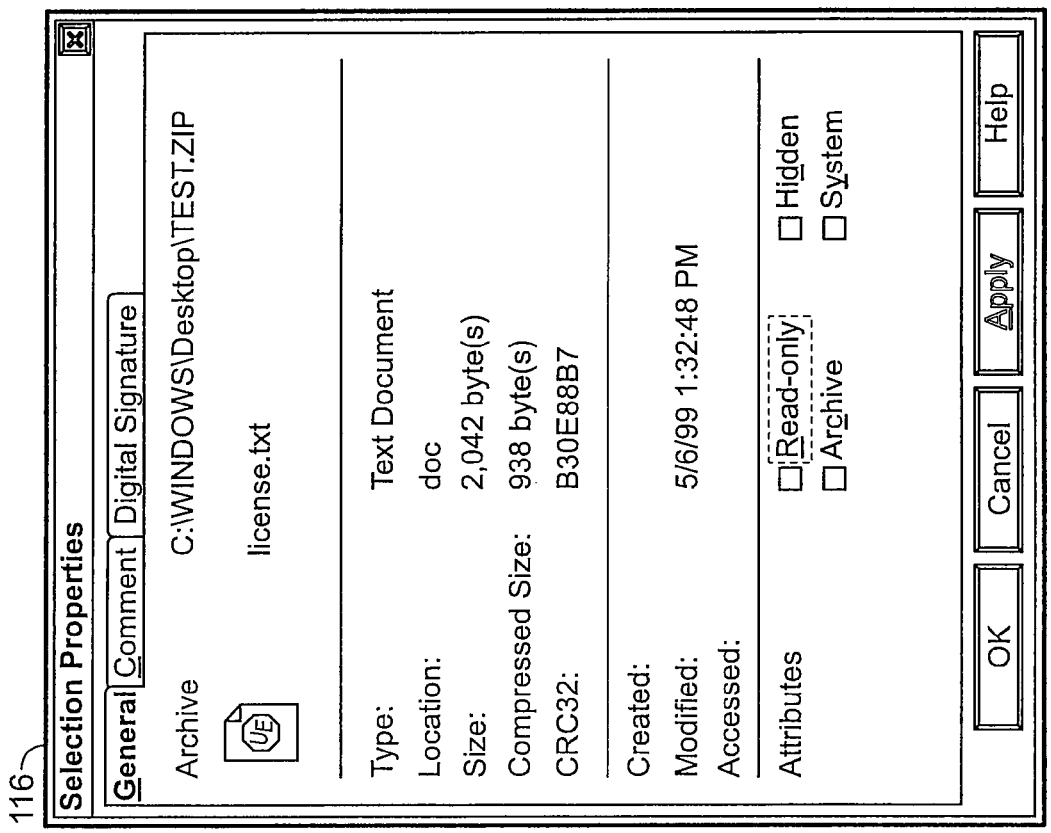
FIG. 10B displays a "Comment" screen of a series of selection properties dialog screens used in accordance with an embodiment of the present invention.
Figure 10C:
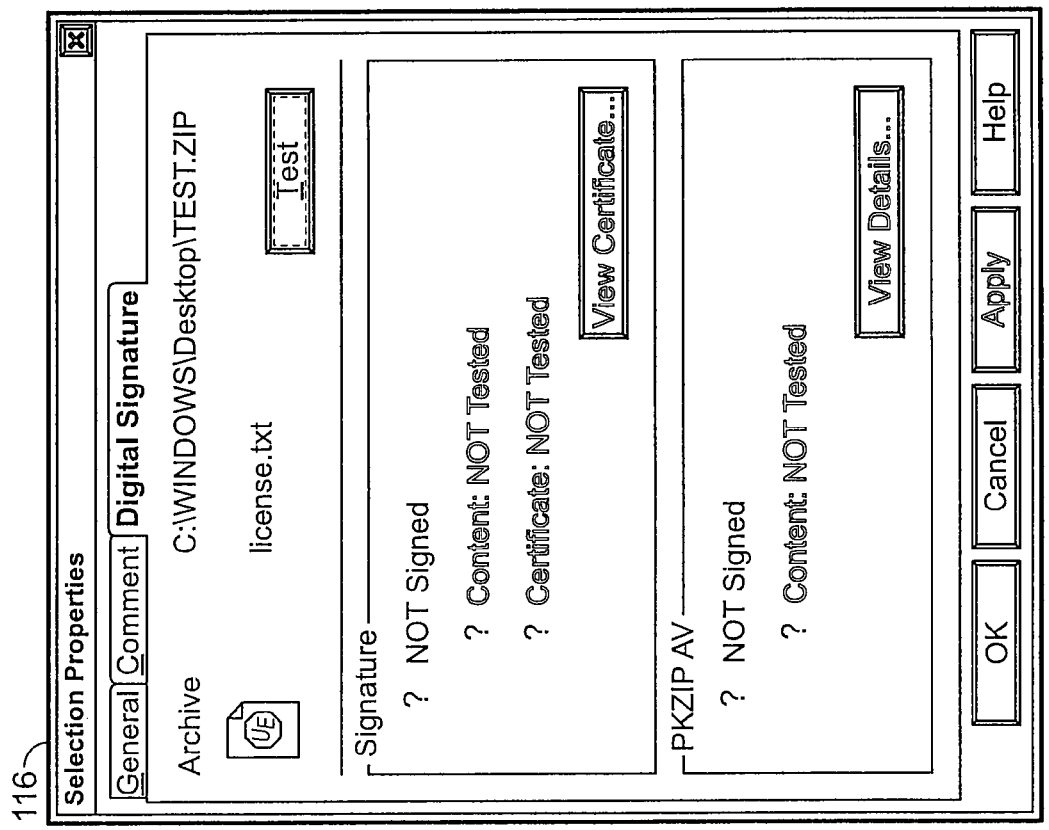
FIG. 10C displays a "Digital Signature" screen of a series of selection properties dialog screens used in accordance with an embodiment of the present invention.

As shown in FIGS. 3, 6a and 6b, an enhanced user interface (UI) of a host application may include archive management operation options providing for at least the following: opening a file in an archive, exploring an archive, exploring a folder in an archive, viewing the contents of an archive, sending an archive to another folder, sending the contents of an archive to another folder, cutting an archive and/or the contents of an archive, copying an archive and/or the contents of an archive, creating a shortcut to an archive and/or the contents of an archive, deleting an archive and/or the contents of an archive, renaming an archive and/or the contents of an archive, displaying a properties dialog of an archive, displaying a properties dialog of the contents of an archive (FIGS. 10A-10C display a series of selection properties dialog screens used in accordance with an embodiment of the present invention), extracting (decrypting and/or uncompressing) the contents of an archive (FIG. 7 displays an extract dialog screen used in accordance with an embodiment of the present invention), testing an archive and/or the contents of an archive, compressing an archive and/or the contents of an archive, displaying an Options dialog where archive parameters may be configured, saving an archive, adding files to an archive (FIG. 8 displays an add dialog screen used in accordance with an embodiment of the present invention), displaying a log file regarding archive operations (FIG. 9 displays a log dialog screen used in accordance with an embodiment of the present invention), and/or saving an archive in another location and/or under a different name (FIG. 5 displays a save as dialog screen used in accordance with an embodiment of the present invention), for example. An enhanced user interface (UI) of a host application may include options for: decompressing a file in an archive, decompressing all files in an archive, encrypting a file in an archive, encrypting all files in an archive, decrypting a file in an archive, decrypting all files in an archive, digitally signing a file in an archive, digitally signing all files in an archive, authenticating a file in an archive, and/or authenticating all files in an archive, for example. An enhanced user interface (UI) may include other archive management operation options for accessing an archive and/or modifying files in an archive, as known to those skilled in the art. Archive management operations that may be initiated or controlled by a user may be referred to as user-accessible operations.

As an example of the use of the UI, a user may use the interface to interact with an archive in the following way. First, the user uses the UI to identify a specific target archive. The target archive may then be accessed and/or retrieved by the UI and identifiers for files contained in the archive may be displayed by the UI. If necessary, the UI may provide decompression or decryption to the target archive in order to allow the display of the identifiers for the files contained in the archive.

The user may then use the UI to select the identifier for one of the files in the target archive. The UI may then access and/or retrieve that identified file. Again, if necessary, the UI may provide decompression or decryption to the identified file in order to allow the display of the identified file.

The UI may then display the contents, such as text or graphics, of the identified file to the user. The user may interact with the contents of the identified file and may modify the contents. The UI may keep track of the user's modification to the contents of the identified file.

Once the user had completed the modification to the contents of the identified file, the user may indicate that the identified file is to be updated to reflect the modifications and then the modified file is to be closed and re-inserted in the target archive. If the user desires the modified file to be encrypted, the user may then use the UI to apply encryption to the modified file.

The modified file may then be placed in the target archive. The target archive may then be compressed or encrypted as desired by the user. Alternatively, the target archive may be automatically compressed and encrypted when the user has completed modification of the identified file.

In an embodiment of the present invention, an enhanced user interface (UI) of a host application may be configurable. For example, dialogs, menus toolbars, windows, frames, borders, command parameters or options, tabs, buttons, icons, images, and/or lists may be adapted to fit the display characteristics of the operating environment on which the host application runs. The appropriate format for displaying message text, dialogs, toolbars and/or menu options may be used to present functionality to a user in a manner generally consistent with the other messages, dialogs, toolbars and/or menus of the host application. In order to provide a generally consistent interface to a user, display elements may differ from those illustrated here, as known to one skilled in the art.

One example of a change that may be made in support of seamless integration within the user interface (UI) of a host application is that the sizes of dialog boxes and message lengths may be reduced to fit within the screen size and display resolution of a device. A second example of a change is the operation used to open a context menu may require a right-click mouse button press on one device while the same action may require a left-mouse button press or require tapping a stylus on another device. A third example of a change is that one interface may allow the display of toolbar buttons while another device may not allow the use of toolbar buttons. In order to provide a consistent experience to a user, other changes may be implemented, as known to those skilled in the art.

As mentioned above, the user interface component 20 may include a user interface of a host application. A host application may be a file management application, an internet enabled application, an email application, an instant messaging application, or other application, as further discussed below, for example.

File Management Application

In an embodiment of the present invention, the user interface component 20 may include a user interface of a file management application. A file management application may provide a user interface to an operating system. File management applications may be provided with an operating environment or as separate programs that may be obtained from an independent software publisher. A characteristic typically found in file management applications is a user interface through which files and/or folders may be accessed by a user. File management applications may allow navigation of a file system structure to locate files and/or folders. A file management application may allow interaction with files and/or folders via pull-down menus, toolbars, copy and paste operators, drag and drop operators and/or context menus, for example. Further, a file management application may allow interaction with files and/or folders using other methods, as known to those skilled in the art.

An example of a file management application is Windows Explorer, which provides a user interface to the Windows operating system. Another example of a file management application is Macintosh Finder, which provides a user interface to the Mac OS operating system. Other examples of file management applications are KDE and GNOME, which provide a user interface to the UNIX and UNIX-like operating systems, such as the LINUX operating system. Another example of a file management application is CDE, which also provides a user interface to the UNIX operating system. Another example of a file management application is the Explorer that provides a user interface to the Windows Pocket PC and Windows Smartphone operating systems. Another example of a file management application is the Files function that provides a user interface to the Palm OS operating system. Another example of a file management application is the JAVA File Manager, which provides a user interface to JAVA based operating systems. Other file management applications present user interfaces to .NET based operating systems and the iPOD OS operating system. Other file management applications that present user interfaces may be used, as known to those skilled in the art.

In an embodiment of the present invention, an archive may be accessed and/or files in an archive may be accessed and/or modified in various ways using a file management application. For example, an archive may be accessed and/or files in an archive may be modified using an enhanced user interface (UI) as described above with regard to enhancing the user interface (UI) of a host application.

In one embodiment of the present invention, a user may simply double-click an archive visible in a user interface (UI) of a file management application to open and view the contents of the archive. In another embodiment of the present invention, a user may do the following to open and view the contents of an archive. First, the archive to be opened may be located using a file management application. Then, the user may click on the archive the user wants to open. A context menu may appear and the user may select an option from the context menu to navigate the archive. The contents of the archive may be displayed in a dialog and/or a window that is displayed within the user interface (UI) of the file management application. A user may access an archive in other ways, as known to those skilled in the art.

In an embodiment of the present invention, individual files and/or folders in an archive may be extracted (uncompressed and/or decrypted). For example, a file and/or folder may be extracted in the following way. A user may open an archive in a user interface of a file management application, as discussed above, and then invoke an extract dialog (FIG. 7 displays an extract dialog screen used in accordance with an embodiment of the present invention). An Extract dialog 110 may be invoked by selecting the Extract menu item in the context menu or by selecting the Extract toolbar button, for example. Once the Extract dialog 110 appears, a user may manually specify a destination directory. Alternatively, a user may select Extract Here from the Extract dialog 110 in order to extract the contents of an archive into the directory where the archive resides. A user may also select Extract To from the Extract dialog 110 in order to select or create a directory other than the directory where the archive resides, and extract the contents of the archive into that directory. Alternatively, the contents of an archive may be extracted using a drag and drop operation, whereby the user highlights the files and/or folders he/she wishes to extract, drags the files and/or folders to a destination directory, and drops the files and/or folders into the destination directory. The files and/or folders may be automatically extracted into the destination directory. If there is an error encountered during the extraction process, the error may be indicated in a progress dialog and in a log (FIG. 9 displays a log dialog screen used in accordance with an embodiment of the present invention).

In an embodiment of the present invention, a user may create a new archive. The following is an example of the steps one may follow to create a new archive. First the user may highlight files and/or folders the user wishes to archive. The user may then open a context menu within the file management application. The context menu may include an option to compress the files and/or folders into an archive. This option may be selected by the user and the "Save As" dialog may appear (FIG. 5 displays a save as dialog screen used in accordance with an embodiment of the present invention). A name and destination may be specified for the archive, and a save button may be clicked to proceed. A progress dialog may appear that may monitor completion and may indicate if errors occur in the process. The new archive may reside in the specified destination directory. A user may create a new archive in other ways, as known by those skilled in the art.

In an embodiment of the present invention, a user may create a new, empty archive. An empty archive is an archive that contains no files and/or folders. An empty archive may be available at any time and a user may add files to an empty archive at any time. The following is an example of the steps one may follow to create a new empty archive. First, the user may open a context menu within a file management application without first having highlighted any files and/or folders to archive. The context menu may include an option to create "New" files. One option in this menu may be to create a new archive. The user may select the option to create a new archive. A new empty archive may be created in the current directory and the user may be prompted to name the new archive. A user may create a new, empty archive in other ways, as known by those skilled in the art.

In an embodiment of the present invention, a user may add files and/or folders to an archive using a UI in a file management application. The following is an example of the steps one may follow to add files and/or folders to an archive. First, a user may open an archive using a file management application, as discussed above. Then, the user may open a context menu and choose an option to "Add" files and/or folders. An Add dialog may appear (FIG. 8 displays an add dialog screen used in accordance with an embodiment of the present invention). The files and/or folders to be added may be selected from a list of available files, and an OK button may be clicked to proceed. A progress dialog may appear that may monitor completion and may indicate if errors occur in the process. The new files may be added to the existing archive. Alternatively, files may be added using a drag and drop operation and/or a copy and paste operation. A user may add files and/or folders to an archive in other ways, as known to those skilled in the art.

In an embodiment of the present invention, a user may delete files and/or folders from an existing archive using a user interface in a file management application. The following is an example of the steps one may follow to delete files and/or folders from an archive. First, a user may open an archive using a UI in a file management application, as discussed above. Then, the user may highlight files and/or folders to be deleted from the archive. The user may then press a Delete button that appears in a toolbar. Alternatively, the user may open a context menu and may choose the Delete option. The user may be asked to confirm the delete operation by pressing an OK button. The selected files may be deleted from the archive. A user may delete files and/or folders from an archive in other ways, as known to those skilled in the art.

In an embodiment of the present invention, adding and/or deleting of files and/or folders in an archive may occur in an immediate mode, or in a delayed mode. The operation when configured for immediate mode may be that the action specified occurs immediately when a user presses a button to proceed. The result may be that the archive contents are updated immediately to reflect the selected action. Alternatively, a delayed mode may be configured to use an edit-before-saving function. In this mode instruction cues may be presented within an interface of a file management application, indicating the action that is to be completed. The action may not occur until the user indicates that the action is to be completed. A user may indicate that the action is to be completed by saving the archive, for example. A user may indicate that the action is to be completed in other ways, as known to those skilled in the art.

In an embodiment of the present invention, a user may save files and/or folders using a file management application. After a user is finished modifying files and/or folders in an archive, the files and/or folders may be saved by selecting the Save menu item available under the File menu, or by use of a context menu, for example. A user may also click the Save button on a toolbar, for example. To save modifications to another archive, a user may select the Save As or Save Copy As menu items, for example. A user may save files and/or folders in other ways, as known by those skilled in the art.

Internet Enabled Application

In an embodiment of the present invention, the user interface component 20 may include a user interface of an internet enabled application. An internet enabled application may provide a user interface for accessing files available on the Internet. An internet enabled application may also provide a user interface to an operating system, much like a file management application. Examples of internet enabled applications are Microsoft Internet Explorer, Netscape Navigator, Firefox, Mozilla, and Opera. Other internet enabled applications may be used, as known to those skilled in the art.

In an embodiment of the present invention, an archive may be accessed and/or files in an archive may be accessed and/or modified in various ways using an internet enabled application. For example, an archive may be accessed and/or files in an archive may be modified using an enhanced user interface (UI) as described above with regard to enhancing the user interface (UI) of a host application.

In an embodiment of the present invention, an archive located on the Internet may be accessed in the following exemplary manner. First, using an internet enabled application, a user may locate an archive that the user would like to receive from a web site. Then, a link to the archive may be selected from the user interface of the internet enabled application. When the link is selected, the internet enabled application may present a question to the user, asking if the archive should be saved to the users computing device or opened. If the archive is to be saved, the internet enabled application may make a copy of the archive from the web site and store the copy on the users computing device. If the archive is to be opened, the internet enabled application may display the contents of the archive in the user interface of the internet enabled application. A user may access an archive located on the Internet in other ways, as known by those skilled in the art.

Figure 4:
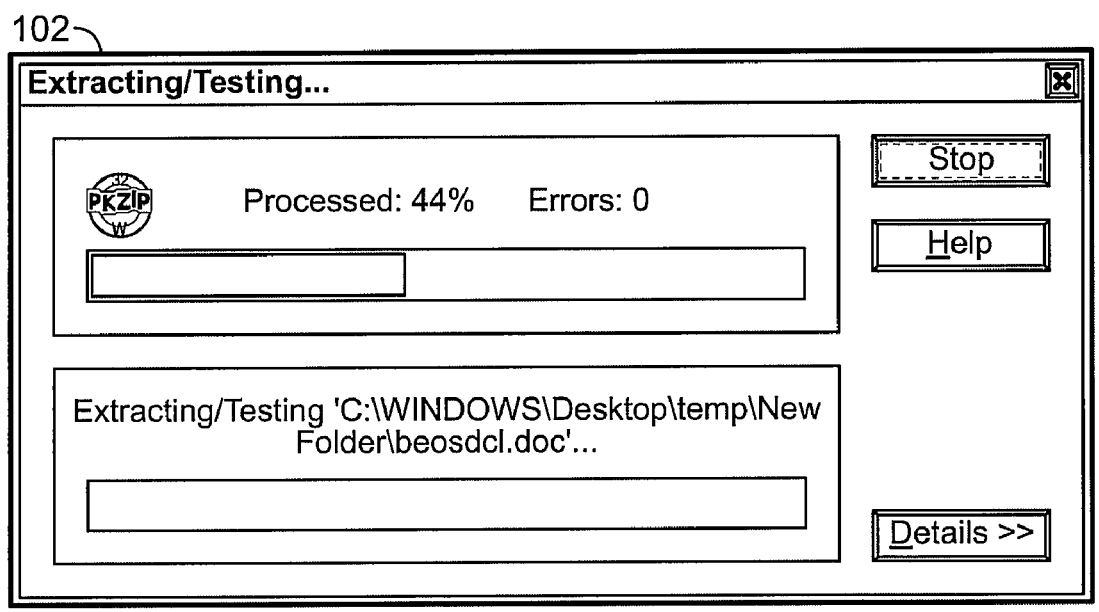
FIG. 4 displays a progress dialog screen used in accordance with an embodiment of the present invention.

In an embodiment of the present invention, an archive may be extracted in the following manner using an internet enabled application. A user may open an archive in an internet enabled application, as discussed above, and invoke the extract dialog by selecting an Extract menu item in a context menu of the internet enabled application. The Extract dialog may appear, allowing the user to manually specify a destination directory. The files may be extracted to the specified directory. Alternatively, files may be extracted using a drag and drop operation. The user may highlight files the user wishes to extract, drag the files to a destination, and drop the files in the destination. The files may be automatically extracted into the destination. As the extraction process proceeds, progress may be displayed in a progress dialog (FIG. 4 displays a progress dialog screen used in accordance with an embodiment of the present invention). If there is an error encountered during the extraction process, the error may be indicated in the progress dialog and in a log. An archive may be extracted in other ways, as known by those skilled in the art.

In embodiments of the present invention, an internet enabled application may be used in a similar manner as a file management application. In such embodiments, an internet enabled application may be used to access an archive and/or modify files in an archive in the same ways that a file management application may be used to access an archive and/or modify files in an archive.

Email Application

In an embodiment of the present invention, the user interface component 20 may include a user interface of an email application. An email application may provide a user interface for accessing emails. Examples of email applications are Microsoft Outlook, Lotus Notes, Thunderbird, VersaMail and Novell Groupwise. Other email applications may be used, as known to those skilled in the art.

In an embodiment of the present invention, an archive may be accessed and/or files in an archive may be modified in various ways using an email application. For example, an archive may be accessed and/or files in an archive may be modified using an enhanced user interface (UI) as described above with regard to enhancing the user interface (UI) of a host application.

In one embodiment of the present invention, the email application may include an email attachment management application that allows compression, encryption and/or authentication of email attachments and/or the email message body.

An embodiment of the present invention may allow compression, encryption, and/or authentication of the email message body. The email message body is a portion of an email message known to those skilled in the art to contain the message to be sent to one or more persons that are to receive the email message. The original uncompressed, unencrypted, and/or unsigned email message body may be passed to the compression/extraction engine. The compression/extraction engine may compress, encrypt and/or digitally sign the email message body into an archive format. The archive is then transmitted as part of the email message instead of the original email message body.

An embodiment of the present invention may include toolbar buttons and/or menu options that may allow turning the compression of email attachments and the email message body on or off. The compression of email attachments and the email message body may reduce the storage and transfer time of email messages and may reduce the spread of email attachment viruses. Encryption and digital signing of email attachments and the email message body may ensure data security by aiding in maintenance of data privacy and integrity.

An embodiment of the present invention may include an email attachment module. Such a module may be used in connection with email programs that support the sending of file attachments in the main body of an email message. Users may choose to send the attached file as the file originally exists, or compress the file prior to attachment to the mail message so the file may be smaller and more efficient to send and/or store. The email attachment module may provide compression, encryption and/or digital signing of attachments into an email program so that compressing, encrypting and/or digital signing attachments may be done automatically as a message is sent.

In an embodiment of the present invention, the number of tools available in email programs may be increased. For example, additional buttons may be added to a toolbar accessible from the user interface of the email program. The toolbar may be modified to include a Compress toggle button, an Encrypt toggle button, a Sign toggle button, and/or an Options button. If the Compress toggle button is not depressed (the initial default state), all mail attachments and/or the mail message body may be compressed automatically when the standard "send" button is used to send a message. Attachments that are already compressed when attached to an email may be left as they are, while attachments that are not compressed may be compressed into an archive that may replace the original, uncompressed attachments. When the Compress toggle button is depressed, the compression may not be done and files may be sent as originally attached.

If the Encrypt toggle button is not depressed (the initial default state), all mail attachments may be encrypted into a single archive automatically when the standard "send" button is used to send a message. The single archive containing the encrypted file attachments may replace the original unencrypted attachments. When the Encrypt toggle button is depressed, the encryption may not be done.

Further, if the Encrypt toggle button is not depressed (the initial default state), the mail message body may be encrypted into a single archive automatically when the standard "send" button is used to send a message. The single archive containing the encrypted mail message body may replace the original unencrypted mail message body. When the Encrypt toggle button is depressed, the encryption may not be done.

If the Sign toggle button is not depressed (the initial default state), all mail attachments may be digitally signed into an archive automatically when the standard "send" button is used to send the message. The single archive containing the digitally signed file attachments may replace the original unsigned attachments. When the Sign toggle button is depressed, the signing may not be done.

Further, if the Sign toggle button is not depressed (the default state), mail message body may be digitally signed into an archive automatically when the standard "send" button is used to send the message. The single archive containing the digitally signed mail message body may replace the original unsigned mail message body. When the Sign toggle button is depressed, the signing may not be done.

Clicking the Options button may display Options configuration dialogs. Options configuration dialogs may allow compression, encryption and/or digital signing settings or option to be configured, for example.

Figure 11A:
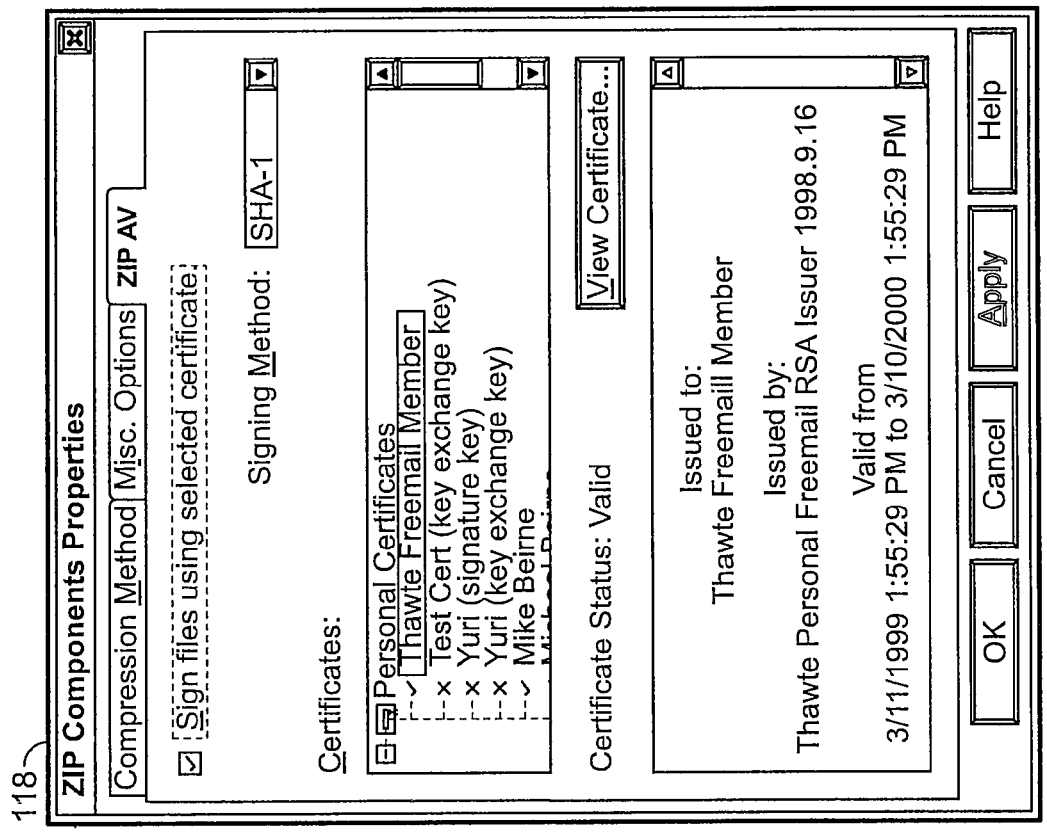
FIG. 11A displays a "General" screen of a series of authenticity/certificate dialog screens used in accordance with an embodiment of the present invention.
Figure 11C:
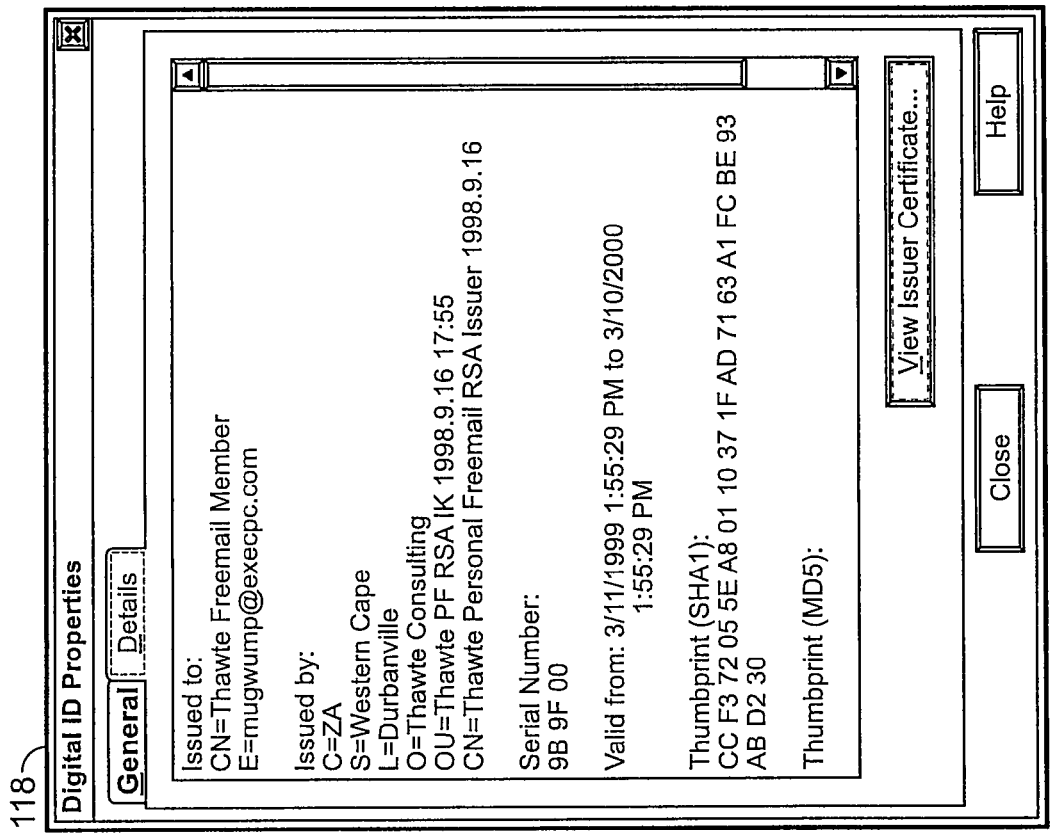
FIG. 11C displays a "Digital Signature" screen of a series of authenticity/certificate dialog screens used in accordance with an embodiment of the present invention.
Figure 11B:
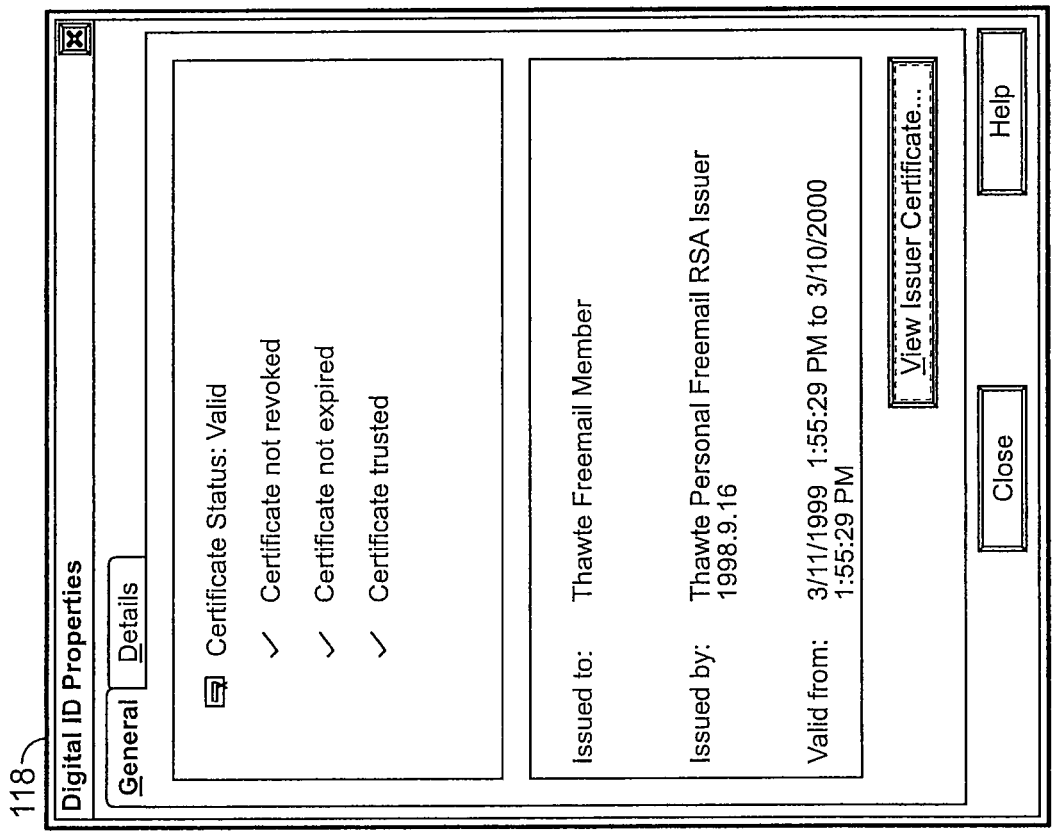
FIG. 11B displays a "Comment" screen of a series of authenticity/certificate dialog screens used in accordance with an embodiment of the present invention.
Figure 12:
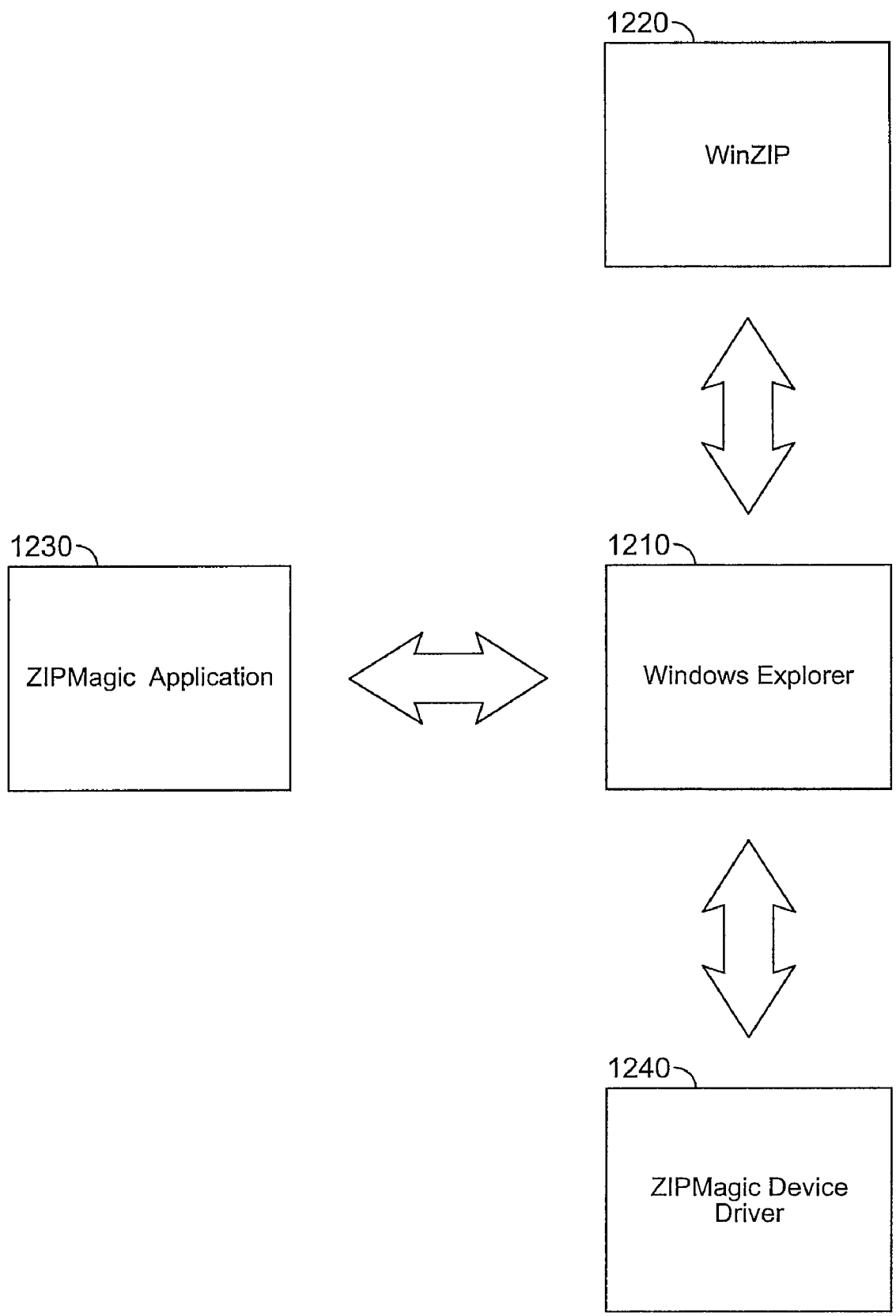
FIG. 12 illustrates examples of the interaction of several prior art file archiving programs with the Windows Explorer 1210.

Options configuration dialogs may be used to configure digital certificates, for example (FIGS. 11A-11C display a series of authenticity/certificate dialog screens used in accordance with an embodiment of the present invention). Options configuration dialogs may also be used to configure compression so that only file attachments of a specified file type may be compressed. Options configuration dialogs may also be used to configure compression so that only attachments exceeding a specified size are compressed. Options configuration dialogs may also be used to configure compression so that only attachments for a specified recipient are compressed and/or encrypted, or alternatively, that attachments for a specified recipient are not compressed and/or encrypted.

Options configuration dialogs may also be used to configure compression so that a confirmation dialog is displayed before compressing attachments to confirm attachments should be compressed. Options configuration dialogs may also be used to configure compression so that the period of time a compressed attachment or compressed mail message body may be opened by the recipient is specified. Options configuration dialogs may also be used to configure compression so that files of a specified type are prevented from being compressed and sent. Options configuration dialogs may also be used to configure compression so that attachments may be split into specified segment sizes and sent in separate messages. Other uses for Options configuration dialogs may be used, as known to those skilled in the art.

In an embodiment of the present invention, if email attachment and/or mail message body compression, encryption, and/or digital signing features are enabled, the enabled features may be applied automatically when a message is sent. Messages may be sent by clicking a Send button, for example. If mail attachment and/or mail message body compression, encryption, and digital signing features are not enabled, attachments and/or the mail message body are sent without being compressed, encrypted or digitally signed. The actions of the compressing, encrypting, digitally signing and configuring options may alternatively be selected from menu options added to menus of an email application. When selected from a menu, the operations may work in the same manner as if they had been selected using the toggle buttons. Alternatively, attachment options may be set using selection lists, toolbars, pop-up selection dialogs, prompts, checkboxes or radio buttons, for example. Other methods of setting attachment options for compression, encryption and/or digital signing, are known to those skilled in the art.

Instant Messaging Application

In an embodiment of the present invention, the user interface component 20 may include a user interface of an instant messaging application. An instant messaging application may provide a user interface for exchanging messages. Examples of instant messaging applications are AOL Instant Messenger, Microsoft MSN Instant Messenger, Yahoo Messenger, Trillion, and ICQ. Other instant messaging applications may be used, as known to those skilled in the art.

In an embodiment of the present invention, an archive may be accessed and/or files in an archive may be modified in various ways using an instant messaging application. For example, an archive may be accessed and/or files in an archive may be modified using an enhanced user interface (UI) as described above with regard to enhancing the user interface (UI) of a host application.

In one embodiment of the present invention, an instant messaging application may allow compression, encryption and/or authentication of message attachments and/or the message.

An embodiment of the present invention may allow compression, encryption, and/or authentication of the instant message message body. The message body is a portion of an instant message message known to those skilled in the art to contain the message to be sent to one or more persons that are to receive the message. The original uncompressed, unencrypted, and/or unsigned message body may be passed to the compression/extraction engine. The compression/extraction engine may compress, encrypt and/or digitally sign the message body into an archive format. The archive is then transmitted as part of the message instead of the original message body.

An embodiment of the present invention may include toolbar buttons and/or menu options that may allow turning the compression of instant message attachments and the message body on or off. The compression of instant message attachments and the message body may reduce the storage and transfer time of instant messages and may reduce the spread of instant message attachment viruses. Encryption and digital signing of instant message attachments and the message body may ensure data security by aiding in maintenance of data privacy and integrity.

An embodiment of the present invention may include an instant message attachment module. Such a module may be used in connection with instant message programs that support the sending of file attachments in the main body of an instant message. Users may choose to send the attached file as the file originally exists, or compress the file prior to attachment to the message so the file may be smaller and more efficient to send and/or store. The instant message attachment module may provide compression, encryption and/or digital signing of attachments into an instant message program so that compressing, encrypting and/or digital signing attachments may be done automatically as a message is sent.

In an embodiment of the present invention, the number of tools available in instant message programs may be increased. For example, additional buttons may be added to a toolbar accessible from the user interface of the instant message program. The toolbar may be modified to include a Compress toggle button, an Encrypt toggle button, a Sign toggle button, and/or an Options button. If the Compress toggle button is not depressed (the initial default state), all message attachments and/or the message body may be compressed automatically when the standard "send" button is used to send a message. Attachments that are already compressed when attached to a message may be left as are, while attachments that are not compressed may be compressed into an archive that may replace the original, uncompressed attachments. When the Compress toggle button is depressed, the compression may not be done and files may be sent as originally attached.

If the Encrypt toggle button is not depressed (the initial default state), all message attachments may be encrypted into a single archive automatically when the standard "send" button is used to send a message. The single archive containing the encrypted message attachments may replace the original unencrypted attachments. When the Encrypt toggle button is depressed, the encryption may not be done.

Further, if the Encrypt toggle button is not depressed (the initial default state), the message body may be encrypted into a single archive automatically when the standard "send" button is used to send a message. The single archive containing the encrypted message body may replace the original unencrypted message body. When the Encrypt toggle button is depressed, the encryption may not be done.

If the Sign toggle button is not depressed (the initial default state), all message attachments may be digitally signed into an archive automatically when the standard "send" button is used to send the message. The single archive containing the digitally signed message attachments may replace the original unsigned attachments. When the Sign toggle button is depressed, the signing may not be done.

Further, if the Sign toggle button is not depressed (the default state), message body may be digitally signed into an archive automatically when the standard "send" button is used to send the message. The single archive containing the digitally signed message body may replace the original unsigned message body. When the Sign toggle button is depressed, the signing may not be done.

Clicking the Options button may display Options configuration dialogs. Options configuration dialogs may allow compression, encryption and/or digital signing settings or option to be configured, for example.

Options configuration dialogs may be used to configure digital certificates, for example (FIGS. 11A-11C display a series of authenticity/certificate dialog screens used in accordance with an embodiment of the present invention). Options configuration dialogs may also be used to configure compression so that only file attachments of a specified file type may be compressed. Options configuration dialogs may also be used to configure compression so that only attachments exceeding a specified size are compressed. Options configuration dialogs may also be used to configure compression so that only attachments for a specified recipient are compressed and/or encrypted, or alternatively, that attachments for a specified recipient are not compressed and/or encrypted.

Options configuration dialogs may also be used to configure compression so that a confirmation dialog is displayed before compressing attachments to confirm attachments should be compressed. Options configuration dialogs may also be used to configure compression so that the period of time a compressed attachment or compressed message body may be opened by the recipient is specified. Options configuration dialogs may also be used to configure compression so that files of a specified type are prevented from being compressed and sent. Options configuration dialogs may also be used to configure compression so that attachments may be split into specified segment sizes and sent in separate messages. Other uses for Options configuration dialogs may be used, as known to those skilled in the art.

In an embodiment of the present invention, if instant message attachment and/or message body compression, encryption, and/or digital signing features are enabled, the enabled features may be applied automatically when a message is sent. Messages may be sent by clicking a Send button, for example. If message attachment and/or message body compression, encryption, and digital signing features are not enabled, attachments and/or the message body are sent without being compressed, encrypted or digitally signed. The actions of the compressing, encrypting, digitally signing and configuring options may alternatively be selected from menu options added to menus of an instant message application. When selected from a menu, the operations may work in the same manner as if they had been selected using the toggle buttons. Alternatively, attachment options may be set using selection lists, toolbars, pop-up selection dialogs, prompts, checkboxes or radio buttons, for example. Other methods of setting attachment options for compression, encryption and/or digital signing, are known to those skilled in the art.

Productivity Application

In an embodiment of the present invention, the user interface component 20 may include a user interface of a software application that may be characterized as a productivity application. A productivity application may provide a user interface for accessing files associated with the productivity application. For example, Microsoft Word operates on files having an extension of .DOC, which identifies a file in Microsoft Word format. Productivity applications may be applications that support a user's need for word processing and document publishing, such as Microsoft Word, database management, such as Microsoft Access, presentation and project management, such as Microsoft PowerPoint, spreadsheet creation and management, such as Microsoft Excel, or, Microsoft Open Office, Sun Microsystems StarOffice or OpenOffice.org's OpenOffice, for example. Other examples of productivity applications are known to those skilled in the art.

In an embodiment of the present invention, an archive may be accessed and/or files in an archive may be modified in various ways using a productivity application. For example, an archive may be accessed and/or files in an archive may be modified using an enhanced user interface as described above with regard to enhancing the user interface of a host application.

In an embodiment of the present invention, the operation of any productivity application may be extended to (for example) open, create, modify and/or save archives that may contain compressed, encrypted and/or digitally signed files having an extension that identifies a format recognized by the application, like .DOC for files recognized by Microsoft Word, for example.

In an embodiment of the present invention, an archive may be accessed and/or files in an archive may be modified in the following exemplary manner. First, a user may open a productivity application using the standard method for the productivity application. Then the user may select an "Open" option from a pull-down or context menu within the productivity application. A file open dialog for the productivity application may be displayed showing files that are available to open. The user may then select an archive that contains a file to be modified. When opened by the application, the archive may be passed to the compression/extraction engine 40 to uncompress, decrypt, and/or authenticate the data file within the archive. After the compression/extraction engine 40 has uncompressed, decrypted, and/or authenticated the data file, the data file may be passed back to the application. The application may present the data file to the user for viewing and/or modification using the functions of the application.

In an embodiment of the present invention, files in an archive may be opened using a drag and drop operation in the following manner. First, a productivity application may be opened by a user. Then, an archive containing files to be opened may be highlighted and dragged over an open copy of the productivity application and dropped into the interface of the productivity application. The archive may be automatically passed to the compression/extraction engine 40 to uncompress, decrypt, and/or authenticate the data file (or files) contained in the archive. After the compression/extraction engine 40 decompresses, decrypts, and/or authenticates the data file (or files), the archive may be passed back to the productivity application. The productivity application may present the data file (or files) to the user for viewing and/or modification using the functions of the application.

An archive may contain files in any format. A productivity application typically provides functions that operate only on files having a specific format. The file name extension assigned to a file may be indicative of the format of the file.

In an embodiment of the present invention, when a user opens an archive that contains a file that is not in a format recognized by a productivity application, a message may be presented to the user informing the user that the format of the file is not recognized by the productivity application and the file may not be presented for viewing and/or modifying within the productivity application.

In an embodiment of the present invention, the save functions of a productivity application may be extended to allow a user to save a file into a new archive. The save functions provided by a productivity application may include a "Save" option, which may allow the content of a file to be saved in the original archive that was opened within the productivity application. The enhanced save functions provided by a productivity application may include a "Save As Zip" option, which may allow the content of a file to be saved into a new .ZIP archive, for example. In an embodiment of the present invention, a file may be compressed, encrypted and/or digitally signed by the compression/extraction engine 40 as the file is saved into the archive.

In an embodiment of the present invention, the save functions of a productivity application may be extended to allow a user to save a file to an existing archive. The following is an example of the steps a user may follow to save a file into an existing archive. First, a user may select a Save option from a pull-down menu or context menu. The standard Save dialog for the application may be displayed. After the save button is clicked to proceed, the application may pass a copy of the file to the compression/extraction engine 40. The compression/extraction engine 40 may automatically compress, encrypt and/or digitally sign the contents of the file and save the file into the existing archive. A progress dialog may monitor completion and may indicate errors in the process. The archive may now contain an updated copy of the file.

A user may save a file that is open within a productivity application to a new archive, such as a new archive in the .ZIP format, for example. The following is an example of the steps a user may follow to save a file to a new .ZIP archive. First, a user may select a Save As ZIP option from a pull-down menu or context menu. A Save dialog for the application may be displayed. A name and destination may be specified for the new .ZIP archive, and the save button may be clicked to proceed. The compression/extraction engine 40 may be passed a copy of the file and may compress, encrypt and/or digitally sign the contents of the file and save it into the new .ZIP archive. A progress dialog may monitor completion and indicate errors in the process. The new .ZIP archive may now contain an updated copy of the file.

In an embodiment of the present invention, a productivity application may have additional button(s) added to a toolbar displayed in the user interface of the productivity application. These buttons may include a Compress toggle button, an Encrypt toggle button, a Sign toggle button, and/or an Options button. If the Compress toggle button is not depressed (the default state), all files viewed and/or modified within the productivity application may be compressed automatically into an archive when a "Save" function is used. When the Compress toggle button is depressed and a "Save" function is used, files may be saved uncompressed.

If the Encrypt toggle button is not depressed (the initial default state), all files viewed and/or modified within the application may be encrypted automatically into an archive when a "Save" function is used. When the Encrypt toggle button is depressed and a "Save" function is used, files may be saved unencrypted.

If the Sign toggle button is not depressed (the initial default state), all files viewed and/or modified within the application may be digitally signed automatically into an archive when a "Save" function is used. When the Sign toggle button is depressed and a "Save" function is used, files may be saved unsigned.

Clicking the Options button may display Options configuration dialogs as described above. Options configuration dialogs may allow compression, encryption and/or digital signing settings to be configured. Options configuration dialogs may be used to configure digital certificates (FIGS. 11A-11C display a series of authenticity/certificate dialog screens used in accordance with an embodiment of the present invention). Options configuration dialogs may also be used to configure compression so that only files of a specified file type may be compressed when saved. Options configuration dialogs may also be used to configure compression so that only files exceeding a specified size are compressed. Options configuration dialogs may also be used to configure compression so that only files for a specified recipient are compressed and/or encrypted, or alternatively, that files for a specified recipient are not compressed and/or encrypted.

Options configuration dialogs may also be used to configure compression so that a confirmation dialog is displayed before compressing files to confirm the files should be compressed. Options configuration dialogs may also be used to configure compression so that the period of time a file may be opened by the recipient is specified. Options configuration dialogs may also be used to configure compression so that files of a specified type are prevented from being compressed. Options configuration dialogs may also be used to configure compression so that files may be split into specified segment sizes. Other uses for Options configuration dialogs may be used, as known to those skilled in the art.

In an embodiment of the present invention, if file compression, encryption, and/or digital signing features are enabled through toggle buttons, files may be automatically compressed, encrypted and/or digitally signed when a file is saved based on which features are enabled. If file compression, encryption, and digital signing features are not enabled, files may be saved without being compressed, encrypted or digitally signed. The actions of compressing, encrypting, digitally signing and/or configuring options may be selected from menu options added to menus of an existing productivity application. When selected from a menu, the operation of such features may work in the same manner as when selected using toggle buttons.

In an embodiment of the present invention, a user may send a file that is open within a productivity application to another productivity application for further processing. Many productivity applications today include an option to "Send" or "Send To" another user or application. The send operation may pass a file that is open within a productivity application to another user by sending the file as an archive attached to an email message, for example.

The following is an example of the steps a user may follow to send a file to another user as an attachment to an email. First, the user may open or create a file with a productivity application. Then, the user may select a Send as Attachment option from a menu. After the user selects the Send as Attachment option, the file may be passed to the compression/extraction engine 40 and compressed, encrypted and/or signed into an archive. The productivity application may then open an email application. The archive created by the compression/extraction engine 40 may be automatically attached to a new message as an attachment. The user may then choose the recipient from an address book and select a Send option of the email application. The message and the attached archive may then be sent to a specified recipient. Other ways to send a file that is open within a productivity application to another productivity application may be used, as known to those skilled in the art.

In another embodiment, a send operation may be used to pass a file open in a productivity application to a second application. The following is an example of the steps a user may follow to send a file to another application. First, the user may open or create a file with a productivity application. Then, the user may select a Send option from a menu in the productivity application. The Send option may display a list of applications that may receive data from the current application. After the user selects the application that is to receive the file from the list, the file may be passed to the compression/extraction engine 40 and compressed, encrypted and/or digitally signed into an archive. The archive created by the compression/extraction engine 40 may be automatically passed to the second application as a data object. The second application may receive the archive as a data object. The second application may retain a copy of the archive data object. When the second application requires access to the contents of the archive data object, the second application may pass the archive data object to the compression/extract engine 40 to uncompress, decrypt and/or authenticate the files in the archive data object. Other ways to pass a file open in a productivity application to a second application may be used, as known to those skilled in the art.

File Size Module

As mentioned previously in the specification, the file size module provides for compression and/or decompression of files. Compression options may be configurable. In an embodiment of the present invention, an options dialog that allows compression options to be configured may be accessible via a pull-down menu, a toolbar, and/or a context menu. In such an embodiment, a user may specify a compression algorithm other than the default compression algorithm to be used when files and/or folders in an archive are compressed. Compression algorithms to choose from may include Store, DCL Implode, Deflate, for example, and others. The default may be the Deflate compression algorithm. A user may specify a default compression algorithm to be used when compressing all files. Alternatively, a user may specify a default compression algorithm to be used when compressing files of a specific type. The type of file may be identified by the file name extension. Other compression options may be used, as known to those skilled in the art.

Similarly, a user may specify many other options that may be applied to files having specific file name extensions. For example, the Store feature, which archives files without compression, may be used to archive JPEG files. Archiving JPEG files without compression may be desirable because the compression ratios on JPEG files may be negligible and archiving a file without compression may be faster than archiving a file with compression.

As a second example, a user may prevent extraction of files having an extension of .EXE. Files of this type may contain computer viruses and a user may wish to prevent files of this type from being extracted in order to prevent a virus from spreading onto the user's computing device. As a third example, a user may compress only files that exceed a certain file size. As a fourth example, a user may encrypt files of a specific type or for a designated user. Other options may be set in an Options dialog, as known to those skilled in the art.

In an embodiment of the present invention, one or more additional storage parameters may be configurable depending on which compression algorithm is specified. For example, when compressing using a DCL Implode algorithm, data type may be configurable to be Binary or ASCII and/or dictionary byte size may be configurable to be 1024, 2048 or 4096. With regard to data type, using Binary may be selected to optimize compression of program files or other non-text files and ASCII may be selected to optimize compression of text files. Other storage parameters may be configurable, as known to those skilled in the art.

In an embodiment of the present invention, when compressing using the Deflate algorithm, which is the most popular algorithm for compressing .ZIP archives, the compression level may be configurable. For example, the compression compressing files. Moving the slide bar all the way to the left may instruct the program to use the fastest available level of compression which may result in the minimum compression. Moving the slide bar to the right may increase the level of compression, possibly reducing the final file size, but doing so may also increase the time the program expends compressing the file. Moving the slide bar all the way right may instruct the program to apply the maximum level of compression available when compressing files. This may be the slowest method of compression because the program must expend time maximizing compression on the files. Applying maximum compression may result in the smallest compressed file. Other methods may be used for selecting a level of compression, as known to those skilled in the art.

In an embodiment of the present invention, when compressing using the Deflate algorithm, the dictionary size may also be configurable. For example, the dictionary size may be configured to be a value between 32 kilobytes and 64 kilobytes. Larger dictionary sizes may be supported. The 64 kilobyte dictionary may provide better compression, but may not be compatible with all archiving software, such as a .ZIP utility, for example. Other ways to configure dictionary size may be applied, as known to those skilled in the art.

Security Module

As mentioned previously in the specification, the security module provides for secure storing and/or transfer of files. Digital signatures identify the origin of a file (also known as signing the file) and allow verification of the origin of the file (also known as authenticating the file). In this regard, digitally signing a file may allow detection of whether the integrity of the file has been compromised. Another option for securing data is the use of encryption. Encrypting a file may deny access to the contents of a file by unauthorized users. Options for securing data may be configured to allow a user to select a type of security to be applied to data as the data is compressed or stored (without compression) into an archive. Digital signatures and/or encryption may protect data from tampering and/or unauthorized access. Several methods of securing data using digital signatures and/or encryption are provided. Other methods of securing data may be applied, as known to those skilled in the art.

Any information adapted for use in providing security for an archive or a user, such as digital certificates, passwords, public keys, private keys, contingency keys, segmented keys, biometric data, and/or other information to secure an archive or contents of an archive may be referred to as security information. Security information may be stored inside or outside of an archive in one or more of the several embodiments recited herein.

User tokens (e.g., Universal Serial Bus tokens), portable tokens (e.g., Smart Card), passwords, Personal Identification Number (PIN) codes, biometric data, and/or other information to identify a user of an archive or contents of an archive.

When a user requests access to an archive or contents of an archive, access data provided by the user may be compared to security information to determine whether to grant or deny access to the archive or contents of the archive. This determination may be referred to as an access control decision.

As appreciated by one or ordinary skill in the art, access data and security information may overlap. For example, a password may be used as security information to secure an archive or a file in an archive. Subsequently, the password may be used as access data to access the archive or the file in the archive.

Several examples of security information, access data, and access control decisions are described in more detail below.

In an embodiment of the present invention, when creating an archive, a user may digitally sign and/or encrypt individual files in the archive. A user may also digitally sign and/or encrypt the central directory of an archive. When extracting files from an archive, a user may authenticate and/or decrypt those files. Signing and/or encrypting data may provide security for data files within an archive. Signing and/or encrypting functionality may be based on PKCS No. 7, and/or other public key encryption standards. Basing signing and encrypting functionality on such standards may ensure compatibility with security functionality in other applications available on a computing device. Other signing and encryption methods may be used as known to those skilled in the art.

Before a user may digitally sign and/or encrypt a file, the user must first have a digital certificate, or other public/private key credential with which to sign and/or encrypt the file. An example of a public/private key system supported by an embodiment of the present invention is defined by the internet standard specification: RFC 2459—Internet X.509 Public Key Infrastructure Certificate and CRL Profile. Another example of a public/private key system supported by an embodiment of the present invention is defined by the internet standard: RFC 2440—OpenPGP Message Format. Other public/private key systems may be used, as known to those skilled in the art.

Public/private key encryption uses a key pair. A key pair consists of a public key and a private key. The public key of the pair is associated with a digital certificate, or other form of credential to uniquely identify an individual or organization. The digital certificate is used to bind the identity of the individual or organization with the public encryption key. The individual or organization whose identity is bound to the digital certificate is considered to be the owner of the key. The owner of the key is the individual or organization that is authorized to use the key for decrypting encrypted data. The private key of the pair is held in confidence by the owner. When encrypting data intended for the owner of a key, the public key is used within the encryption process to encrypt data for that owner. The data may only be decrypted by the owner using his/her private key.

In an embodiment of the present invention, when encrypting data into an archive, multiple public keys may be used in the encryption process to create an encrypted archive. An owner of a public key used for encryption may decrypt the data in the encrypted archive using the owner's private key. Anyone not in possession of a private key corresponding to one of the public keys used to encrypt the data may not decrypt the data in the encrypted archive.

A public/private key in the form of an X.509 digital certificate may be obtained from VeriSign or Thawte or from another certificate source. A certificate source is an organization that issues a digital certificate on behalf of an individual or organization. An example of a certificate source is a Certificate Authority. A public/private key in the form of a PGP key pair may be created using software programs available on the Internet. Other sources of public/private keys may be used, as known to those skilled in the art.

Storage of Digital Certificates

In an embodiment of the present invention, public/private keys or other security information used for signing, authenticating, encrypting and/or decrypting archives may be stored using various storage methods. One example of a storage method is a certificate store hosted by the underlying operating environment, such as the Microsoft Windows Certificate Store, IBM RACF (Resource Access Control Facility) and IBM ACF2 (Access Control Facility 2), for example. A second example of a storage method is a Smart Card or USB storage device. A third example of a storage method is a biometric device such as a fingerprint reader or a retina scanner. A fourth example of a storage method is an LDAP (Lightweight Directory Access Protocol) directory store. A fifth example of a storage method is a computer chip. Other methods of certificate storage may be used, as known to those skilled in the art.

In an embodiment of the present invention, an archive encrypted using a public key(s) may be created by employing the following steps. First, the files to be encrypted may be selected and a name and location for a new archive may be specified. Then, the individuals or organizations that are authorized to decrypt the encrypted archive may be selected. Key material may then be generated using random data. A master encryption key may be derived by the compression/extraction engine 40 using the key material. A first session key for a first file in the archive to be encrypted may be derived using the master encryption key. Then, the first file may be encrypted using the first session key and the encrypted data for the first file may be placed into the archive. A second session key for a second file in an archive to be encrypted may be derived using the master encryption key. Then, the second file may be encrypted using the second session key and the encrypted data for the second file may be placed into the archive. This process may continue for all files in the archive.

The public key for a first individual or organization that is authorized to decrypt the encrypted archive may be obtained from the certificate storage location. A copy of the key material may be encrypted using the public key of the first individual or organization authorized to decrypt the encrypted archive. The public key for a second individual or organization that is authorized to decrypt the encrypted archive may be obtained from the certificate storage location. A copy of the key material may be encrypted using the public key of the second individual or organization authorized to decrypt the encrypted archive. The encrypted key material of the first and second individuals or organizations authorized to decrypt the encrypted archive may be placed into the archive.

To decrypt an archive that is encrypted using one or more public keys the following steps may be followed. The encrypted archive may be received by an individual or organization authorized to decrypt the archive. The private key for the individual or organization may be obtained from the certificate storage location. The private key may be used to decrypt the encrypted key material. The decrypted key material may be used to derive a master decryption key. A first session key for a first file in the archive to be decrypted may be derived using the master decryption key. Then the first file may be decrypted using the first session key. A second session key for a second file in the archive to be decrypted may be derived using the master decryption key. Then the second file may be decrypted using the second session key. This process may continue for all files in the archive.

Digital Certificate

As mentioned previously, encryption, decryption, digital signing and/or authentication of digital signatures may be used in accordance with embodiments of the present invention. In order to enable such features, security information, such as a digital certificate, may be required. A digital certificate having a public and a private key may be issued by a certificate authority to an individual or organization. A certificate authority verifies the identity and trustworthiness of the individual or organization and then provides them with a digital certificate as proof of this trust. After receiving a digital certificate, the individual or organization may then use that certificate as proof of their identity when conducting business using a computing device. The digital certificate of an individual or organization and the digital certificates of other users may be required when conducting business using computing devices.

Repository

Many computing platforms available today provide a repository for storing security information, such as digital certificates, and/or access data, such as passwords. A certificate repository may reside on a computing device. A certificate repository that resides on a computing device may only be used on that computing device and may not be used on another computing device. One example of a certificate repository that resides on a computing device that may not be used on another computing device is the Microsoft Windows Certificate Store. Alternatively, the repository, or portions of the repository may be stored inside the archive itself. In this embodiment, A user may use their own digital certificate and one or more digital certificates of others when they are conducting business on a computing device on which a certificate repository resides. A user may use their own digital certificate and one or more digital certificates of others when they are creating an archive. A user may use the user's digital certificate for encrypting, decrypting, digitally signing and/or authenticating an archive. When encrypting or authenticating an archive, a user may use the public key contained within a digital certificate. When decrypting or digitally signing an archive, a user may use the private key associated with the user's digital certificate. A user may use digital certificates of others when encrypting and/or authenticating an archive. A user may not access or use a private key of another individual or organization.

An embodiment of the present invention provides a method for accessing digital certificates from a repository that resides on a computing device when creating, modifying and/or extracting an archive. An example of the steps a user may follow when accessing digital certificates from a repository that resides on a computing device when creating an encrypted archive are as follows. First, a certificate authority issuing a digital certificate to a user may create the digital certificate and deliver it to the user. Then, the user receiving the digital certificate may place the digital certificate into a certificate repository that resides on a computing device. The user may also obtain the digital certificates of others and place them into the certificate repository that resides on the computing device.

In an embodiment of the present invention, to create an encrypted archive, a user may specify a name and location for the archive. The individuals or organizations that are authorized to decrypt the encrypted archive may be selected. Key material may be generated using random data. A master encryption key may be derived by the compression/extraction engine 40 using the key material. A first session key for a first file to be encrypted may be derived using the master encryption key. Then, the first file may be encrypted using the first session key and the encrypted data for the first file may be placed into the archive. A second session key for a second file to be encrypted may be derived using the master encryption key. Then, the second file may be encrypted using the second session key and the encrypted data for the second file may be placed into the archive. This may be repeated until all files are encrypted and placed into the archive.

The digital certificate for a first individual or organization that is authorized to decrypt the encrypted archive may be obtained from a certificate repository residing on a computing device. The public key for a first individual or organization that is authorized to decrypt the encrypted archive may be extracted from the first digital certificate obtained from the certificate repository residing on the computing device. A copy of the key material may be encrypted using the public key of the first individual or organization authorized to decrypt the encrypted archive.

The digital certificate for a second individual or organization that is authorized to decrypt the encrypted archive may be obtained from the certificate repository residing on the computing device. The public key for a second individual or organization that is authorized to decrypt the encrypted archive may be extracted from the second digital certificate obtained from the certificate repository residing on the computing device. A copy of the key material may be encrypted using the public key of the second individual or organization authorized to decrypt the encrypted archive. The encrypted key material of the first and second individuals or organizations authorized to decrypt the encrypted archive may be placed into the archive.

To decrypt an archive that is encrypted using a digital certificate stored in a certificate repository that resides on a computing device, the following steps may be followed. The encrypted archive may be received by an individual or organization authorized to decrypt the file. The private key for the individual or organization may be obtained from the certificate repository residing on the computing device. The private key may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated until all files in the archive are decrypted.

Not all computing platforms available today provide a certificate repository residing on the computing device. However, an embodiment of the present invention provides an integrated method for storing digital certificates on a computing device to remedy this lack. This method may support importing, exporting, viewing and/or deleting digital certificates from a certificate repository that resides on the computing device.

In an embodiment of the present invention, a digital certificate for an individual or organization authorized to decrypt an encrypted archive may be used on more than one computing device. This may be the case when a computing device is used by more than one user. In such a situation, only one copy of a private key associated with the digital certificate for a user is preferably created. To ensure security is maintained when a user uses more than one computing device or when a computing device is used by more than one user, copies of the digital certificate for a user and the associated private key may not be placed into the certificate repository residing on each computing device a user may use.

Portable Certificate Storage

An embodiment of the present invention provides methods for storing security information, such as a digital certificate and an associated private key, and/or access data, such as a password or PIN code, for a user onto a portable certificate storage device that may be carried by a user and used on various computing devices. To use a portable certificate storage device on a computing device, a user may plug the portable certificate storage device into a device receiver on the computing device. The device receiver may provide access to the portable certificate storage device from the computing device. Examples of portable certificate storage devices include a Smart Card and a USB (Universal Serial Bus) Token, for example. Other portable certificate storage devices may be used, as known to those skilled in the art.

An embodiment of the present invention provides a method for accessing a digital certificate from a portable certificate storage device when creating, modifying and/or extracting an archive. The steps a user may follow when accessing a digital certificate from a portable certificate storage device when creating an encrypted archive may be as follows. First, a certificate authority issuing a digital certificate to a user may create a digital certificate and deliver the digital certificate to the user. Then the user may place the digital certificate into a portable certificate storage device that may be plugged into a device receiver on a computing device the user is using.

In an embodiment of the present invention, to create an encrypted archive, a first user may specify a name and location for a new archive. A first individual or organization that is authorized to decrypt the encrypted archive may be selected. The digital certificate for the first user may reside on a portable certificate storage device plugged into a device receiver on the computing device the first user is using. The first user and the first individual or organization authorized to decrypt the encrypted archive may be the same user. A second individual or organization that is authorized to decrypt the encrypted archive may be selected. The digital certificate for the second individual or organization may reside in a different certificate storage location.

Key material may be generated using random data. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated for each file the user wishes to encrypt and place in the archive.

The public key for the first user may be extracted from a digital certificate for the first user that may be obtained from the portable certificate storage device plugged into a device receiver on the computing device the first user is using. A copy of the key material may be encrypted using the public key of the first user. The public key for the second individual or organization that is authorized to decrypt the encrypted archive may be extracted from a digital certificate obtained from a different certificate storage location. A copy of the key material may be encrypted using the public key of the second individual or organization authorized to decrypt the encrypted archive. The encrypted key material of the first user and the second individual or organization authorized to decrypt the encrypted archive may be placed into the archive.

To decrypt an archive that is encrypted using a digital certificate stored in a portable certificate storage device the following steps may be followed. The encrypted archive may be received by a user authorized to decrypt the file. The private key for the individual or organization may be obtained from the portable certificate storage device plugged into the device receiver of the computing device the user is using. The private key may be used to decrypt the encrypted key material. The decrypted key material may be used to derive a master decryption key. A first session key for a first file to be decrypted may be derived using the master decryption key. Then the first file may be decrypted using the first session key. A second session key for the second file to be decrypted may be derived using the master decryption key. Then the second file may be decrypted using the second session key. This procedure may be repeated until all encrypted files in an archive are decrypted.

LDAP Storage

In another embodiment of the present invention, the Lightweight Directory Access Protocol (LDAP) may be used to access information in a repository. LDAP is a standard protocol used for accessing information stored in a global, or shared repository. Many types of information may be stored in a shared repository. Examples of information commonly available from a shared repository using the LDAP protocol are names, telephone numbers and/or email addresses, for example. A shared repository may also be used to store digital certificates that do not reside on a computing device. Other types of information, including security information and/or access data, may be stored in a shared repository, as known to those skilled in the art.

An embodiment of the present invention may integrate with existing LDAP repositories to support encrypting and/or digitally signing an archive. When encrypting and/or digitally signing an archive, access to an encryption key may be required. An encryption key may be a password, a public key and/or a private key that is stored in an LDAP repository and that is associated with an individual, for example. The encryption key used to encrypt data for an individual or organization that is authorized to decrypt the encrypted archive may be extracted from the LDAP storage location using information commonly known about the individual or organization. The encryption key may also be used to decrypt data. An example of information commonly known about an individual is their email address. Other information about an individual may be used to extract an encryption key from an LDAP respitory, as known to those skilled in the art.

In an embodiment of the present invention, a user may create an archive encrypted using one or more encryption keys stored in an LDAP repository in the following manner. First, the files to be encrypted may be selected and a name and location for the new archive may be specified. The email address for a first individual or organization that is authorized to decrypt the encrypted archive may be selected. The email address for a second individual or organization that is authorized to decrypt the encrypted archive may be selected.

Key material may be generated using random data, as described above. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated until all files that may require encryption are encrypted.

The email address for the first individual may be used to extract the corresponding encryption key for the first individual from the LDAP repository. A copy of the key material may be encrypted using the encryption key of the first individual or organization authorized to decrypt the encrypted archive. The email address for the second individual may be used to extract the corresponding encryption key for the second individual from the LDAP repository. A copy of the key material may be encrypted using the encryption key of the second individual or organization authorized to decrypt the encrypted archive. The encrypted key material of the first and second individuals or organizations authorized to decrypt the encrypted archive may be placed into the archive.

To decrypt an archive that is encrypted using an encryption key (or keys) stored in an LDAP repository the following steps may be followed. The encrypted archive may be received by an individual or organization authorized to decrypt the file. The encryption key for the individual or organization may be obtained from the LDAP repository. The encryption key may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated to decrypt any number of encrypted files.

Multi-Factor Authentication

A digital certificate used to allow interaction with an archive may reside in a storage location that includes additional layers of security to protect the digital certificate from unauthorized access. Using such layers of security may be referred to as multi-factor authentication. Multi-factor authentication may require access data, such as something a user has, something the user knows, and/or something the user is, in order to allow access to a digital certificate, for example. Something a user has may be a portable Smart Card and/or a USB Token that must be in the possession of an authorized user, for example. Something a user knows may be a password and/or a PIN code, for example. Other examples of something a user knows may be an employee ID, telephone number and/or a government issued social security number or other information about a user. Something a user is may rely on physical characteristics of the user such as facial characteristics, voice patterns and/or biometrics such as fingerprints, for example. Other ways to apply multi-factor authentication are available, as known by those skilled in the art.

Biometric

In an embodiment of the present invention a multi-factor authentication method may utilize biometric information, such as facial characteristics, voice patterns and/or fingerprints, for example. Steps a user may follow to implement such multi-factor authentication system may be as follows. First, a certificate authority issuing a digital certificate or other security information to a user may create the digital certificate and deliver it to the user. Then, the user may place the digital certificate into the certificate storage location. The user may provide a recording of a physical characteristic used for protecting access to the certificate. The recorded characteristic of the user may be captured using a facial scan, an iris scan, a retina scan, a voice recording, and/or a fingerprint scan, for example. Access to the digital certificate may then be restricted to users that provide the captured characteristic. Other biometric access data may be used to control access to a digital certificate, as known to those skilled in the art.

In an embodiment of the present invention, a multi-factor authentication system that utilizes biometric information may be implemented as follows. First, to create an encrypted archive, a first user may specify a name and location for the new archive. A first individual or organization that is authorized to decrypt the encrypted archive may be selected. The digital certificate for the first user may reside in a certificate storage location having biometric access control. The first user and the first individual or organization authorized to decrypt the encrypted archive may be the same user. A second individual or organization that is authorized to decrypt the encrypted archive may be selected. The digital certificate for the second individual or organization may reside in a different certificate storage location.

Key material may be generated using random data. A master encryption key may be derived by the compression/extraction engine 40 using the key material. A first session key for the first file to be encrypted may be derived using the master encryption key. Then the first file may be encrypted using the first session key and the encrypted data for the first file may be placed into the archive. A second session key for the second file to be encrypted may be derived using the master encryption key. Then the second file may be encrypted using the second session key and the encrypted data for the second file may be placed into the archive.

The public key for the first user may be extracted from a digital certificate for the first user that may be obtained from certificate storage location having biometric access control. A copy of the key material may be encrypted using the public key of the first user. The public key for the second individual or organization that is authorized to decrypt the encrypted archive may be extracted from a digital certificate obtained from a different certificate storage location. A copy of the key material may be encrypted using the public key of the second individual or organization authorized to decrypt the encrypted archive. The encrypted key material of the first user and the second individual or organization authorized to decrypt the encrypted archive may be placed into the archive.

To decrypt an archive that is encrypted using a digital certificate stored in a certificate storage location having biometric access control the following steps may be followed. The encrypted archive may be received by a user authorized to decrypt the file. The private key for the user may be requested. The user may be asked to provide the physical characteristic required to access the user's private key. The characteristic may be a facial scan, a voice recording, and/or a fingerprint scan of the user, for example. After the successful authentication of the user's physical characteristic, the private key for the individual or organization may be obtained from the certificate storage location having biometric access control. The private key may be used to decrypt the encrypted key material. The decrypted key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key.

Computer Chip Stores

In another embodiment, security information or access data for an individual or organization authorized to decrypt an encrypted archive may be embedded on a computer chip. A computer chip may be used to store a digital certificate or the public and private keys for a user, for example. A computer chip may be used for key storage to provide resistance to tampering, for example. A computer chip used to store a digital certificate and the public and private keys for a user may be installed within a computing device, for example. An example of a computer chip is a silicon chip that is used for computer processing such as a central processing unit (CPU) or another type of computer circuit board. Other types of computer chips may be used, as known to those skilled in the art.

An embodiment of the present invention provides a method for accessing a digital certificate from a computer chip when creating, modifying and/or extracting the contents of an archive. The steps one may follow when accessing a digital certificate from a computer chip when creating an encrypted archive may be as follows. First, a certificate authority issuing a digital certificate to a user may create a digital certificate and deliver it to a person and/or place it onto a computer chip.

To create an encrypted archive, a first user may specify a name and location for the new archive. A first individual or organization that is authorized to decrypt the encrypted archive may be selected. The digital certificate for the first user may reside on a computer chip accessible by the computing device the first user is using. The first user and the first individual or organization authorized to decrypt the encrypted archive may be the same user. A second individual or organization that is authorized to decrypt the encrypted archive may be selected. The digital certificate for the second individual or organization may reside in a different certificate storage location.

Key material may be generated using random data. A master encryption key may be derived by the compression/extraction engine using the key material. A first session key for the first file to be encrypted may be derived using the master encryption key. Then the first file may be encrypted using the first session key and the encrypted data for the first file may be placed into the archive. A second session key for the second file to be encrypted may be derived using the master encryption key. Then the second file may be encrypted using the second session key and the encrypted data for the second file may be placed into the archive. This process may be repeated to encrypt any number of files.

The public key for the first user may be extracted from a digital certificate for the first user that is obtained from the computer chip accessible by the computing device the first user is using. A copy of the key material may be encrypted using the public key of the first user. The public key for the second individual or organization that is authorized to decrypt the encrypted archive may be extracted from a digital certificate obtained from a different certificate storage location. A copy of the key material may be encrypted using the public key of the second individual or organization authorized to decrypt the encrypted archive. The encrypted key material of the first user and the second individual or organization authorized to decrypt the encrypted archive may be placed into the archive.

To decrypt an archive that is encrypted using a digital certificate stored on a computer chip the following steps may be followed, for example. The encrypted archive may be received by a user authorized to decrypt the file. The private key for the individual or organization may be obtained from the computer chip accessible by the computing device the user is using. The private key may be used to decrypt the encrypted key material. The decrypted key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key. Any number of encrypted files may be decrypted in this manner.

Contingency Key

Security provisions may also require contingency planning to allow for overriding encryption, whereby access to encrypted data may be provided to users that are allowed to access the encrypted data under special circumstances. An embodiment of the present invention may allow a user to encrypt files for selected individuals or organizations and for a specific encryption key holder designated to decrypt data only under special circumstances. The encryption key holder designated to decrypt data only under special circumstances is a contingency key holder and the encryption key of the contingency key holder is a contingency key. A contingency key may be a public and private key, as are associated with a digital certificate, a password, or other security information. The special circumstances when a contingency key holder may decrypt data using a contingency key may include the loss of the key or keys of all other individuals authorized to decrypt an archive; investigations into the possible loss, theft, or misuse of encrypted data; or other circumstances where a special key may be needed as a contingency key for example. Other special circumstances may occur where a contingency encryption key holder may decrypt data, as known to those skilled in the art.

In an embodiment of the present invention, the use of a contingency key to encrypt an archive may occur automatically, as described here. The archive management application program used by a user to create an encrypted archive may support a configuration option that indicates that the encryption key of a contingency key holder will be used when a user creates or modifies an encrypted archive. The option controlling the use of the contingency key may be set or changed only by the holder of a contingency key or by another user authorized to configure the use of a contingency key. When this option is enabled, a user that may not be a contingency key holder that is creating an encrypted archive for one or more intended recipients will not select the public key of the contingency key holder that can decrypt the encrypted data and the data will automatically be encrypted using the key of the contingency key holder. When the configuration option is disabled, encrypted data will not automatically be encrypted using the encryption key of the contingency key holder and the user may select a contingency key to use for encrypting data. Users do not need to be informed that data is encrypted for a contingency key holder when encrypting and decrypting archives. Alternatively, users may be informed that data is encrypted for a contingency key holder.

In an embodiment of the present invention, more than one encryption key may be designated as a contingency key. When more than one encryption key is designated as a contingency key, the encryption key of a first contingency key holder and the encryption key of a second contingency key holder may be automatically used when encrypting data. Alternatively, the encryption key of a first contingency key holder and the encryption key of a second contingency key holder may not automatically be used when encrypting data and a user that is not a contingency key holder may select a first or a second contingency key to be used for encrypting data. When decrypting data, a contingency key holder may use their contingency key to decrypt encrypted data.

The following are the steps a user may follow to create an archive encrypted using a contingency key. First, a first user that is the holder of a contingency encryption key may set the program options to identify that a contingency key is to be used automatically when encrypting. Next, the first user may identify which key(s) is the contingency key to be used when encrypting data. Then a second user that is not the holder of a contingency key may create a new encrypted archive. The second user may select files to be encrypted and specify a name and location for the new archive. Next, the second user may select the individuals or organizations that are not contingency key holders that are authorized to decrypt the encrypted archive.

Key material may be generated using random data. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated for any number of files a user wishes to encrypt.

The public key for a first individual or organization that is authorized by the second user to decrypt the encrypted archive may be obtained from the certificate storage location. The public key for a second individual or organization that is authorized by the second user to decrypt the encrypted archive may be obtained from the certificate storage location. The public key for a first contingency key holder authorized to decrypt the encrypted archive may be obtained from the certificate storage location. The public key for a second contingency key holder authorized to decrypt the encrypted archive may be obtained from the certificate storage location.

A copy of the key material may be encrypted using the encryption key of the first individual or organization authorized by the second user to decrypt the encrypted archive. A copy of the key material may be encrypted using the encryption key of the second individual or organization authorized by the second user to decrypt the encrypted archive. A copy of the key material may be encrypted using the encryption key of the first contingency key holder authorized to decrypt the encrypted archive. A copy of the key material may be encrypted using the encryption key of the second contingency key holder authorized to decrypt the encrypted archive. The encrypted key material of the first and second individuals or organizations authorized by the second user to decrypt the encrypted archive may be placed into the archive. The encrypted key material of the first and second contingency key holders authorized to decrypt the encrypted archive may be placed into the archive.

The following is an example of a procedure to decrypt an archive that is encrypted using one or more encryption keys where at least one of the encryption keys is that of an authorized contingency key holder. The encrypted archive may be received by a contingency key holder. The encryption key for the contingency key holder may be obtained from the certificate storage location. The encryption key of the contingency key holder may be used to decrypt the encrypted key material. The decrypted key material may be used to derive a master decryption key. A first session key for a first file to be decrypted may be derived using the master decryption key. Then the first file may be decrypted using the first session key. A second session key for a second file to be decrypted may be derived using the master decryption key. Then the second file may be decrypted using the second session key. This procedure may be repeated to decrypt any number of encrypted files.

Multiple and Segmented Contingency Keys

An embodiment of the present invention may allow a user to specify multiple contingency keys be used when a contingency key holder is decrypting an encrypted archive. Each contingency key may belong to a separate individual who may be designated as the key holder for one of the keys. When either of a first or a second contingency key holder is decrypting encrypted data, the private contingency key of a first contingency key holder must be used and the private contingency key of a second contingency key holder must be used. If either of a first or second contingency key may not be used, the data cannot be decrypted by a contingency key holder Alternatively, responsibility for a single contingency key may be divided among more than one individual. Each individual may be responsible for holding only a portion, or segment, of the key. Use of the key for decrypting data by a contingency key holder requires assembling all segments of the key together to produce the original undivided contingency key. After the contingency key is reassembled from the segments, it may be used to decrypt an encrypted archive. If any segment of the divided contingency key may not be used to reassemble the contingency key, the contingency key may not be used to decrypt an encrypted archive.

The following are steps a user may follow to create an archive encrypted using a segmented contingency key. First, the holder of a contingency key may set program options to identify that a contingency key is to be used when encrypting data, and may identify which key is the contingency key. Next, the holder of a contingency key may set program options to specify that the contingency key is a segmented contingency key. Next, the holder of the contingency key may specify the number of segments the contingency key is to be divided into. Then, a second user that is not the holder of a contingency key may create a new encrypted archive. The second user may select files to be encrypted and specify a name and location for the new archive. The individuals or organizations that are not contingency key holders but that are authorized to decrypt the encrypted archive may be selected by the second user.

Key material may be generated using random data. A master encryption key may be derived by the compression/extraction engine 40 using the key material. A first session key for a first file to be encrypted may be derived using the master encryption key. Then, the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated to encrypt any number of files.

The public key for the first individual or organization that is authorized by the second user to decrypt the encrypted archive may be obtained from the certificate storage location. A copy of the key material may be encrypted using the encryption key of the first individual or organization authorized to decrypt the encrypted archive. The public key for the second individual or organization that is authorized by the second user to decrypt the encrypted archive may be obtained from the certificate storage location. A copy of the key material may be encrypted using the encryption key of the second individual or organization authorized to decrypt the encrypted archive.

A copy of the key material may be divided into a first segment and a second segment. The public key for a first contingency key holder authorized to decrypt the encrypted archive may be obtained from the certificate storage location. The first segment of the divided key material may be encrypted using the encryption key of the first contingency key holder authorized to decrypt the encrypted archive. The public key for a second contingency key holder authorized to decrypt the encrypted archive may be obtained from the certificate storage location. The second segment of the divided key material may be encrypted using the encryption key of the second contingency key holder authorized to decrypt the encrypted archive.

The encrypted key material of the first and second individuals or organizations authorized to decrypt the encrypted archive may be placed into the archive. The encrypted first segment of the key material may be placed into the archive. The encrypted second segment of the key material may be placed into the archive.

To decrypt an archive that is encrypted using a segmented contingency key, the following steps may be followed. The encrypted archive may be received by a holder of a first segment of a segmented contingency key and by a holder of a second segment of a segmented contingency key. The private key of the holder of the first segment of a segmented contingency key may be obtained from the certificate storage location. The first segment of the divided key material may be decrypted using the private key of the holder of the first segment of the contingency key. The private key of the holder of the second segment of a segmented contingency key may be obtained from the certificate storage location. The second segment of the divided key material may be decrypted using the private key of the holder of the second segment of the segmented contingency key.

The decrypted first segment of the divided key material and the decrypted second segment of the divided key material may be rejoined into the key material. The rejoined key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key.

Password

An embodiment of the present invention also provides a method of using password security information for encrypting data. A password is a user-defined key that is used to encrypt data. Only the one or more persons in possession of the password may decrypt data that was encrypted using the password.

To create an archive that is encrypted using a password, the following steps may be followed. First, the files to be encrypted may be selected and a name and location for the new archive may be specified. A password may be provided by the user, for example. A password may be provided by the user by entering the password into a dialog, or by other methods, for example. Other methods of providing a password may be used as known to those skilled in the art.

Key material may be generated using random data and the password provided by the user. A master encryption key may be derived by the compression/extraction engine 40 using the key material. A first session key for a first file to be encrypted may be derived using the master encryption key. Then the first file may be encrypted using the first session key and the encrypted data for the first file may be placed into the archive. A second session key for a second file to be encrypted may be derived using the master encryption key. Then the second file may be encrypted using the second session key and the encrypted data for the second file may be placed into the archive. This procedure may be repeated to encrypt any number of files.

To decrypt an archive that is encrypted using a password, the following steps may be followed. First, an encrypted archive may be received by an individual or organization authorized to decrypt the file. The password that was used to encrypt the archive may be provided by the user. The password may be provided by the user by entering the password into a dialog, or by other methods, for example.

The password may be used to decrypt the encrypted key material. The decrypted key material may be used to derive a master decryption key. A first session key for the first file to be decrypted may be derived using the master decryption key. Then a first file may be decrypted using the first session key. A second session key for a second file to be decrypted may be derived using the master decryption key. Then the second file may be decrypted using the second session key. This procedure may be repeated to decrypt any number of encrypted files.

In an embodiment of the present invention, a password may be used to encrypt a file in a ZIP archive or to encrypt the central directory. One or more public keys may also be used when encrypting the same file or central directory that has been encrypted using a password. A file or a central directory that has been encrypted using both a password and a public key, may be decrypted by a holder of the password or by a holder of a private key matching to one of the publics keys used to encrypt the file or central directory.

Central Directory

In an embodiment of the present invention, encrypting a central directory of an archive may provide additional data privacy by encrypting file names and/or other file characteristics maintained in the archive. This may be implemented in connection with an archive in the .ZIP format, for example. The .ZIP format is described in an APPNOTE published by PKWARE, the assignee of the present patent application, which documents the records and fields that make up a .ZIP archive. A copy of the APPNOTE may be found at http://www.pkzip.com/company/standards/appnote/.

The .ZIP archive format defines a local header record and a central header record. There is one local header record and one central header record stored in a .ZIP archive for each file stored in the archive. The local and central header records store characteristics of each file in a .ZIP archive. These characteristics include file name, compression method, file creation date, original uncompressed file size, compressed file size and/or other characteristics. The central directory is the section of a .ZIP archive that is used to store the central header records.

When encrypting a file in a .ZIP archive in the method described above, the content of each file is encrypted. However, the characteristics in the local and central header records are typically not encrypted. Unfortunately, an unencrypted file name or other characteristic may leave a user open to a man-in-the-middle attack. A man-in-the-middle attack is a type of attack where a person not authorized to access data in an encrypted .ZIP archive uses information gained through deception or through the exposure of unencrypted characteristics to decrypt an encrypted .ZIP archive. The present invention provides a method for increasing the security of a user's data by encrypting file characteristics. The characteristics that are encrypted include file name, uncompressed file size, compressed file size, compression method, file creation date, and other characteristics.

In an embodiment of the present invention, a user may encrypt the central directory of a .ZIP archive in the following manner. First, a user may encrypt each file as the file is stored into the .ZIP archive. As each file is placed into the .ZIP archive, a local header record for that file may be placed into the .ZIP archive. The characteristics in the local header that may be used in a man-in-the-middle attack may be set to random values or to zero. The characteristics in the local header record that are set to random values or to zero include the file name, original file size, compressed file size, and/or compression method. After each file and the local header record for each file is placed into the .ZIP archive, the central header records for each file may be placed into the central directory. Then the central directory may be encrypted. The central directory may be compressed before being encrypted. Any of the encryption methodologies described above may be applied to encrypt the central directory.

Multiple Passwords

Password encryption methods typically use a single password to encrypt data in a file or an archive. The password may then be shared between all individuals authorized to decrypt the data when the data is to be shared among multiple users. When a password is shared by more than one user, the security of the data encrypted with the password may be decreased. There may be no individual identity that may be associated with a password, unless the password is known only to one individual. When a password is known only to one individual, data that is encrypted with the password cannot be shared. An embodiment of the present invention provides a method for encrypting data using multiple passwords so that encrypted data can be shared without sharing a password. The method of this invention uses a unique password for each individual that is authorized to decrypt the encrypted data that is to be shared by more than one person.

When data is encrypted or decrypted using multiple passwords, each password used for encrypting or decrypting data may be received from a user or from a password storage location. When a password is received from a user, it may be provided by the user by entering the password into a dialog, or by other methods. When a password is received from a password storage location, it is received from a storage location that is unique for the user of the password. One user cannot access the password storage location of another user. One example of a password storage location is a database management system. Within a database management system the password for a user may be retrieved using access data or characteristics about the user such as a name, phone number, email address, social security number, account number or other unique characteristic about a user. Another example of a password storage location is a directory service using the Lightweight Directory Access Protocol (LDAP). Another example is a storage device in the form of a USB token or a Smartcard. Another example is a one-time password system such as a SecureID device as is produced by RSA Security, Inc. Another example is a user authentication system that may use a password, or other user identification method to validate a user's identity. An example of a user authentication system that uses a password to validate a user's identity is the Microsoft Windows login process by which a user is granted access to the Windows operating system using a unique password.

To create an archive that is encrypted using multiple passwords, the following steps may be followed. First, the files to be encrypted may be selected and a name and location for the new archive may be specified. The individuals or organizations that are authorized to decrypt the encrypted archive may be selected.

Key material may be generated using random data. A master encryption key may be derived by the compression/extraction engine 40 using the key material. A first session key for the first file to be encrypted may be derived using the master encryption key. Then the first file may be encrypted using the first session key and the encrypted data for the first file may be placed into the archive. A second session key for the second file to be encrypted may be derived using the master encryption key. Then the second file may be encrypted using the second session key and the encrypted data for the second file may be placed into the archive. This procedure may be repeated to encrypt any number of files.

The password for a first individual or organization that is authorized to decrypt the encrypted archive may be obtained from a first user or from a first password storage location. A copy of the key material may be encrypted using the password of the first individual or organization authorized to decrypt the encrypted archive. The password for a second individual or organization that is authorized to decrypt the encrypted archive may be obtained from a second user or from a second password storage location. A copy of the key material may be encrypted using the password of the second individual or organization authorized to decrypt the encrypted archive. The encrypted key material of the first and second individuals or organizations authorized to decrypt the encrypted archive may be placed into the archive.

To decrypt an archive that is encrypted using multiple passwords, the following steps may be followed. The encrypted archive may be received by an individual or organization authorized to decrypt the file. The password for the individual or organization may be obtained from a user or from a password storage location. The password may be used to decrypt the encrypted key material. The decrypted key material may be used to derive a master decryption key. A first session key for the first file to be decrypted may be derived using the master decryption key. Then the first file may be decrypted using the first session key. A second session key for the second file to be decrypted may be derived using the master decryption key. Then the second file may be decrypted using the second session key. This procedure may be repeated to decrypt any number of encrypted files.

When multiple passwords are used to encrypt data, at least one password may operate as a contingency key. When at least two passwords that are contingency keys are used to encrypt data, both keys may be required to be used to decrypt data, or either key may be used. When at least two passwords that are contingency keys are use to encrypt data, both keys may operate as portions of a segmented key.

Digital Signatures

Similar to the manner in which a public key may be used to encrypt data which may be decrypted using a specific private key, a private key may be used to encrypt data that may be decrypted using a specific public key. The method of encrypting data with a private key may be used in the digital signature process. A digital signature may be used to validate that a data object and/or file has not been altered since it was digitally signed. A digital signature may also verify the identity of a user that applied his/her digital signature to a file.

In an embodiment of the present invention, a digital signature may be applied to files as they are placed into an archive. A digital signature may be applied to the central directory of an archive as the central directory is created and/or modified. When files are extracted from the archive, the digital signatures the archive contains may be validated to ensure the contents of the archive have not been altered and/or to authenticate the identity of the user that created the archive.

In an embodiment of the present invention, the files and central directory of an archive may be digitally signed by more than one individual or organization. The application of additional digital signatures may be used to indicate that those individuals or organizations that digitally sign an archive have verified and accept the contents of the archive.

Alternatively, individual files within an archive may be signed by different individuals or organizations. For example, a first user may sign a first file in the archive and a second user may sign a second file in the archive. The central directory of the archive may then be signed by one or more of the first user and the second user, or may alternatively be signed by a third user.

To create an archive that is digitally signed using multiple digital signatures, the following steps may be followed. First, the files to be digitally signed may be selected and a name and location for the new archive may be specified. The private key for the first individual or organization that is digitally signing the archive may be located from the certificate storage location. A cryptographic hash value may be calculated for the contents of the first file to be digitally signed. The cryptographic hash value may be encrypted using the first private key. The first file and the first encrypted hash value may be placed into the archive. A cryptographic hash value may be calculated for the contents of the second file to be digitally signed. The cryptographic hash value may be encrypted using the first private key. The second file and the second encrypted hash value may be placed into the archive. A file may also be compressed and/or encrypted before it is placed into an archive.

After each file and the local header record for each file are placed into the archive, the central header records for each file may be placed into the central directory. Then a cryptographic hash value may be calculated for the central directory. The cryptographic hash value of the central directory may be encrypted using the first private key. Then the central directory and the encrypted hash value of the central directory may be placed into the archive. The central directory may also be compressed and/or encrypted before it is placed into an archive.

The private key for the second individual or organization that is digitally signing the archive may be located from the certificate storage location. No changes to the first file, the second file, or the central directory of the archive may be made by the second individual. A cryptographic hash of the first file may be calculated and may then be encrypted using the private key of the second individual. A cryptographic hash of the second file may be calculated and then may be encrypted using the private key of the second individual. A cryptographic hash of the central directory may be calculated and may then be encrypted using the private key of the second individual. The encrypted hash value of the first file encrypted with the second private key, the encrypted hash value of the second file encrypted with the second private key, and the encrypted hash of the central directory encrypted with the second private key may be placed into the .ZIP archive.

Devices

As mentioned previously in the specification, embodiments of the present invention may be implemented in connection with various devices that run various operating systems. For example, in embodiments of the present invention, an archive management application may operate with a host application that runs on a personal computer, a Portable Digital Assistant (PDA), a wireless communications device, a portable music device, a gaming device, an electronic game device, a portable storage device, a cable or satellite television system device, and/or a digital image capture device. It may be desirable to implement the components of the system 10 in connection with other devices that run host applications, as known to those skilled in the art.

An embodiment of the present invention provides for an archive management application operating with a host application that runs on a personal computer. A personal computer may provide a user with a laptop and/or a desktop workstation. Personal computers may operate using an operating system such as Windows, Mac OS, UNIX, or Linux, for example. User applications available on a personal computer that may serve as host applications for an archive management application may include file managers, such as Microsoft Windows Explorer, internet enabled applications, such as Microsoft Internet Explorer, email programs, such as Microsoft Outlook, and/or other applications, such as Word, Excel and AOL Instant Messenger, for example. Other host applications that run on personal computers may be used, as known to those skilled in the art.

An embodiment of the present invention provides for an archive management application operating with a host application that runs on a Portable Digital Assistant (PDA). A PDA may provide a user with a portable office environment. One example of a PDA is the PalmPilot. Another example is the RIM Blackberry. A third example is the Windows Pocket PC. PDA's may operate using an operating system such as Pocket PC or Palm OS, for example. User applications available on a PDA that may serve as host applications for an archive management application may include file managers, internet enabled applications, email programs, instant messaging programs, and/or other applications, for example. Other host applications that run on PDA's may be used, as known to those skilled in the art.

An embodiment of the present invention provides for an archive management application operating with a host application that runs on a wireless communications device such as a cellular phone. A cellular phone provides a user with a portable communications device. Cellular phones may operate using an operating system such as Windows Smartphone or Palm OS, for example. User applications available on a cell phone that may serve as host applications for an archive management application may include file managers, internet enabled applications, email programs, instant messaging programs, and/or other applications, for example. Other host applications that run on cellular phones may be used, as known to those skilled in the art.

An embodiment of the present invention provides for an archive management application operating with a host application that runs on a portable music device. A portable music device provides a user with a portable entertainment and communications device. One example of a portable music device is an MP3 player. Another example of a portable music device is an Apple ipod. Portable music devices may operate using an operating system such as iPod OS or Linux, for example. User applications available on a portable music device that may serve as host applications for an archive management application may include file managers, internet enabled applications, email programs, instant messaging programs, and/or other applications, for example. Other host applications that run on portable music devices may be used, as known to those skilled in the art.

An embodiment of the present invention provides for an archive management application operating with a host application that runs on a gaming device. A gaming device may be any device that allows a user to engage in a game of chance, such as black jack, poker, roulette and/or any other type of game that may involve gambling.

An embodiment of the present invention provides for an archive management application operating with a host application that runs on an electronic game device. An electronic game device provides a user with an entertainment device that is often portable. One example of an electronic game device is a Microsoft XBox. Electronic game devices may operate using an operating system such as Microsoft Windows, for example. User applications available on an electronic game device that may serve as host applications for an archive management application may include file managers, internet enabled applications, email programs, instant messaging programs, and/or other applications, for example. Other host applications that run on electronic game devices may be used, as known to those skilled in the art.

An embodiment of the present invention provides for an archive management application operating with a host application that runs on a portable storage device. A portable storage device provides a user with a portable data storage and transfer device. One example of a portable storage device is a USB (Universal Serial Bus) Drive. Portable storage devices may interoperate with an operating system such as Microsoft Windows, Mac OS, UNIX or Linux, for example. User applications available on a portable storage device that may serve as host applications for an archive management application may include file managers, internet enabled applications, email programs, instant messaging programs, and/or other applications, for example. Other host applications that run on portable storage devices may be used, as known to those skilled in the art.

An embodiment of the present invention provides for an archive management application operating with a host application that runs on a cable or satellite television system device such as a cable television receiver. A cable or satellite television system device provides a user with an entertainment device. Cable or satellite television system devices may operate using an operating system such as Microsoft Windows, Linux or JAVA, for example. User applications available on a cable or satellite television system device that may serve as host applications for an archive management application may include file managers, internet enabled applications, email programs, instant messaging programs, and/or other applications, for example. Other host applications that run on cable or satellite television receivers may be used, as known to those skilled in the art.

An embodiment of the present invention provides for an archive management application operating with a host application that runs on a digital image capture device, such as a digital camera or a digital video recorder. A digital image capture device provides a user with a portable entertainment device. Digital image capture devices may provide the user with features similar to operating systems such as Microsoft Windows Smartphone or JAVA. User applications available on a digital image capture device that may serve as host applications for an archive management application may include file managers, internet enabled applications, email programs, instant messaging programs, and/or other applications, for example. Other host applications that run on digital image capture devices may be used, as known to those skilled in the art.

An embodiment of the present invention provides for an archive management application operating with a host application that reads and/or writes files and/or folders. Examples of host applications that read and/or write files and/or folders are word processing applications, such as Microsoft Word or OpenOffice, and database applications, such as Oracle and DB2, for example. Other host applications that read and/or write files and/or folders may be used, as known to those skilled in the art.

While the invention has been described with reference to embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method for providing security for an archive file on a computer, said method including:

forming, on a computer, an archive file including at least one file,
 wherein said file is compressed before placement in said archive file,
 wherein said archive file includes a central directory,
 wherein at least part of said central directory is compressed before being encrypted,
 wherein said central directory includes security information with regard to said at least one file, wherein said security information includes key material that is encrypted using a public key of an individual authorized to decrypt the encrypted archive file; and
 encrypting said central directory of said archive file.

2. The method of claim 1 wherein said archive includes a plurality of files.

3. The method of claim 2 wherein said central directory includes security information for said plurality of files.

4. The method of claim 1 wherein said encrypting uses a digital certificate.

5. The method of claim 1 wherein said encrypting uses a password.

6. The method of claim 1 wherein said encrypting uses a plurality of passwords.

7. The method of claim 1 wherein said encrypting uses a private key.

8. The method of claim 1 wherein said encrypting uses a public key.

9. The method of claim 1 wherein said encrypting uses a contingency key.

10. The method of claim 1 wherein said encrypting uses a segmented key.

11. The method of claim 1 wherein said encrypting uses biometric data.

12. The method of claim 1 wherein said archive file resides on a computing device.

13. The method of claim 1 wherein said archive file resides on a portable storage device.

14. The method of claim 1 wherein said archive file is a .Zip archive.

15. The method of claim 1 wherein said central directory is separate from said file.

16. The method of claim 1 wherein said security information includes at least one file-identifying characteristic.

17. The method of claim 1 wherein said security information includes at least one characteristic of said file.

18. The method of claim 1 wherein said archive file is a compressed archive.

19. An archive security system on a computer, said system including:

a central directory in an archive file on a computer,
 said central directory including security information with regard to at least one file included in said archive file,
 wherein said file is compressed before placement in said archive file,
 wherein at least part of said central directory is compressed before being encrypted,
 wherein said security information includes key material that is encrypted using a public key of an individual authorized to decrypt the encrypted archive file, and
 wherein said central directory of said archive file is encrypted.

* * * * *